United States Patent
Oh et al.

(10) Patent No.: US 11,510,185 B2
(45) Date of Patent: Nov. 22, 2022

(54) METHOD AND APPARATUS FOR FREQUENCY DOMAIN RESOURCE ALLOCATION IN WIRELESS COMMUNICATION SYSTEM

(71) Applicant: Samsung Electronics Co., Ltd., Suwon-si (KR)

(72) Inventors: Jinyoung Oh, Suwon-si (KR); Jonghyun Bang, Suwon-si (KR); Hyunseok Ryu, Suwon-si (KR); Sungjin Park, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 16/834,065

(22) Filed: Mar. 30, 2020

(65) Prior Publication Data

US 2020/0314837 A1    Oct. 1, 2020

(30) Foreign Application Priority Data

Mar. 29, 2019 (KR) .................. 10-2019-0036744
Oct. 30, 2019 (KR) .................. 10-2019-0136812

(51) Int. Cl.
*H04W 72/04* (2009.01)

(52) U.S. Cl.
CPC ..... *H04W 72/0413* (2013.01); *H04W 72/042* (2013.01); *H04W 72/0453* (2013.01)

(58) Field of Classification Search
CPC ........... H04W 72/0413; H04W 72/042; H04W 72/0453; H04W 74/0833; H04W 72/0406;
(Continued)

(56) References Cited

U.S. PATENT DOCUMENTS 10,136,452 B2 * 11/2018 Liu .................. H04W 74/0833
10,932,293 B2 *  2/2021 Do ..................... H04L 27/2607
(Continued)

FOREIGN PATENT DOCUMENTS

EP     3 410 808 A1   12/2018
EP     3 461 050 A1    3/2019
WO  2017/171325 A1   10/2017

OTHER PUBLICATIONS

Samsung, Uplink signal and channel design for NR-U, R1-1902256, 3GPP TSG RAN WG1 #96, Athens, Greece, Feb. 15, 2019.
(Continued)

*Primary Examiner* — Brian T O Connor
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a terminal in a communication system is provided. The method includes receiving, from a base station, configuration information for a physical uplink control channel, the configuration information including an index of an interlace resource, identifying two interlace resources based on the configuration information, and transmitting, to the base station, uplink control information on the physical uplink control information using at least one of the two interlace resources, in which the interlace resource is composed of a plurality of resource
(Continued)

blocks of which interval between the plurality of resource blocks are identical.

20 Claims, 14 Drawing Sheets

(58) Field of Classification Search
CPC ............ H04W 74/002; H04W 74/0808; H04L 5/0053; H04L 5/0094
See application file for complete search history.

(56) References Cited

U.S. PATENT DOCUMENTS

| 2015/0085794 | A1  | 3/2015  | Chen et al. |            |
|--------------|-----|---------|-------------|------------|
| 2016/0323915 | A1* | 11/2016 | Liu         | H04W 74/0833 |
| 2019/0110307 | A1  | 4/2019  | Kim et al.  |            |
| 2019/0313409 | A1* | 10/2019 | Tian        | H04W 72/121 |
| 2021/0250142 | A1* | 8/2021  | Wang        | H04L 1/1614 |
| 2022/0190993 | A1* | 6/2022  | Shin        | H04L 5/0053 |
| 2022/0232558 | A1* | 7/2022  | Shin        | H04W 76/38 |

OTHER PUBLICATIONS

Qualcomm Incorporated, Scheduling of multiple DL/UL transport blocks, R1-1902368, 3GPP TSG RAN WG1 #96, Athens, Greece, Feb. 16, 2019.

Intel Corporation, Scheduling of multiple DL/UL TBs for eMTC, R1-1902452, 3GPP TSG RAN WG1 #96, Athens, Greece, Feb. 16, 2019.

Qualcomm Incorporated, UL signals and channels for NR-U, R1-1902984, 3GPP TSG RAN WG1 #96, Athens, Greece, Feb. 16, 2019.

International Search Report dated Jul. 9, 2020, issued in International Application No. PCT/KR2020/004362.

Extended European Search Report dated Feb. 7, 2022, issued in a counterpart European Application No. 20783659.4.

Spreadtrum Communications; Discussion on UL Signals and Channels in NR-U; 3GPP TSG RAN WG1 Ad-Hoc Meeting 1901; R1-1900708; Jan. 20, 2019, Taipei.

Huawei, HiSilicon; UL channels and signals in NR unlicensed band; 3GPP TSG RAN WG1 Meeting #96; R1-1901524 Feb. 15, 2019, Athens, Greece.

* cited by examiner

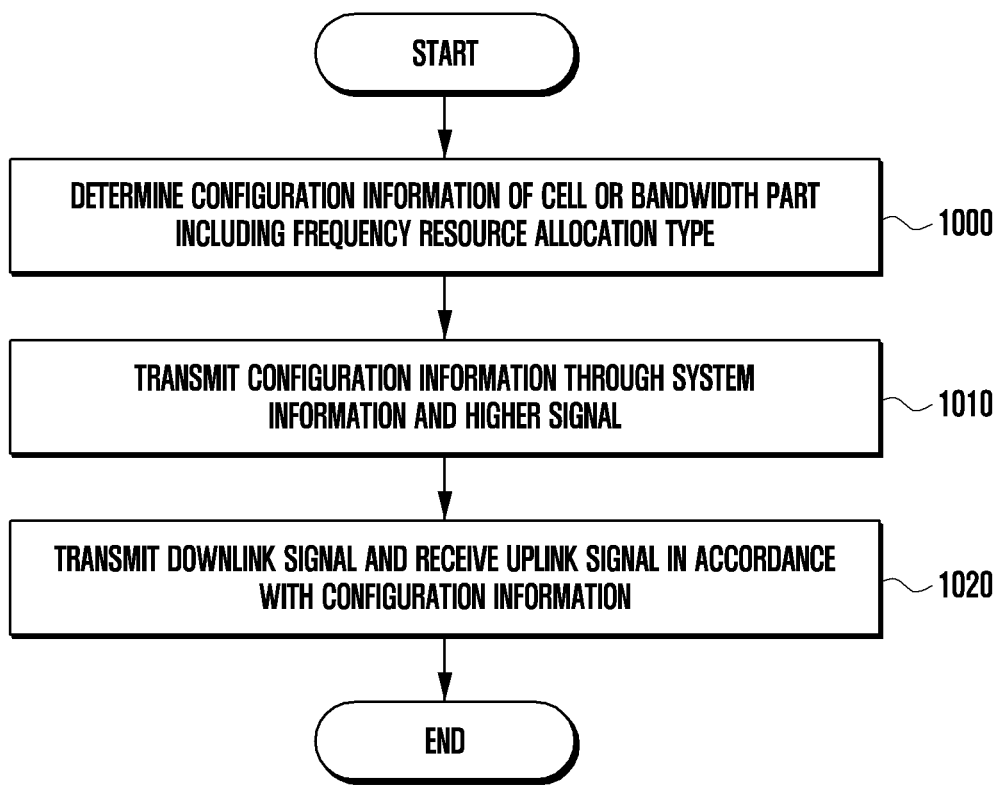

METHOD AND APPARATUS FOR FREQUENCY DOMAIN RESOURCE ALLOCATION IN WIRELESS COMMUNICATION SYSTEM

CROSS-REFERENCE TO RELATED APPLICATION(S)

This application is based on and claims priority under 35 U.S.C. § 119 of a Korean patent application number 10-2019-0036744, filed on Mar. 29, 2019, in the Korean Intellectual Property Office, and of a Korean patent application number 10-2019-0136812, filed on Oct. 30, 2019, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for frequency domain resource allocation in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Further, researches have been made on a licensed assisted access (LAA) technology using an unlicensed band based on a 5G communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for frequency domain resource allocation in a wireless communication system.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, configuration information for a physical uplink control channel, the configuration information including an index of an interlace resource, identifying two interlace resources based on the configuration information; and transmitting, to the base station, uplink control information on the physical uplink control channel using at least one of the two interlace resources, wherein the interlace resource is composed of a plurality of resource blocks of which interval between the plurality of resource blocks are identical.

In accordance with another aspect of the disclosure, a method performed by a base station in a communication system is provided. The method includes identifying two interlace resources for receiving uplink control information, transmitting, to a terminal, configuration information for a physical uplink control channel, the configuration information including an index of an interlace resource according to the two interlace resources, receiving, from the terminal, the uplink control information on the physical uplink control channel using at least one of the two interlace resources, wherein the interlace resource is composed of a plurality of resource blocks of which interval between the plurality of resource blocks are identical.

In accordance with another aspect of the disclosure, a terminal in a communication system is provided. The terminal includes a transceiver, and a controller coupled with the transceiver and configured to receive, from a base station, configuration information for a physical uplink control channel, the configuration information including an index of an interlace resource, identify two interlace resources based on the configuration information, and transmit, to the base station, uplink control information on the physical uplink control channel using at least one of the two interlace resources, wherein the interlace resource is composed of a plurality of resource blocks of which interval between the plurality of resource blocks are identical.

In accordance with another aspect of the disclosure, a base station in a communication system is provided. The base station includes a transceiver, and a controller coupled with the transceiver and configured to identify two interlace resources for receiving uplink control information, transmit, to a terminal, configuration information for a physical uplink control channel, the configuration information including an index of an interlace resource according to the two interlace resource, and receive, from the terminal, the uplink control information on the physical uplink control channel using at least one of the two interlace resources, wherein the interlace resource is composed of a plurality of resource blocks of which interval between the plurality of resource blocks are identical.

Other aspects, advantages, and salient features of the disclosure will become apparent to those skilled in the art from the following detailed description which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 10 is a flowchart of a base station for determining a method for allocating a frequency domain resource in a wireless communication system according to an embodiment of the disclosure;

Throughout the drawings, it should be noted that like reference numbers are used to depict the same or similar elements, features, and structures.

DETAILED DESCRIPTION

Figure 1:
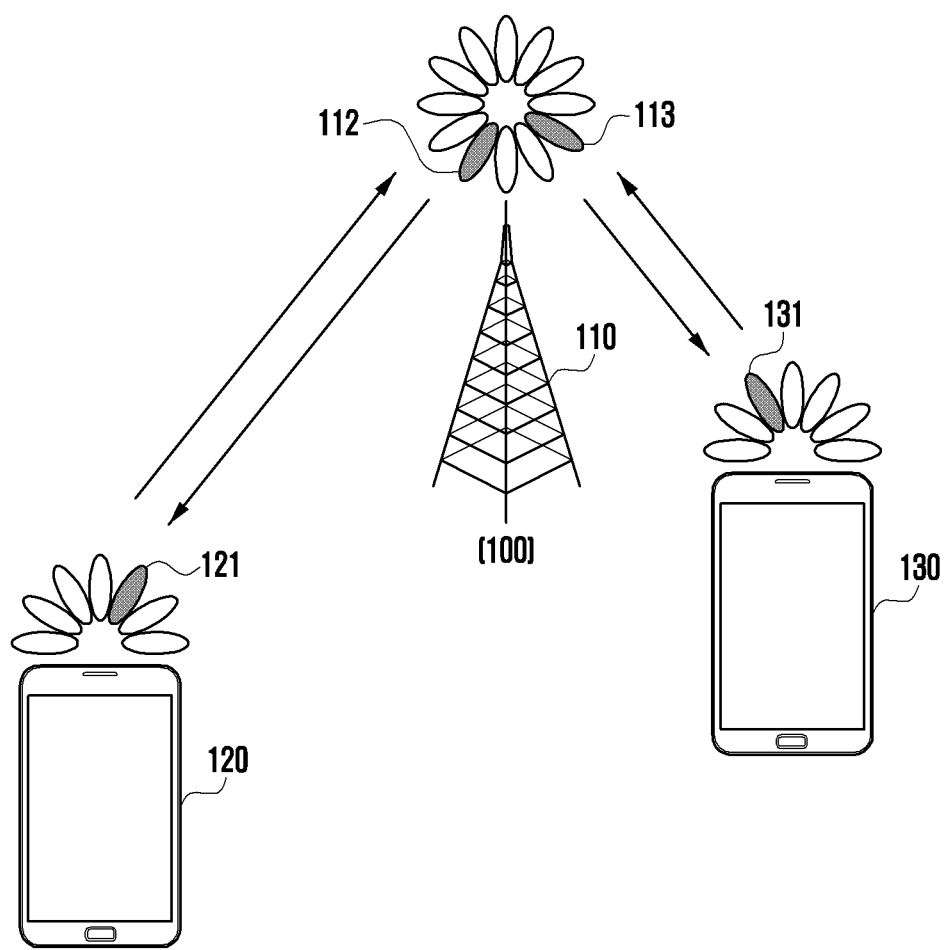
FIG. 1 is a diagram illustrating a wireless communication system according to an embodiment of the disclosure.

Hereinafter, embodiments of the disclosure will be described in detail with reference to the accompanying drawings. In describing the disclosure, a detailed description of related known functions or configurations will be omitted if it is determined that it obscures the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of the disclosure will be described in detail with reference to the accompanying drawings.

In explaining the embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as field programmable gate array (FPGA) or application specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card. Further, in an embodiment, "~unit" may include one or more processors.

A wireless communication system was initially developed for the purpose of providing a voice-oriented service, but it has been expanded to, for example, a broadband wireless communication system that provides a high-speed and high-quality packet data service together with the communication standards, such as 3rd Generation Partnership Project (3GPP) high speed packet access (HSPA), long term evolution (LTE) or evolved universal terrestrial radio access (E-UTRA), LTE-advanced (LTE-A), 3GPP2 high rate packet data (HRPD), ultra-mobile broadband (UMB), and institute of electrical and electronics engineers (IEEE) 802.16e. Also, for the 5th generation wireless communication system, 5G or new radio (NR) communication standards have been developed.

In case of a 5G communication system, various technologies will be introduced, such as retransmission in the unit of a code block group (CBG) in order to provide various services and to support a high data rate, and a technology capable of transmitting an uplink signal without uplink scheduling information (e.g., grant-free uplink transmission). Accordingly, in case of performing 5G communication through an unlicensed band, a more efficient channel access procedure in consideration of various variables is necessary.

In the wireless communication system including the 5th generation (5G) communication system, at least one service of an enhanced mobile broadband (eMBB), massive machine type communications (mMTC), and ultra-reliable and low-latency communications (URLLC) may be provided to a terminal. The above-described services may be provided to the same terminal during the same time period. In an embodiment, the eMBB may be a service aimed at high-speed transmission of high-capacity data, the mMTC may be a service aimed at minimization of a terminal power and accesses of a plurality of terminals, and the URLLC may be a service aimed at high reliability and low latency, but the above-described services are not limited thereto. The three kinds of services may be important scenarios in an LTE system or post-LTE 5G/NR (new radio or next radio) systems, but the services are not limited to the above-described examples. Further, the above-described services of the 5G system are exemplary, and possible services of the 5G system are not limited to the above-described examples. In addition, a system providing an URLLC service may be called an URLLC system, and a system providing an eMBB service may be called an eMBB system. Further, the terms "service" and "system" may be interchangeably or mixedly used.

Hereinafter, a base station is the subject that performs resource allocation to a terminal, and it may include at least one of eNode B, Node B, base station (BS), radio access unit, base station controller, or node on a network. A terminal may include at least one of user equipment (UE), mobile station (MS), cellular phone, smart phone, computer, or multimedia system capable of performing a communication function. In the disclosure, a downlink (DL) is a radio transmission path of a signal that is transmitted from the base station to the terminal, and an uplink (UL) means a radio transmission path of a signal that is transmitted from the terminal to the base station. Hereinafter, although the LTE or LTE-A system is exemplified in an embodiment of the disclosure, and in order to explain a method and an apparatus proposed in the disclosure, the terms "physical channel" and "signal" in the LTE or LTE-A system in the related art may be used. Embodiments of the disclosure may also be applied to other communication systems having technical backgrounds or channel types similar to those of the mobile communication system described in the disclosure. For example, the 5th-generation (5G) mobile communication technology (5G, new radio, and NR) may be included therein. Further, the embodiments of the disclosure may also be applied to other communication systems through partial modifications thereof in a range that does not greatly deviate from the scope of the disclosure by the judgment of those skilled in the art.

In the 5G system or new radio (NR) system that is a representative example of broadband wireless communication systems, a downlink (DL) adopts an orthogonal frequency division multiplexing (OFDM) scheme, and an uplink (UL) adopts all schemes of the OFDM, a single carrier frequency division multiple access (SC-FDMA), and a DFT spread OFDM (DFT-s-OFDM). According to the multiple access schemes, data of respective users or control information can be discriminated from each other by allocating and operating time-frequency domain resources, on which the data or the control information is transmitted, so as to prevent the time-frequency resources from overlapping each other, that is, to establish orthogonality between the time-frequency resources.

The NR system adopts a hybrid automatic repeat request (HARQ) scheme in which a physical layer retransmits data if decoding failure occurs during an initial transmission of the corresponding data. According to the HARQ scheme, a receiver may enable a transmitter to retransmit the corresponding data on the physical layer by transmitting information (e.g., negative acknowledgement (NACK)) for notifying the transmitter of the decoding failure if the receiver has not accurately decoded the data. The receiver may combine the data retransmitted by the transmitter with the previous data of which the decoding has failed in order to heighten the data reception performance. Further, according to the HARQ scheme, if the receiver has accurately decoded the data, the receiver may transmit information (e.g., acknowledgement (ACK)) for notifying the transmitter of a decoding success, so that the transmitter transmits new data.

In the following description, the terms designating signals, channels, control information, network entities, and constituent elements of a device are exemplified for convenience in explanation. Accordingly, the disclosure is not limited to the terms to be described later, but other terms having equivalent technical meanings may be used.

Although various embodiments of the disclosure will be described using the terms being used in some communication standards (e.g., 3rd Generation Partnership Project (3GPP)), they are merely exemplary for explanation, and the various embodiments of the disclosure may be easily modified and applied to other communication systems.

Although various embodiments of the disclosure are described based on the NR system, the contents of the disclosure are not limited to the NR system, but may be applied to various wireless communication system, such as LTE, LTE-A, LTE-A-Pro, and 5G. Further, although the contents of the disclosure are to describe a system and an apparatus for transmitting and receiving a signal using an unlicensed band, the contents of the disclosure may also be able to be applied to a system operating in the unlicensed band.

In the disclosure, higher layer signaling or a higher signal may be a method for transferring a signal from the base station to the terminal using a downlink data channel of a physical layer or transferring a signal from the terminal to the base station using an uplink data channel of the physical layer, and it may include at least one of methods for transferring a signal that is transferred through radio resource control (RRC) signaling, packet data convergence protocol (PDCP) signaling, or a medium access control (MAC) control element (CE). Further, the higher layer signaling or the higher signal may include system information that is commonly transmitted to a plurality of terminals, for example, a system information block except a master information block, which is transmitted through a physical broadcast channel (PBCH). In this case, the MIB may also be included in the higher layer signaling.

FIG. 1 illustrates a wireless communication system according to an embodiment of the disclosure.

Referring to FIG. 1, a base station 110, a terminal 120, and a terminal 130 are exemplified as some of nodes using radio channels in the wireless communication system. Although only one base station is illustrated in FIG. 1, the wireless communication system may further include other base stations that are identical or similar to the base station 110.

The base station 110 is a network infrastructure providing a radio access to the terminals 120 and 130. The base station 110 has a coverage that is defined as a specific geographic area based on a distance within which the base station 110 can transmit a signal. In addition to the base station, the base station 110 may be called an access point (AP), eNodeB (eNB), gNodeB (gNB), 5th generation node (5G node), wireless point, transmission/reception point (TRP), or another term having the same technical meaning.

Each of the terminals 120 and 130 is a device used by a user, and it performs communication with the base station 110 through a radio channel According to circumstances, at least one of the terminals 120 and 130 may operate without user's participation. That is, at least one of the terminals 120 and 130 is a device performing machine type communication (MTC), and it may not be carried by the user. In addition to the terminal, each of the terminals 120 and 130 may be called user equipment (UE), mobile station, subscriber station, remote terminal, wireless terminal, user device, or another term having the same technical meaning.

A wireless communication environment 100 may include wireless communication in an unlicensed band. The base station 110, the terminal 120, and the terminal 130 may transmit and receive a radio signal in an unlicensed band (e.g., 5 to 7 GHz or 64 to 71 GHz). In the unlicensed band, a cellular communication system and another communication system (e.g., wireless local area network (WLAN)) may coexist. In order to secure fairness between the two communication systems, in other words, in order to prevent any one system from exclusively using channels, the base station 110, the terminal 120, and the terminal 130 may perform a channel access procedure for the unlicensed band. As an example of the channel access procedure for the unlicensed band, the base station 110, the terminal 120, and the terminal 130 may perform listen before talk (LBT).

The base station 110, the terminal 120, and the terminal 130 may transmit and receive a radio signal in millimeter wave (mmWave) bands (e.g., 28 GHz, 30 GHz, 38 GHz, and 60 GHz). In this case, in order to improve a channel gain, the base station 110, the terminal 120, and the terminal 130 may perform beamforming Here, the beamforming may include transmission beamforming and reception beamforming That is, the base station 110, the terminal 120, and the terminal 130 may give directivity to a transmitted signal or a received signal. For this, the base station 110, the terminal 120, and the terminal 130 may select serving beams (112, 113, 121, 131) through a beam search or beam management procedure. After the serving beams are selected, the subsequent communication may be performed through a resource that is in quasi co-located (QCL) relationship with the resource on which the serving beams have been transmitted.

Figure 2:
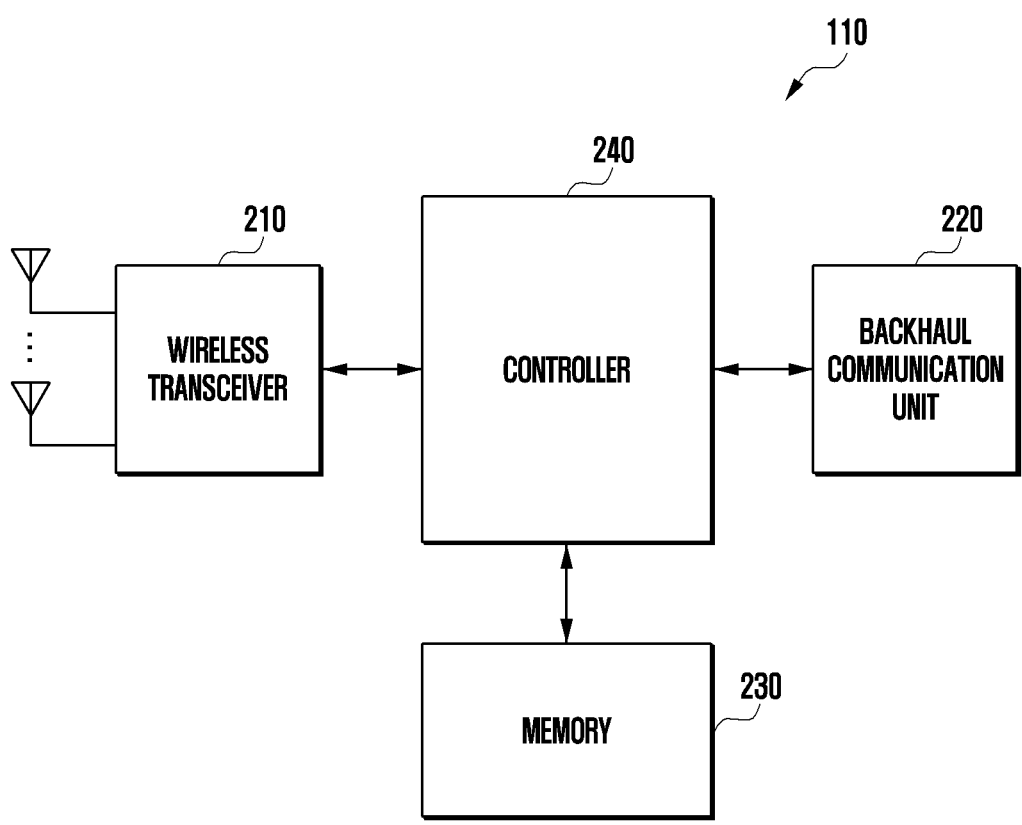
FIG. 2 is a diagram illustrating the configuration of a base station in a wireless communication system according to an embodiment of the disclosure.

FIG. 2 illustrates the configuration of a base station in a wireless communication system according to an embodiment of the disclosure.

The configuration exemplified in FIG. 2 may be understood as the configuration of the base station 110. The term "~unit" or "~er", as used hereinafter, may mean a unit for processing at least one function or operation, and it may be implemented by software, hardware, or a combination of the software and the hardware.

Referring to FIG. 2, the base station includes a wireless transceiver 210, a backhaul communication unit 220, a memory 230, and a controller 240.

The wireless transceiver 210 performs functions for transmitting and receiving a signal through a radio channel. For example, the wireless transceiver 210 performs a conversion function between a baseband signal and a bit string in accordance with physical layer standards of a system. For example, during data transmission, the wireless transceiver 210 creates complex symbols by encoding and modulating transmitted bit strings. Further, during data reception, the wireless transceiver 210 restores the received bit strings through demodulation and decoding of the baseband signal.

Further, the wireless transceiver 210 up-converts the baseband signal into a radio frequency (RF) band signal to transmit the RF band signal through an antenna, and it down-converts the RF band signal received through the antenna into a baseband signal. For this, the wireless transceiver 210 may include a transmission filter, a reception filter, an amplifier, a mixer, an oscillator, a digital-to-analog converter (DAC), and an analog-to-digital converter (ADC). Further, the wireless transceiver 210 may include a plurality of transmission/reception paths. Further, the wireless transceiver 210 may include at least one antenna array composed of a plurality of antenna elements.

From the viewpoint of hardware, the wireless transceiver 210 may be composed of a digital unit and an analog unit, and the analog unit may be composed of a plurality of sub-units in accordance with an operation power and an operation frequency. The digital unit may be implemented by at least one processor (e.g., digital signal processor (DSP)).

As described above, the wireless transceiver 210 transmits and receives a signal. Accordingly, the whole or a part of the wireless transceiver 210 may be called a transmitter, a receiver, or a transceiver. Further, in the following description, it may be meant that the transmission and reception performed through the radio channel includes performing of the above-described process by the wireless transceiver 210. According to an embodiment, the wireless transceiver 210 may include at least one transceiver.

The backhaul communication unit 220 provides an interface for performing communication with other nodes in a network. That is, the backhaul communication unit 220 converts a bit string transmitted from the base station to another node, for example, another access node, another base station, a higher node, or a core network, and it converts a physical signal received from the other node into a bit string.

The memory 230 stores therein a base program for an operation of the base station, an application program, and data of configuration information. The memory 230 may be composed of a volatile memory, a nonvolatile memory, or a combination of the volatile memory and the nonvolatile memory. Further, the memory 230 provides the stored data in accordance with a request from the controller 240. According to an embodiment, the memory 230 may include a memory.

The controller 240 controls the overall operations of the base station. For example, the controller 240 transmits and receives a signal through the wireless transceiver 210 or the backhaul communication unit 220. Further, the controller 240 records and writes data in the memory 230. Further, the controller 240 may perform protocol stack functions required in the communication standards. According to another implementation, the protocol stack may be included in the wireless transceiver 210. According to an embodiment, the controller 240 may include at least one processor.

According to various embodiments, the controller 240 may perform a control operation so that the base station performs operations according to various embodiments to be described later. For example, the controller 240 may perform the channel access procedure for the unlicensed band. For example, the transceiver (e.g., wireless transceiver 210) may receive signals transmitted in the unlicensed band, and the controller 240 may determine whether the unlicensed band is in an idle state by comparing the intensity of the received signal with a threshold value predefined or determined by a value of a function having a bandwidth as a factor. For example, the controller 240 may transmit a control signal to the terminal through the transceiver, or it may receive the control signal from the terminal. The controller 240 may determine the result of transmitting the signal to the terminal based on the control signal or data signal received from the terminal. For example, the controller 240 may maintain or change a contention window value for the channel access procedure (hereinafter referred to as "perform contention window adjustment"). According to various embodiments, the controller 240 may determine a reference slot in order to acquire the transmission result for the contention window adjustment. The controller 240 may determine a reference control channel for the contention window adjustment in the reference slot. If it is determined that the unlicensed band is in an idle state, the controller 240 may occupy the channel.

Figure 3:
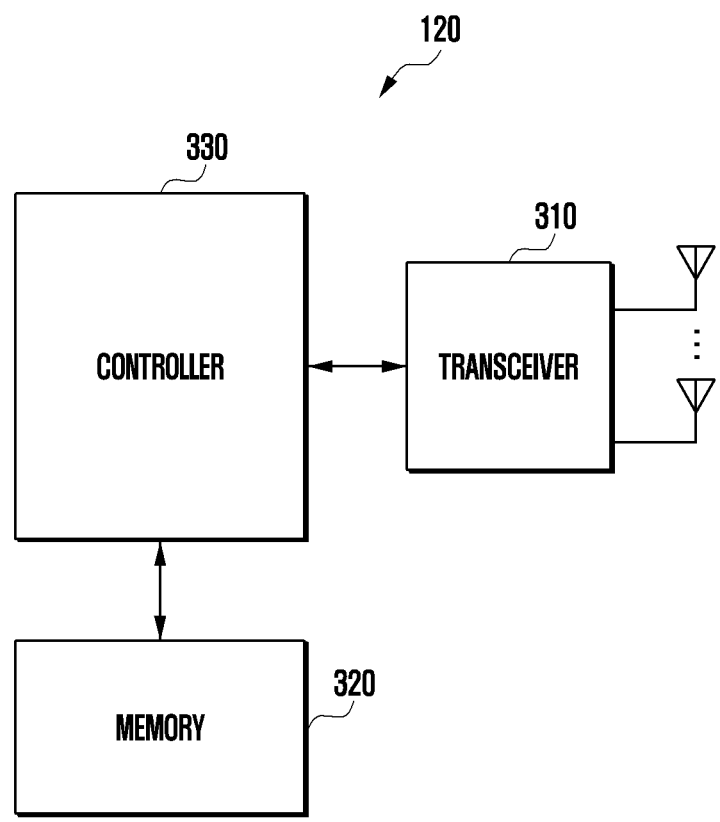
FIG. 3 is a diagram illustrating the configuration of a terminal in a wireless communication system according to an embodiment of the disclosure.

FIG. 3 illustrates the configuration of a terminal in a wireless communication system according to an embodiment of the disclosure. The configuration exemplified in FIG. 3 may be understood as the configuration of the terminal 120. The term "~unit" or "~er", as used hereinafter, may mean a unit for processing at least one function or operation, and it may be implemented by software, hardware, or a combination of the software and the hardware.

Referring to FIG. 3, the terminal includes a transceiver 310, a memory 320, and a controller 330.

The transceiver 310 performs functions for transmitting and receiving a signal through a radio channel. For example, the transceiver 310 performs a conversion function between a baseband signal and a bit string in accordance with physical layer standards of a system. For example, during data transmission, the transceiver 310 creates complex symbols by encoding and modulating transmitted bit strings. Further, during data reception, the transceiver 310 restores the received bit strings through demodulation and decoding of the baseband signal. Further, the transceiver 310 up-converts the baseband signal into an RF band signal to transmit the RF band signal through an antenna, and it down-converts the RF band signal received through the antenna into a baseband signal. For example, the transceiver 310 may include a transmission filter, a reception filter, an amplifier, a mixer, an oscillator, a DAC, and an ADC.

Further, the transceiver 310 may include a plurality of transmission/reception paths. Further, the transceiver 310 may include at least one antenna array composed of a plurality of antenna elements. From the viewpoint of hardware, the transceiver 310 may be composed of a digital circuit and an analog circuit (e.g., radio frequency integrated circuit (RFIC)). Here, the digital circuit and the analog circuit may be implemented by one package. Further, the transceiver 310 may include a plurality of RF chains. Further, the transceiver 310 may perform beamforming.

As described above, the transceiver 310 transmits and receives a signal. Accordingly, the whole or a part of the transceiver 310 may be called a transmitter or a receiver. Further, in the following description, it may be meant that the transmission and reception performed through the radio channel includes performing of the above-described process by the transceiver 310. According to an embodiment, the transceiver 310 may include at least one transceiver.

The memory 320 stores therein a base program for an operation of the terminal, an application program, and data of configuration information. The memory 320 may be composed of a volatile memory, a nonvolatile memory, or a combination of the volatile memory and the nonvolatile memory. Further, the memory 320 provides the stored data in accordance with a request from the controller 330. According to an embodiment, the memory 320 may include a memory.

The controller 330 controls the overall operations of the terminal. For example, the controller 330 transmits and receives a signal through the transceiver 310. Further, the controller 330 records and writes data in the memory 320. Further, the controller 330 may perform protocol stack functions required in the communication standards. For this, the controller 330 may include at least one processor or a microprocessor, or it may be a part of the processor. According to an embodiment, the controller 330 may include at least one processor. Further, according to an embodiment, a part of the transceiver 310 and/or the controller 330 may be called a communication processor (CP).

According to various embodiments, the controller 330 may perform a control operation so that the terminal performs operations according to various embodiments to be described later. For example, the controller 330 may receive a downlink signal (downlink control signal or downlink data) transmitted by the base station through the transceiver (e.g., transceiver 310). For example, the controller 330 may determine the result of transmitting the downlink data. The transmission result may include feedback information on ACK, NACK, and DTX of the transmitted downlink signal. In the disclosure, the transmission result may be called various terms, such as a reception state of the downlink signal, reception result, decoding result, and HARQ-ACK information. For example, the controller 330 may transmit an uplink signal to the base station through the transceiver as a response signal to the downlink signal. The uplink signal may explicitly or implicitly include the result of transmitting the downlink signal.

The controller 330 may perform the channel access procedure for the unlicensed band. For example, the transceiver (e.g., transceiver 310) may receive signals transmitted in the unlicensed band, and the controller 330 may determine whether the unlicensed band is in an idle state by comparing the intensity of the received signal with a threshold value predefined or determined by a value of a function having a bandwidth as a factor. The controller 330 may perform an access procedure for the unlicensed band to transmit the signal to the base station.

Figure 4:
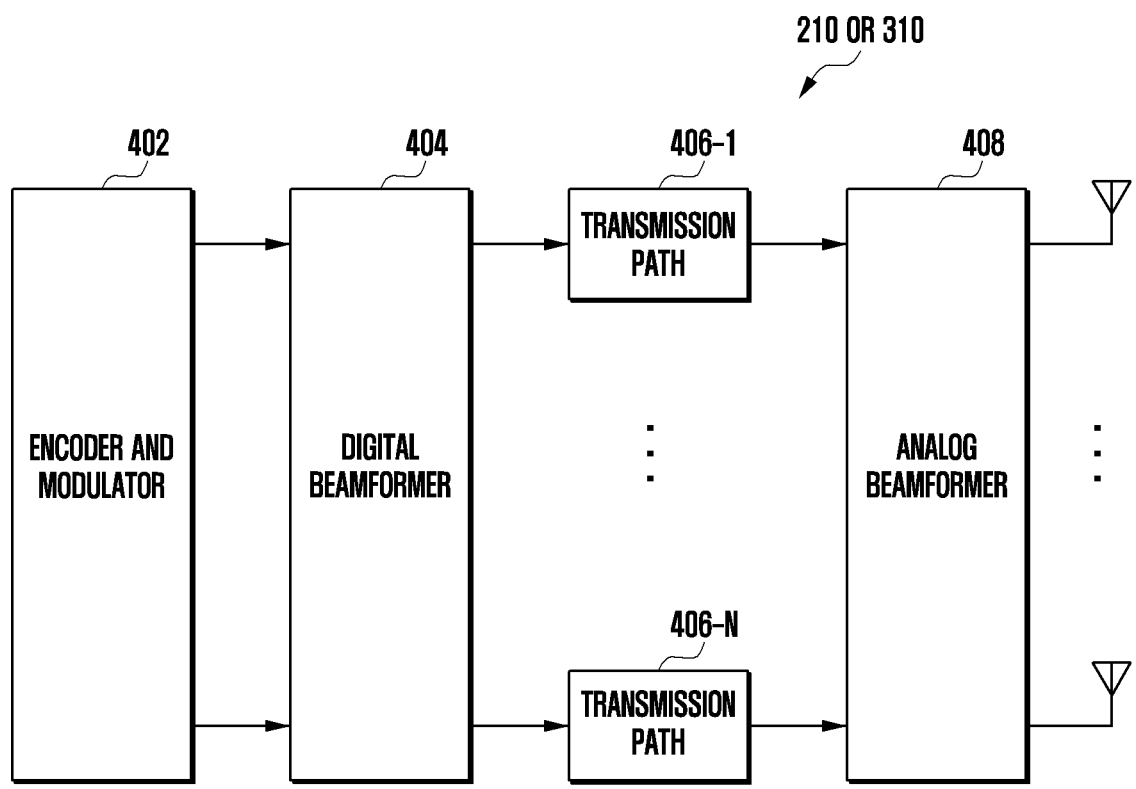
FIG. 4 is a diagram illustrating the configuration of a communication unit in a wireless communication system according to an embodiment of the disclosure.

FIG. 4 illustrates the configuration of a communication unit in a wireless communication system according to an embodiment of the disclosure. FIG. 4 illustrates an example of a detailed configuration of the wireless transceiver 210 of FIG. 2 or the communication unit 310 of FIG. 3. Specifically, FIG. 4 exemplifies constituent elements for performing beamforming as a part of the wireless transceiver 210 of FIG. 2 or the communication unit 310 of FIG. 3.

Referring to FIG. 4, the wireless transceiver 210 or the transceiver 310 includes an encoder and modulator 402, a digital beamformer 404, a plurality of transmission paths 406-1 to 406-N, and an analog beamformer 408.

The encoder and modulator 402 performs channel encoding. For such channel encoding, at least one of a low density parity check (LDPC) code, a convolution code or a polar code. The encoder and modulator 402 creates modulation symbols by performing constellation mapping.

The digital beamformer 404 performs beamforming for digital signals (e.g., modulation symbols). For this, the digital beamformer 404 multiplies the modulation symbols by beamforming weights. Here, the beamforming weight is used to change the level and the phase of the signal, and it may be called a precoding matrix or precoder. The digital beamformer 404 outputs digitally beamformed modulation symbols to the plurality of transmission paths 406-1 to 406-N. In this case, in accordance with a multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N converts the digitally beamformed digital signals into analog signals. For this, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for an orthogonal frequency division multiplexing (OFDM) scheme, and if a different physical layer scheme (e.g., filter bank multicarrier (FBMC)) is applied, the CP insertion unit may be omitted. That is, the plurality of transmission paths 406-1 to 406-N provide independent signal processes with respect to a plurality of streams created through the digital beamforming. However, in accordance with implementation schemes, some constituent elements of the plurality of transmission paths 406-1 to 406-N may be commonly used.

The analog beamformer 408 performs beamforming for analog signals. For this, the analog beamformer 408 multiplies the analog signals by beamforming weights. Here, the beamforming weight is used to change the level and the phase of the signal. Specifically, the analog beamformer 408 may be variously configured in accordance with connection structures between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As still another example, the plurality of transmission paths 406-1 to 406-N may be adaptively connected to one antenna array, or they may be connected to two or more antenna arrays.

In a 5G system, it is necessary to flexibly define a frame structure in consideration of various services and requirements. For example, respective services may have different subcarrier spacings in accordance with the requirements. The 5G communication system currently supports a plurality of subcarrier spacings, and the subcarrier spacing may be determined by mathematical expression 1.

$$\Delta f = f_0 2^m \qquad \text{Mathematical expression 1}$$

In the mathematical expression 1, $f_o$ denotes a base subcarrier spacing of the system, m denotes a scaling factor of an integer, and $\Delta f$ denotes a subcarrier spacing. For example, if $f_0$ is 15 kHz, a subcarrier spacing set that the 5G communication system can have may be composed of one of 3.75 kHz, 7.5 kHz, 15 kHz, 30 kHz, 60 kHz, 120 kHz, 240 kHz, and 480 kHz. An available subcarrier spacing set may differ depending on the frequency band. For example, in the frequency band that is equal to or lower than 6 GHz, 3.75 kHz, 7.5 kHz, 15 kHz, 30 kHz, and 60 kHz may be used, whereas in the frequency band that is higher than 6 GHz, 60 kHz, 120 kHz, and 240 kHz may be used.

In various embodiments, the duration of the corresponding OFDM symbol may differ depending on the subcarrier spacing constituting an OFDM symbol. This is because, according to the feature of the OFDM symbol, the subcarrier spacing and the OFDM symbol duration are in a reciprocal relationship with each other. For example, if the subcarrier spacing is increased twice, the symbol duration is reduced to ½, and in contrast, if the subcarrier spacing is reduced to ½, the symbol duration is lengthened twice.

Figure 5:
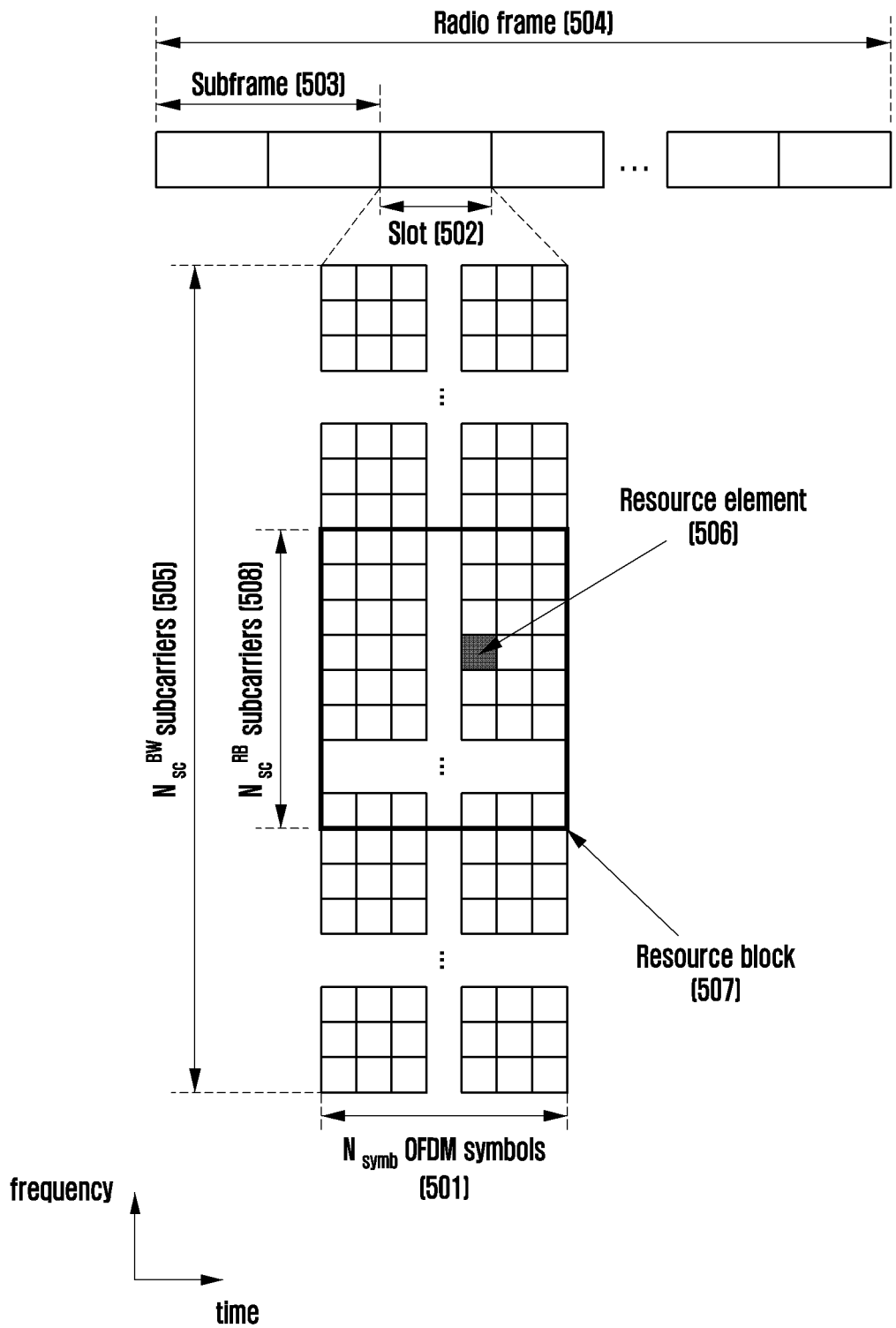
FIG. 5 is a diagram illustrating an example of a radio resource region in a wireless communication system according to an embodiment of the disclosure.

FIG. 5 illustrates an example of a radio resource region in a wireless communication system according to an embodiment of the disclosure. In various embodiments, the radio resource region may include a structure of a time-frequency region. In various embodiments, the wireless communication system may include an NR communication system.

Referring to FIG. 5, in the radio resource region, a horizontal axis represents a time domain, and a vertical axis represents a frequency domain. In the time domain, the minimum transmission unit may be an orthogonal frequency division multiplexing (OFDM) and/or discrete Fourier transform (DFT)-spread-OFDM (DFT-s-OFDM) symbol, and $N_{symb}$ OFDM symbols 102 and/or DFT-s-OFDM symbols 501 may be gathered to constitute one slot 502. In various embodiments, the OFDM symbols may include symbols in case of transmitting/receiving signals using the OFDM multiplexing scheme, and the DFT-s-OFDM symbols may include symbols in case of transmitting/receiving signals using DFT-s-OFDM or single carrier frequency division multiple access (SC-FDMA) multiplexing scheme. Hereinafter, in the disclosure, for convenience in explanation, an embodiment for OFDM symbols will be described, but such an embodiment is also applicable to an embodiment for DFT-s-OFDM symbols. Further, although an embodiment of the disclosure for OFDM symbols will be described for convenience in explanation, such an embodiment may also be applicable to an embodiment for DFT-s-OFDM symbols. Further, although an embodiment of the disclosure for downlink signal transmission and reception will be described for convenience in explanation, such an embodiment may also be applicable to an embodiment for uplink signal transmission and reception.

If a subcarrier spacing (SCS) is 15 kHz, in contrast with that illustrated in FIG. 5, one slot 502 constitutes one subframe 503, and the duration of the slot 502 or the subframe 503 may be 1 ms. In various embodiments, the number of slots 502 that constitute one subframe 503 and the duration of the slot 502 may differ in accordance with the subcarrier spacing. For example, if the subcarrier spacing is 30 kHz, two slots 502 may constitute one subframe 503. In this case, the duration of the slot 502 is 0.5 ms, and the duration of the subframe 503 is 1 ms. Further, a radio frame 504 may be a time domain interval that is composed of 10 subframes. In the frequency domain, the minimum transmission unit is a subcarrier, and the carrier bandwidth configuring a resource grid may be composed of $N_{SC}^{BW}$ subcarriers 505 in total.

However, the subcarrier spacing, the number of slots 502 included in the subframe 503, the duration of the slot 502, and the duration of the subframe 503 may be variably applied. For example, in case of an LTE system, the subcarrier spacing is 15 kHz, and two slots constitute one subframe 503. In this case, the duration of the slot 502 may be 0.5 ms, and the duration of the subframe 503 may be 1 ms. In another example, in case of an NR system, the subcarrier spacing μ may be one of 15 kHz, 30 kHz, 60 kHz, 120 kHz, and 240 kHz, and the number of slots included in one subframe in accordance with the subcarrier spacing μ may be 1, 2, 4, 8, or 16.

In the time-frequency domain, the basic unit of resources may be a resource element (RE) 506, and the resource element 506 may be expressed by an OFDM symbol index and a subcarrier index. In an LTE system, a resource block (RB) (or physical resource block (PRB)) may be defined by $N_{symb}$ successive OFDM symbols in the time domain and $N_{SC}^{RB}$ successive subcarriers in the frequency domain. The number of symbols included in one RB may be $N_{symb}=14$, the number of subcarriers may be $N_{SC}^{RB}=12$, and the number of RBs ($N_{RB}$) may be changed in accordance with the bandwidth of the system transmission band. In the NR system, the resource block (RB) 507 may be defined by $N_{SC}^{RB}$ successive subcarriers 508. The number of subcarriers may be $N_{SC}^{RB}=12$. The frequency domain may include common resource blocks (CRBs), and the physical resource block (PRB) may be defined in the bandwidth part (BWP) on the frequency domain. The numbers of CRB and PRB may be differently determined in accordance with the subcarrier spacing.

Downlink control information may be transmitted in initial N OFDM symbol(s) within the slot. In general, the number may be N={1, 2, 3}, and a terminal may be configured with the number of symbols, in which the downlink control information can be transmitted through higher layer signaling, by a base station. Further, in accordance with the quantity of control information to be transmitted in the current slot, the base station may change the number of symbols, in which the downlink control information can be transmitted in the slot, for each slot, and it may transfer information on the number of symbols to the terminal on a separate downlink control channel.

In the NR and/or LTE system, scheduling information on downlink data or uplink data may be transferred from the base station to the terminal through downlink control information (DCI). In various embodiments, the DCI may be defined in accordance with various formats, and each format may indicate whether the DCI includes scheduling information on the uplink data (e.g., UL grant) or scheduling information on the downlink data (DL grant), whether the DCI is a compact DCI having small-sized control information or a fall-back DCI, whether spatial multiplexing using multiple antennas is applied, and/or whether the DCI is a DCI for power control.

For example, a DCI format that is the scheduling control information on the downlink data (DL grant) (e.g., DCI format 1_0 of the NR) may include at least one of the following control information.

Control information (DCI) format identifier: This is an identifier for identifying a DCI format.
Frequency domain resource assignment: This indicates RBs allocated for data transmission.
Time domain resource assignment: This indicates slots and symbols allocated for data transmission.
VRB-to-PRB mapping: This indicates whether to apply a virtual resource block (BRB) mapping scheme.
Modulation and coding scheme (MCS): This indicates a modulation scheme used for data transmission and the size of a transport block (TB) that is data intended to be transmitted.
New data indicator: This indicates whether an HARQ is initially transmitted or retransmitted.
Redundancy version: This indicates a redundancy version of an HARQ.
HARQ process number: This indicates the process number of an HARQ.
PDSCH assignment information (downlink assignment index): This indicates the number of PDSCH reception results (e.g., the number of HARQ-ACKs) to be reported from a terminal to a base station.
Transmit power control (TCP) command for a physical uplink control channel (PUCCH): This indicates a transmit power control command for a PUCCH that is an uplink control channel
PUCCH resource indicator: This indicates PUCCH resources used to report an HARQ-ACK including the reception result for a PDSCH configured through corresponding DCI.
PUCCH transmit timing indicator (PDSCH-to-HARQ feedback timing indicator): This indicates slot or symbol information in which a PUCCH for HARQ-ACK report including the reception result for a PDSCH configured through corresponding DCI should be transmitted.

The DCI may pass through a channel coding and modulation process, and it may be transmitted on a physical downlink control channel (PDCCH) that is a downlink physical control channel (or control information, hereinafter being interchangeably used) or an enhanced PDCCH (EPDCCH) (or enhanced control information, hereinafter being interchangeably used). Hereinafter, transmission/reception of the PDCCH or EPDCCH may be understood as DCI transmission/reception on the PDCCH or EPDCCH, and transmission/reception of the physical downlink shared channel (PDSCH) may be understood as downlink data transmission/reception on the PDSCH.

In various embodiments, a cyclic redundancy check (CRC) scrambled with a specific radio network temporary identifier (RNTI) (or terminal identifier (C-RNTI (Cell-RNTI)) that is independent with respect to each terminal may be added to the DCI, and the DCI for each terminal may be channel-coded and then is configured and transmitted on the independent PDCCH. In the time domain, the PDCCH may be transmitted at a control channel transmission interval. In the frequency domain, the PDCCH mapping location may be determined by at least an identifier (ID) of each terminal, and it may be transmitted in the whole system transmission band or in a configured frequency band of the system transmit band. Further, in the frequency domain, the PDCCH mapping location may be configured by higher layer signaling.

The downlink data may be transmitted on a physical downlink shared channel (PDSCH) that is a physical channel for transmitting the downlink data. The PDSCH may be transmitted after the control channel transmission interval, and in the frequency domain, scheduling information, such as a PDSCH mapping location and a PDSCH modulation scheme, may be determined based on the DCI transmitted on the PDCCH.

Through the modulation and coding scheme (MCS) among the control information constituting the DCI, the base station may notify the terminal of the modulation scheme applied to the PDSCH to be transmitted and the transport block size (TBS) of the data to be transmitted. In various embodiments, the MCS may be composed of 5 bits or more or less. The TBS corresponds to the size of the data (transport block (TB)) that the base station intends to transmit before the channel coding for error correction is applied to the TB.

In the NR system, the modulation scheme supported for uplink and downlink data transmission may include at least one of quadrature phase shift keying (QPSK), 16 quadrature amplitude modulation (16 QAM), 64 QAM, or 256 QAM, and respective modulation orders $Q_m$ may be 2, 4, 6, and 8. That is, in case of the QPSK modulation, 2 bits per symbol may be transmitted, and in case of the 16 QAM modulation, 4 bits per symbol may be transmitted. Further, in case of the 64 QAM modulation, 6 bits per symbol may be transmitted, and in case of the 256 QAM modulation, 8 bits per symbol may be transmitted. Further, in accordance with the system modification, a modulation scheme over the 256 QAM may be used.

In case of a system that performs communication in an unlicensed band, a communication device (base station or terminal) that intends to transmit a signal through the unlicensed band may perform a channel access procedure or listen-before talk (LBT) for the unlicensed band intended to perform communication before the signal is transmitted, and if it is determined that the unlicensed band is in an idle state in accordance with the channel access procedure, the communication device may perform the signal transmission by accessing the unlicensed band. If it is determined that the unlicensed band is not in the idle state in accordance with the performed channel access procedure, the communication device may not perform the signal transmission.

The channel access procedure in the unlicensed band may be discriminated depending on whether the start time of the channel access procedure of the communication device is fixed (frame-based equipment (FBE)) or is variable (load-based equipment (LBE)). In addition to the start time of the channel access procedure, the communication device may be determined as an FBE device or an LBE device depending on whether the transmit/receive structure of the communication device has one period or does not have the period. Here, the fact that the start time of the channel access procedure is fixed means that the channel access procedure of the communication device may start periodically in accordance with a predefined period or a period declared or configured by the communication device. As another example, the fact that the start time of the channel access procedure is fixed may mean that the transmission or reception structure of the communication device has one period. Here, the fact that the start time of the channel access procedure is variable means that the channel access procedure of the communication device can start any time when the communication device intends to transmit the signal through the unlicensed band. As still another example, the fact that the start time of the channel access procedure is variable means that the transmission or reception structure of the communication device does not have one period, but it may be determined as needed.

Hereinafter, the channel access procedure (hereinafter, traffic-based channel access procedure or LBE-based channel access procedure) in case that the start time of the channel access procedure of the communication device is variable (load-based equipment (LBE)) will be described.

The channel access procedure in the unlicensed band may include a procedure of determining an idle state of the unlicensed band by measuring the intensity of the signal being received through the unlicensed band for a fixed time or a time calculated in accordance with a predefined rule (e.g., time calculated through at least one random value selected by the base station or the terminal), and comparing the measured signal intensity with a predefined threshold value or a threshold value that is calculated by a function of determining the intensity level of the received signal in accordance with at least one variable among a channel bandwidth, a signal bandwidth in which a signal intended to be transmitted is transmitted, and/or a transmission power intensity.

For example, the communication device may measure the signal intensity for X μs (e.g., 25 μs) immediately before the time when the signal is transmitted, and if the measured signal intensity is lower than a predefined or calculated threshold value T (e.g., −72 dBm), the communication device may determine that the unlicensed band is in an idle state, and it may transmit the configured signal. In this case, the maximum time when successive signal transmission is possible after the channel access procedure may be limited depending on the maximum channel occupancy time defined for each country, area, or frequency band in accordance with each unlicensed band, and it may also be limited depending on the kind of the communication device (e.g., base station or terminal, or master or slave). For example, in case of Japan, in the 5 GHz unlicensed band, a base station or a terminal may transmit a signal by occupying a channel with respect to an unlicensed band that is determined to be in an idle state after performing the channel access procedure without performing an additional channel access procedure for the maximum time of 4 ms.

More specifically, in case where the base station or the terminal intends to transmit a downlink or uplink signal using the unlicensed band, the channel access procedure that can be performed by the base station or the terminal may be discriminated into at least the following types.

Type 1: It transmits an uplink/downlink signal after performing the channel access procedure for a variable time.

Type 2: It transmits an uplink/downlink signal after performing the channel access procedure for a fixed time.

Type 3: It transmits an uplink or downlink signal without performing the LBT procedure for determining channel occupancy by another node in the channel access procedure.

A transmission device (e.g., base station or terminal) that intends to transmit a signal in an unlicensed band may determine the type of the channel access procedure in accordance with the kind of the signal to be transmitted. In the 3rd Generation Partnership Project (3GPP), the LBT procedure that is the channel access scheme may be divided into four categories. The four categories may include a first category in which the LBT is not performed, a second category in which the LBT is performed without random backoff, a third category in which the LBT is performed through the random backoff in a contention window of a fixed size, and a fourth category in which the LBT is performed through the random backoff in a contention window of a variable size. According to an embodiment, in case of type 1, the third and fourth categories may be exemplified, and in case of type 2, the second category may be exemplified. Further, in case of type 3, the first category may be exemplified.

In the disclosure, for convenience in explanation, it may be assumed that the transmission device is the base station, and the transmission device and the base station may be interchangeably used.

For example, in case that the base station intends to transmit a downlink signal including a downlink data channel in the unlicensed band, the base station may perform the channel access procedure of type 1. Further, in case that the base station intends to transmit a downlink signal that does not include a downlink data channel in the unlicensed band, for example, in case that the base station intends to transmit a synchronization signal or a downlink control channel, the base station may perform the channel access procedure of type 2, and it may transmit a downlink signal.

In this case, the type of the channel access procedure may be determined in accordance with the transmission interval of the signal intended to be transmitted in the unlicensed band, the time for occupying and using the unlicensed band, or the size of a spacing. In general, in type 1, the channel access procedure may be performed for a longer time than the time when the channel access procedure is performed in type 2. Accordingly, if the communication device intends to transmit the signal for a short duration or for a time that is equal to or shorter than a reference time (e.g., X ms or Y symbols), the channel access procedure of type 2 may be performed. In contrast, in case that the communication device intends to transmit the signal for a long duration or for a time that exceeds the reference time (e.g., X ms or Y symbols), the channel access procedure of type 1 may be performed. In other words, in accordance with the usage time of the unlicensed band, different types of channel access procedures may be performed.

In case that the transmission device performs the channel access procedure of type 1 in accordance with at least one of the above-described references, the transmission device that intends to transmit the signal in the unlicensed band may determine a channel access priority class (or channel access priority) in accordance with a quality of service class identifier (QCI) of the signal intended to be transmitted in the unlicensed band, and it may perform the channel access procedure using at least one of predefined configuration values as in Table 1 with respect to the determined channel access priority class. Table 1 below shows a mapping relationship between the channel access priority class and the QCI.

For example, QCI 1, 2, or 4 may mean a QCI value for a service, such as conversational voice, conversational video (live streaming), or non-conversational video (buffered streaming). If it is intended to transmit the signal for the service that does not match the QCI of Table 1 in the unlicensed band, the transmission device may select the QCI that is closest to the QCI of Table 1, and it may select the channel access priority class for the selected QCI.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

In various embodiments, parameter values for the channel access priority class (e.g., defer duration in accordance with a determined channel access priority p, a set $CW_p$ of contention window values or sizes, and minimum and maximum values $CW_{min,p}$ and $CW_{max,p}$ of the contention window, and the maximum channel occupancy possible duration $T_{mcot,p}$) may be determined as in Table 2. Table 2 shows parameter values for the channel access priority class in case of a downlink.

Figure 6:
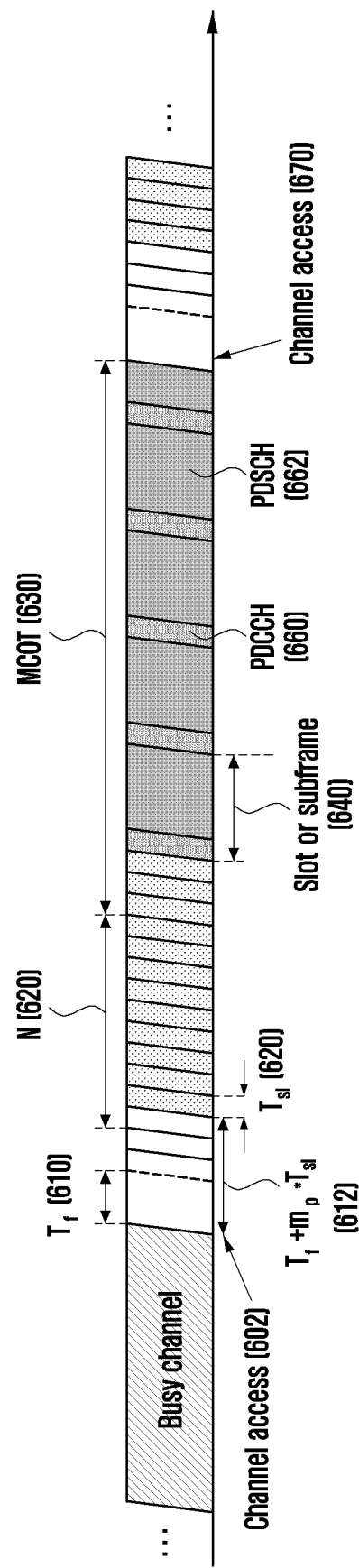
FIG. 6 is a diagram illustrating an example of a channel access procedure in an unlicensed band in a wireless communication system according to an embodiment of the disclosure.

FIG. 6 is a diagram illustrating an example of a channel access procedure in an unlicensed band in a wireless communication system according to an embodiment of the disclosure. A situation in which a base station performs a channel access procedure for occupying an unlicensed band will be described. The base station 110 of FIG. 1 is exemplified as the base station.

Referring to FIG. 6, the base station that intends to transmit a downlink signal in the unlicensed band may perform the channel access procedure for the unlicensed band for the minimum time of $T_f+m_p*T_{sl}$ (e.g., defer duration 612 of FIG. 6). If the base station intends to perform the channel access procedure with the channel access priority class 3 (p=3), the size of $T_f+m_p*T_{sl}$ may be configured using $m_p=3$ with respect to the defer duration size $T_f+m_p*T_{sl}$ that is necessary to perform the channel access procedure. Here, $T_f$ is a value fixed to 16 μs (e.g., duration 610 of FIG. 6), and the initial time $T_{sl}$ should be in an idle state, and at the remaining time $T_f-T_{sl}$ after the time $T_{sl}$ among the time $T_f$, the base station may not perform the channel access procedure. In this case, even if the base station has performed the channel access procedure at the remaining time $T_f-T_{sl}$, the result of the channel access procedure may not be used. In other words, the time $T_f-T_{sl}$ is the time when the base station defers the performing of the channel access procedure.

If it is determined that the unlicensed band is in the idle state at all the time $m_p*T_{sl}$, the number N may be N=N−1. In this case, the number N may be selected as a certain integer value among values between 0 and the contention window value $CW_p$ at the time when the channel access procedure is performed. In case of the channel access priority class 3, the minimum contention window value and the maximum contention window value are 15 and 63, respectively. If it is determined that the unlicensed band is in the idle state in the defer duration and an additional duration when the channel access procedure is performed, the base station may transmit the signal through the unlicensed band for the time $T_{mcot,p}$ (8 ms). Meanwhile, Table 2 shows channel access priority classes (or channel access priorities) in a downlink. In the disclosure, for convenience in explanation, embodiments are described based on the downlink channel access priority classes. In case of an uplink, the channel access priority classes in Table 2 may be used in the same manner, or separate channel access priority classes for the uplink transmission may be used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value $CW_p$ is the minimum contention window value $CW_{min,p}$. The base station having selected the value N may perform the channel access procedure in the duration $T_{sl}$ (e.g., slot duration 620 of FIG. 6), and if it is determined that the unlicensed band is in the idle state through the channel access procedure performed in the duration $T_{sl}$, the base station may change the value N to N=N−1. In case of N=0, the base station may transmit the signal through the unlicensed band for the maximum time $T_{mcot,p}$ (e.g., maximum occupancy time 630 of FIG. 6). If the unlicensed band that is determined through the channel access procedure at the time Ti is not in the idle state, the base station may re-perform the channel access procedure without changing the value N. The size of the contention window value $CW_p$ may be changed or maintained in accordance with the ratio Z of the NACK among the reception results ACK/NACK for the downlink data (i.e., downlink data received in a reference subframe or reference slot or reference transmit time interval (reference TTI)) which one or more terminals having received the downlink data transmitted through the downlink data channel (PDSCH 662) and the downlink control information transmitted through the downlink control channel (PDCCH 660) in the reference subframe or reference slot or reference transmit time interval (reference TTI) have transmitted or reported to the base station. In this case, the reference subframe or reference slot or reference transmit time interval (reference TTI) may be determined as the first subframe or slot or transmit time interval (TTI) of the downlink signal transmission interval (or the maximum channel occupancy time (MCOT)) that the base station has transmitted most recently through the unlicensed band at the time when the base station starts the channel access procedure, at the time when the base station selects the value N in order to perform the channel access procedure, or immediately before the two time points, or the start subframe or start slot or start transmission interval of the transmission interval.

With reference to FIG. 6, the base station may attempt the channel access in order to occupy the unlicensed band. The first slot (or start slot starting the channel occupancy time) or subframe or transmission interval 640 of the downlink signal transmission interval (channel occupancy time (hereinafter, COT) 630), which the base station has transmitted most recently through the unlicensed band at the time 670 when the base station starts the channel access procedure, at the time when the base station selects the value N in order to perform the channel access procedure, or immediately before the time points, may be defined as the reference slot or reference subframe or reference transmission interval. For convenience in explanation, this is hereinafter expressed as the reference slot. Specifically, one or more successive slots including the first slot in which the signal is transmitted among the entire slots of the downlink signal transmission interval 630 may be defined as the reference slot. Further, according to an embodiment, if the downlink signal transmission interval starts after the first symbol of the slot, the slot in which the downlink signal transmission starts and the next slot may be defined as the reference slot. In the reference slot, if the ratio of the NACK is equal to or higher than Z among the reception results for the downlink data that one or more terminals having received the downlink data transmitted through the downlink data channel in the reference slot have transmitted or reported to the base station, the base station may determine the contention window value or size being used in the channel access procedure 670 of the corresponding base station as the contention window value or size that is larger than the contention window value or size used in the previous channel access procedure 602. In other words, the base station may increase the size of the contention window used in the channel access procedure 602. The base station may perform the next channel access procedure 670 by selecting the value N 633 within a range defined in accordance with the contention window having the increased size.

If the base station is unable to acquire the reception result for the downlink data channel transmitted by the base station in the reference slot of the transmission interval 630, for example, if the time interval between the reference slot and the time 670 when the base station starts the channel access procedure is equal to or less than n slots or symbols (in other words, if the base station starts the channel access procedure before the minimum time when the terminal can report, to the base station, the result of receiving the downlink data channel transmitted in the reference slot), the first slot of the latest downlink signal transmission interval transmitted before the downlink signal transmission interval 630 may become the reference slot.

In other words, if the base station is unable to receive the result of receiving the downlink data transmitted from the terminal at the time 670 when the base station starts the channel access procedure, or at the time when the base station selects the value N to perform the channel access procedure, or immediately before the time points, the base station may determine the contention window using the result of receiving the downlink data of the terminal for the reference slot in the most recently transmitted downlink signal transmission interval among the results of receiving the downlink data channel already received from the terminals. Further, the base station may determine the contention window size that is used in the channel access procedure 670 using the results of receiving the downlink data received from the terminals with respect to the downlink data transmitted on the downlink data channel in the reference slot.

For example, if 80% or more of the results of receiving the downlink data transmitted to the terminal on the downlink data channel in the reference slot among the downlink signals transmitted through the unlicensed band is determined as the NACK, the base station, having transmitted the downlink signal through the channel access procedure (e.g., $CW_p=15$) that is configured in accordance with the channel access priority class 3 (p=3), may increase the contention window from the initial value ($CW_p=15$) to the next contention window value ($CW_p=31$). The ratio value of 80% is exemplary, and various modifications thereof are possible.

If 80% or more of the reception results of the terminal is not determined as the NACK, the base station may maintain the contention window value as the existing value or it may change the contention window value to the initial value. In this case, the change of the contention window may be commonly applied to all the channel access priority classes, or it may be applied only to the channel access priority classes used in the channel access procedure. In this case, a method for determining the reception result that is effective to the determination of the change of the contention window size among the reception results for the downlink data that the terminal has transmitted or reported to the base station with respect to the downlink data transmitted on the downlink data channel in the reference slot in which the change of the contention window size is determined, in other words, a method for determining the value Z, is as follows.

In case that the base station transmits one or more codewords (CWs) or TBs to one or more terminals in the reference slot, the base station may determine the value Z by the ratio of the NACK among the reception results transmitted or reported by the terminal with respect to the TB received by the terminal in the reference slot. For example, if two codewords or two TBs are transmitted to one terminal in the reference slot, the base station may receive, from the terminal, (a report of) the result of receiving the downlink data signal for two TBs. If the ratio Z of the NACK of the two reception results is predefined or is equal to or higher than a threshold value (e.g., Z=80%) configured between the base station and the terminal, the base station may change or increase the contention window size.

In this case, if the terminal transmits or reports the result of receiving the downlink data for one or more slots (e.g., M slots) including the reference slot to the base station through bundling, the base station may determine that the terminal has transmitted the M reception results. Further, the base station may determine the value Z as the ratio of the NACK among the M reception results, and it may change, maintain, or initialize the contention window size.

If the reference slot corresponds to the second slot of two slots included in one subframe, or if the downlink signal is transmitted from the symbol after the first symbol in the reference slot, the reference slot and the next slot may be determined as the reference slot, and the value Z may be determined as the ratio of the NACK among the reception results that the terminal transmits or reports to the base station with respect to the downlink data received in the reference slot.

Further, the base station may determine the value Z by determining the reception result of the terminal as the NACK if scheduling information or downlink control information for the downlink data channel transmitted by the base station is transmitted from the cell or the frequency band that is equal to the cell or the frequency band in which the downlink data channel is transmitted, if scheduling information or downlink control information for the downlink data channel transmitted by the base station is transmitted through the unlicensed band or from the cell or the frequency band that is different from the cell or the frequency band in which the downlink data channel is transmitted, if it is determined that the terminal does not transmit the reception result for the downlink data received in the reference slot, or if it is determined that the reception result for the downlink data transmitted by the terminal is at least one of discontinuous transmission (DTX), NACK/DTX, or any state.

Further, if it is determined that the reception result for the downlink data transmitted by the terminal is at least one of the DTX, NACK/DTX, or any state in case that the scheduling information or downlink control information for the downlink data channel transmitted by the base station is transmitted through a licensed band, the base station may not reflect the reception result of the terminal in the reference value Z of the contention window variation. In other words, the base station may determine the value Z through disregarding of the reception result of the terminal.

Further, if the base station transmits the scheduling information or downlink control information for the downlink data channel through the licensed band, or if the base station does not actually transmit the downlink data (no transmission) among the reception results for the downlink data for the reference slot that the terminal has transmitted or reported to the base station, the base station may determine the value Z through disregarding of the reception result transmitted or reported by the terminal with respect to the downlink data.

Hereinafter, the channel access procedure in case that the start time of the channel access procedure of the communication device is fixed (frame-based equipment (FBE)) (hereinafter, frame-based channel access procedure or FBE-based channel access procedure) will be described using FIG. 7.

Figure 7:
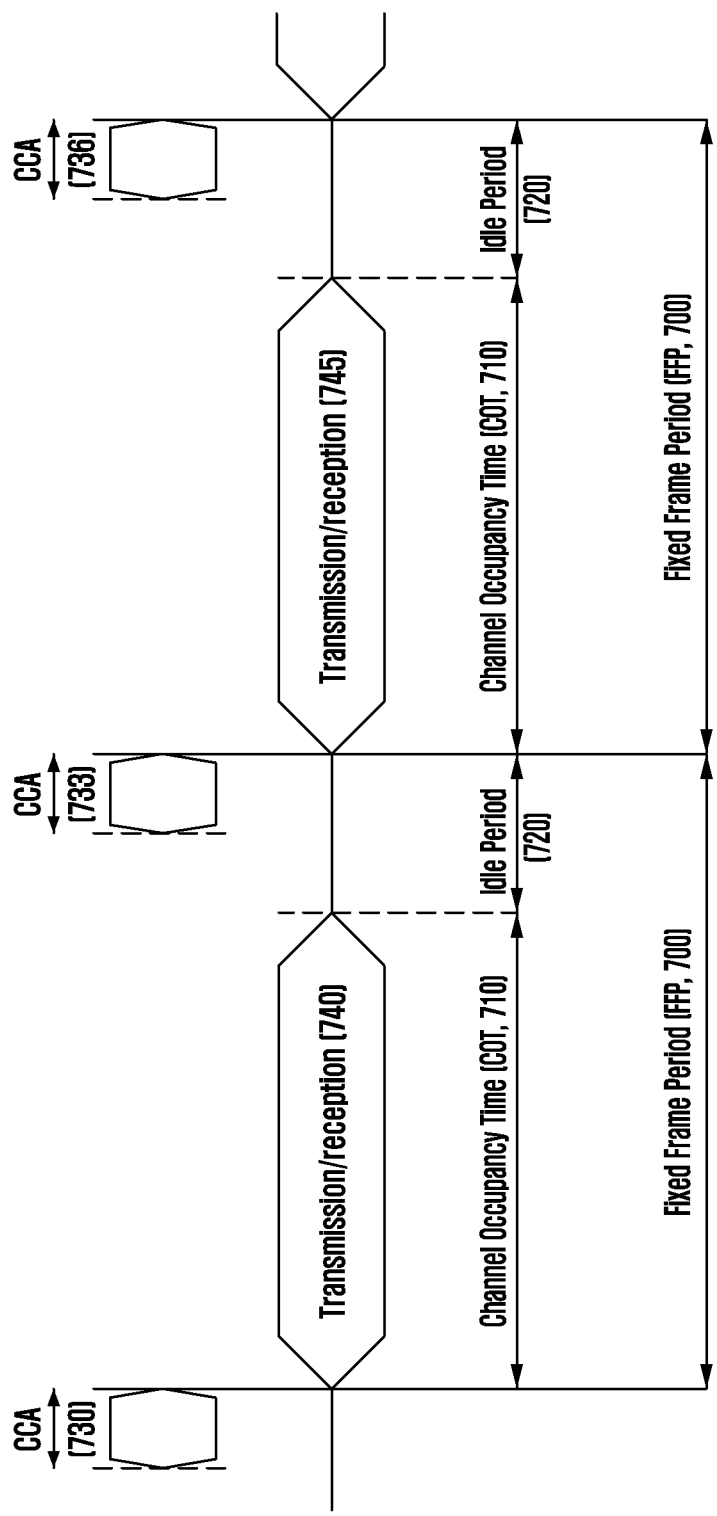
FIG. 7 is a diagram illustrating another example of a channel access procedure in an unlicensed band in a wireless communication system according to an embodiment of the disclosure.

FIG. 7 illustrates another example of a channel access procedure in an unlicensed band in a wireless communication system according to an embodiment of the disclosure.

Referring to FIG. 7, a communication device that performs a frame-based channel access procedure may periodically transmit and receive signals in accordance with a fixed frame period (FFP). Here, the fixed frame period 700 may be declared or configured by the communication device (e.g., base station), and it can be configured in the range of 1 ms to 10 ms. In this case, the channel access procedure for the unlicensed band (or clear channel access (CCA)) may be performed immediately before the start of each frame period 730, 733, and 736, and in the same manner as the above-described channel access procedure of type 2, the channel access procedure may be performed for a fixed time or for one observation slot. If the unlicensed band is in an idle state as the result of the channel access procedure or if it is determined that the unlicensed band is in the idle state, the communication device may transmit and receive signals (740, 745) without performing a separate channel access procedure for maximally 95% of the fixed frame period 700 (hereinafter, channel occupancy time (COT) 710). In this case, minimally 5% of the fixed frame period 700 is an idle time 720 for which the signals are unable to be transmitted or received, and the channel access procedure may be performed within the idle time 720.

The frame-based channel access procedure has the advantage that it is relatively simpler than the traffic-based channel access procedure, and it can periodically perform the channel access of the unlicensed band. However, because the start time of the channel access procedure is fixed, the probability to be able to access the unlicensed band may be decreased in comparison to the traffic-based channel access procedure.

Figure 8:
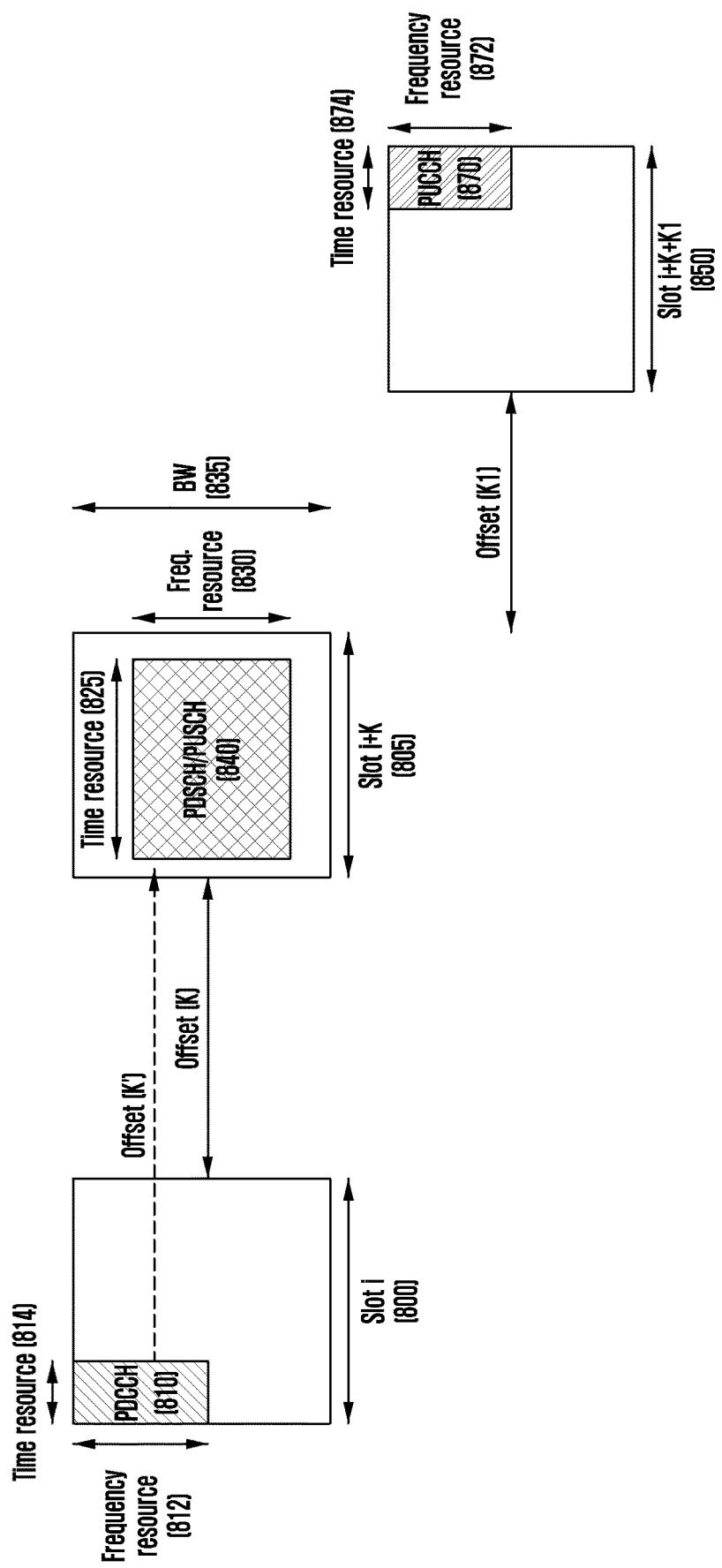
FIG. 8 is a diagram illustrating an example of scheduling and feedback in a wireless communication system according to an embodiment of the disclosure.

FIG. 8 is a diagram illustrating an example of scheduling and feedback in a wireless communication system according to an embodiment of the disclosure. A base station may transmit control information including downlink and/or uplink scheduling to a terminal. The base station may transmit downlink data to the terminal. The terminal may transmit HARQ-ACK information that is a feedback of the downlink data to the base station. Further, the terminal may transmit uplink data to the base station. In an NR system, an uplink and downlink HARQ scheme may include an asynchronous HARQ scheme in which a data retransmission time is not fixed. For example, in case of a downlink, if the base station receives a feedback of HARQ NACK from the terminal with respect to initially transmitted data, the base station may freely determine the transmission time of retransmitted data in accordance with a scheduling operation. The terminal may perform buffering of the data that is determined as an error as the result of decoding the received data for the HARQ operation, and then the terminal may perform combining of the buffered data with the data retransmitted from the base station. The base station exemplifies the base station 110 of FIG. 1. The terminal exemplifies the terminal 120 or the terminal 130 of FIG. 1.

Referring to FIG. 8, resource regions on which data channels are transmitted in a 5G or NR communication system. A terminal may monitor and/or search for a PDCCH 810 in a downlink control channel (hereinafter, PDCCH) region (hereinafter, control resource set (CORESET) or search space (SS)). In this case, the downlink control channel region may be composed of information of a time domain 814 and a frequency domain 812, and the information of the time domain 814 may be configured in the unit of a symbol, whereas the information of the frequency domain 812 may be configured in the unit of an RB or an RB group.

If the terminal detects the PDCCH 810 in slot i 800, the terminal may acquire downlink control information (DCI) transmitted on the detected PDCCH 810. Through the received downlink control information (DCI), the terminal may acquire scheduling information on a downlink data channel or an uplink data channel 840. In other words, the DCI may include at least resource region (or PDSCH transmission region) information on which the terminal should receive the downlink data channel (hereinafter, PDSCH) transmitted from the base station or resource region information that the terminal is allocated with from the base station for uplink data channel (PUSCH) transmission.

A case where the terminal is scheduled with the uplink data channel (PUSCH) transmission will be described as an example. The terminal having received the DCI may acquire a slot index or offset information K required to receive the PUSCH through the DCI, and it may determine a PUSCH transmission slot index. For example, the terminal may determine to be scheduled to transmit the PUSCH in slot i+K 805 through the received offset information K based on the slot index i 800 having received the PDCCH 810. In this case, the terminal may determine slot i+K 805 or a PUSCH start symbol or time in the slot i+K through the received offset information K based on the CORESET having received the PDCCH 810.

Further, the terminal may acquire information on a PUSCH transmission time-frequency resource region 840 in the PUSCH transmission slot 805 through the DCI. The PUSCH transmission frequency resource region information 830 may include a physical resource block (PRB) or group unit information of the PRB. Meanwhile, the PUSCH transmission frequency resource region information 830 may be information on a region included in an initial uplink bandwidth (BW) or an initial uplink bandwidth part (BWP) 835 that is determined or configured through the initial access procedure for the terminal. If the terminal is configured with the uplink bandwidth (BW) or the uplink bandwidth part (BWP) through a higher signal, the PUSCH transmission frequency resource region information 830 may be information about the region included in the uplink bandwidth (BW) or the uplink bandwidth part (BWP) configured through the higher signal.

In various embodiments, PUSCH transmission time resource region information 825 may be a symbol or symbol group unit information, or it may be information indicating absolute time information. The PUSCH transmission time resource region information 825 may be expressed as a combination of a PUSCH transmission start time or the symbol and the duration of the PUSCH or PUSCH end time or the symbol, and it may be included in the DCI as one field or value. The terminal may transmit the PUSCH on the PUSCH transmission resource region 840 determined through the DCI.

In various embodiments, the terminal having received the PDSCH 840 may report (feedback) the reception result for the PDSCH 840 (e.g., HARQ-ACK/NSCK) to the base station. In this case, the transmission resource of the uplink control channel (PUCCH) 870 for transmitting the reception result for the PDSCH 840 may be determined by the terminal based on a PDSCH-to-HARQ timing indicator indicated through the DCI of the PDCCH 810 for scheduling the PDSCH 840 and a PUCCH resource indicator. In other words, the terminal having received the PDSCH-to-HARQ timing indicator K1 through the DCI of the PDCCH 810 may transmit the PUCCH 870 in the slot i+K+K1 850 after K1 from the reception slot 805 of the PDSCH 840. In this case the uplink control channel region may be composed of information of a time domain 874 and a frequency domain 872.

The base station may configure one or more values K1 to the terminal through higher layer signaling or it may indicate a specific value K1 to the terminal through the DCI as described above. The value K1 may be determined in accordance with the HARQ-ACK processing capability of the terminal, in other words, in accordance with the minimum time required for the terminal to receive the PDSCH and to create and report the HARQ-ACK for the PDSCH.

Further, the terminal may use a predefined value or a default value as the value K1 until the terminal is configured with the value K1.

In this case, the PUCCH 870 transmission resource in the PUCCH transmission slot 850 may be indicated through the PUCCH resource indicator of the DCI, and the terminal may perform the PUCCH transmission on the indicated resource. In this case, if transmission of a plurality of PUCCHs is configured or indicated in the PUCCH transmission slot 850, the terminal may perform the PUCCH transmission on the PUCCH resource except the resource indicated through the PUCCH resource indicator of the DCI of the PDCCH 810.

In the 5G communication system, in order to dynamically change intervals of downlink signal transmission and uplink signal transmission in a time division duplex (TDD) system, it may be indicated by a slot format indicator (SFI) whether respective OFDM symbols constituting one slot are downlink symbols, uplink symbols, or flexible symbols. Here, the symbols indicated as flexible symbols may be neither of the downlink and uplink symbols or may be symbols that can be changed to the downlink or uplink symbols by UE-specific control information or scheduling information. In this case, the flexible symbol may include a gap guard that is necessary in a process of changing from the downlink to the uplink.

The slot format indicator may be simultaneously transmitted to a plurality of terminals through terminal group (or cell) common control channels. In other words, the slot format indicator may be transmitted on the PDCCH that is CRC-scrambled with an identifier (e.g., SF-RNTI) that is different from the terminal unique identifier (C-RNTI (cell-RNTI)). In various embodiments, the slot format indicator may include information on N slots, and the value N may be an integer or a natural number value that is larger than 0, or it may be a value that the base station configures to the terminal through the higher signal from a set of predefined possible values, such as 1, 2, 5, 10, and 20. Further, the size of the slot format indicator information may be configured by the base station to the terminal through the higher signal. An example of the slot format that can be indicated by the slot format indicator is indicated as in Table 3.

TABLE 3

| | Symbol numbers (or indexes) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | F | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

TABLE 3-continued

| | Symbol numbers (or indexes) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | F | F | F | F | F | F | U | U | U |
| 45 | D | D | D | D | D | D | F | F | U | U | U | U | U | U |
| 46 | D | D | D | D | D | F | U | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | Reserved | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In Table 3, D means a downlink, U means an uplink, and F means a flexible symbol. According to Table 3, the total number of supportable slot formats is 256. In the current NR system, the maximum size of the slot format indicator information bits is 128 bits, and the slot format indicator information bit is a value that the base station can configure to the terminal through a higher signal (e.g., dci-Payload-Size).

In various embodiments, the slot format indicator information may include slot formats for a plurality of serving cells, and the slot formats for the respective serving cells may be discriminated from each other through serving cell IDs. Further, a slot format combination of slot format indicators for one or more slots may be included for each serving cell. For example, if the size of the slot format indicator information bits is 3 bits, and the slot format indicator information is composed of slot format indicators for one serving cell, the 3-bit slot format indicator information may be composed of eight slot format indicators or a slot formation indicator combination (hereinafter, slot format indicator) in total, and the base station may indicate one of the eight slot format indicators through terminal group common control information (group common DCI) (hereinafter, slot format indicator information).

In various embodiments, at least one of the 8 slot format indicators may be composed of a slot format indicator for a plurality of slots. For example, Table 4 shows an example of 3-bit slot format indicator information composed of slot formats of Table 3. Five slot format indicators (slot format combination IDs 0, 1, 2, 3, and 4) of the slot format indicator information may be slot format indicators for one slot, and the remaining three slot format indicators may be information on slot formation indicators (slot format combination IDs 5, 6, and 7) for four slots, and they may be successively applied to the four slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal may receive configuration information of the PDCCH for detecting the slot format indicator information through the higher signal, and it may detect the slot format indicators in accordance with the configuration. For example, the terminal may be configured with at least one of CORESET configuration for detecting the slot format indicator information, search space configuration, RNTI information used for CRC scrambling of the DCI for transmitting the slot format indicator information, a search space period, or offset information.

Figure 9A:
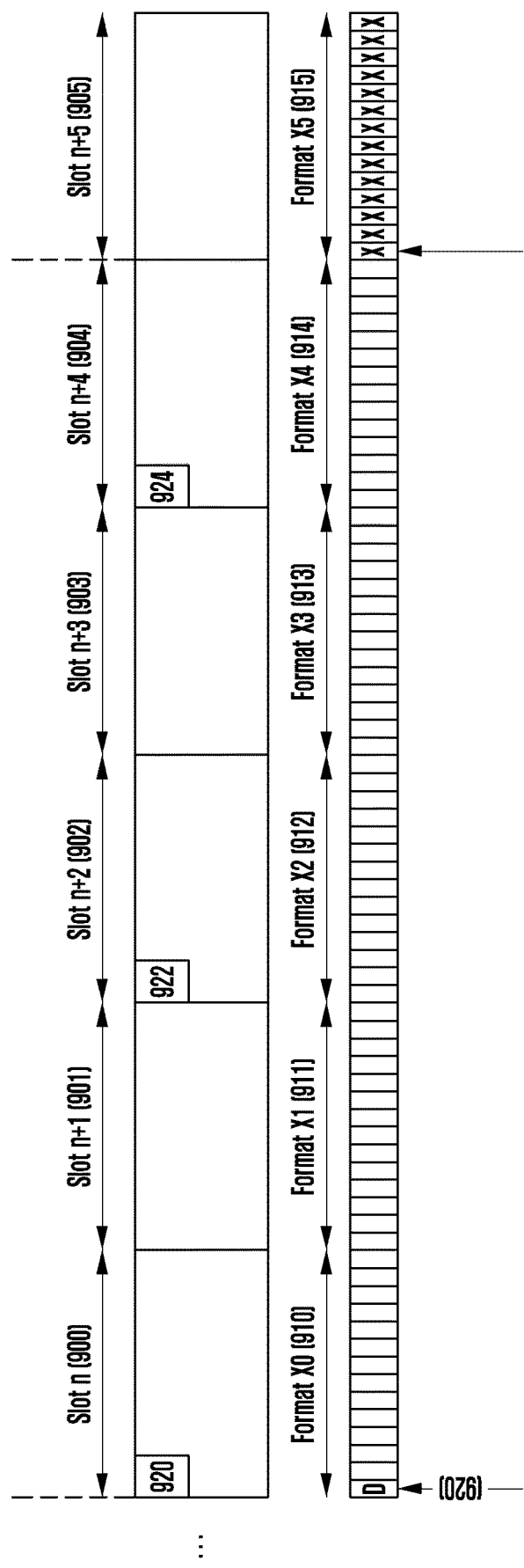
FIG. 9A is a diagram illustrating an example of a channel occupancy time and a slot format in a wireless communication system according to an embodiment of the disclosure.

FIG. 9A illustrates a channel occupancy time in a wireless communication system according to an embodiment of the disclosure.

FIG. 9A illustrates a case where PDCCH regions 920, 922, and 924 in which a terminal should detect slot format indicator information are provided, and the period of the PDCCH region is of 2 slots. In other words, the terminal may detect DCI that is CRC-scrambled with slot format indicator identifiers (e.g., SFI-RNTI or new RNTI) in the PDCCH regions 920, 922, and 924 (or CORESET) in slot n 900, slot n+2 902, and slot n+4 904 in accordance with the configured PDCCH region and the period thereof, and it may acquire the slot format indicator for two slots through the detected DCI. In this case, the detected DCI may include slot format indicator information for two or more slots, and for how many slots the slot format indicators are included in the DCI may be configured through a higher signal. Configuration information regarding for how many slots the slot format indicators are included in the DCI may be included in the higher signal that is equal to the higher signal for configuring the slot format indicator information.

Referring to FIG. 9A, the terminal may acquire slot formation indicator information 910 and 911 for slot n 900 and slot n+1 901 in the PDCCH region 920 of slot n 900. Similarly, the terminal may acquire slot formation indicator information 912 and 913 for slot n+2 902 and slot n+3 903 in the PDCCH region 922 of slot n+2 902. In this case, the slot formation indicator information 910, 911, 912, 913, and 914 may have may have at least one value of the format of Table 3. In this case, it is also possible to have a new format in addition to the format of Table 3.

If the base station transmits the slot format indicator information in an unlicensed band, and in particular, if the slot format indicator information includes the slot format indicators for a plurality of slots, the base station may be unable to determine the slot format indicator information for at least one slot depending on whether to access the channel in the unlicensed band. When transmitting the slot format indicator information 914 and 915 for slot n+4 904 and slot n+5 905 on PDCCH 924, it is necessary for the base station to determine how to indicate the slot format indicator information of slot n+5 905. For example, the base station may indicate that the slot format indicator for the time except the channel occupancy time is flexible.

Hereinafter, a method for allocating an uplink resource will be described. The uplink resource for transmitting a signal or data may be allocated successively or non-successively, and if a specific resource allocation type is determined, information indicating the uplink resource allocation is construed in accordance with the specific resource allocation type.

Uplink Resource Allocation Type 0

The uplink resource allocation type 0 scheme is a resource allocation scheme in the unit of resource block groups (RBGs) each of which is composed of P successive resource blocks (RBs). In this case, the size P of the RBG may be configured as one of configuration 1 and configuration 2 through a higher signal, for example, rbg-size value of pusch-Config, and P may be determined as in Table 5 based on the information and the size of the enabled uplink bandwidth part. Table 5 is a table representing the size of the bandwidth part and the size of P in accordance with the RBG configuration value. In this case, the size of the bandwidth part corresponds to the number of PRBs constituting the bandwidth part.

TABLE 5

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The uplink bandwidth part $N_{BWP}$ may be determined as the total number of RBGs $N_{RBG}$=ceiling $(N_{BWP}^{size}+N_{BWP}^{start}$ mod P)/P). Here, the size of the first RBG $RBG_0$ is $P-N_{BWP}^{start}$ mod P. If the size of $(N_{BWP}^{start}+N_{BWP}^{size})$ mod P is larger than 0, the size of the last RBG $RBG_{last}$ becomes $(N_{BWP}^{start}+N_{BWP}^{size})$ mod P, whereas if the size of $(N_{BWP}^{start}+N_{BWP}^{size})$ mod P is not larger than 0, the size of the last RBG $RBG_{last}$ becomes P. The size of the remaining RBGs except the first and last RBGs becomes P. In this case, $N_{BWP}^{start}$ means a CRB in which the BWP starts relatively to $CRB_0$, and it may be understood as a point where a specific BWP starts in the CRB. $N_{BWP}^{size}$ means the number of RBs included in the BWP. In this case, the length (or the size or the number of bits) of the frequency resource allocation information is equal to $N_{RBG}$, and the terminal can be configured or scheduled with resources on which uplink transmission is configured or scheduled for each RBG in the unit of the RBG through a bitmap composed of $N_{RBG}$ bits. For example, the terminal may determine that the RBG region configured as 1 in the bitmap is a resource allocated for the uplink transmission, and it may determine that the RBG region configured as 0 is not the resource allocated for the uplink transmission. In this case, the RBG bitmap is aligned and mapped sequentially (in an ascending order) on an axis on which the frequency is increased. Through this method, the successive or non-successive RBGs may be allocated for the uplink transmission.

Uplink Resource Allocation Type 1

The uplink resource allocation type 1 scheme is a successive frequency resource allocation scheme within the enabled uplink bandwidth part. The frequency resource allocation information of the uplink resource allocation type 1 scheme may be indicated to the terminal through a resource indication value (RIV). The length (or size or the number of bits) of the frequency resource allocation information is the same as ceiling($\log_2(N_{BWP}(N_{BWP}+1)/2)$). The RIV indicates a frequency resource allocation start RB $RB_{start}$ and successively allocated L RBs $L_{RBs}$.

if $(L_{RBs} - 1) \leq \left\lfloor \frac{N_{BWP}}{2} \right\rfloor$ then $RIV = N_{BWP}(L_{RBs} - 1) + RB_{start}$ Else, $RIV = N_{BWP}(N_{BWP} - L_{RBs} + 1) + (N_{BWP} - 1 - RB_{start})$ where, $L_{RBs} \geq 1$ and shall not exceed $N_{BWP} - RB_{start}$ Here, $N_{BWP}$ is the size of the enabled uplink bandwidth part and it is expressed by the number of PRBs. $RB_{start}$ is the first PRB starting the uplink resource allocation, and $L_{RBs}$ is the length or the number of successive PRBs. In this case, if one of the DCI (hereinafter, UL grant) that configures or schedules the uplink transmission, for example, DCI format 0_0, is transmitted in a common search space (CSS), the size $N_{BWP,0}$ of an initial bandwidth part is used.

Further, in case of one DCI format of the UL grant, for example, DCI format 0_0 that is transmitted from a UE-specific common search space (USS), the size or the number of bits of the frequency resource allocation information of the UL grant is determined as the size of the initial bandwidth part $N_{initial,BWP}$, but in case of the DCI for the UL grant to schedule another enabled bandwidth part, the RIV values are $RB_{start}=0$, K, 2K, . . . , $(N_{initial,BWP}-1)\cdot K$ and $L_{RBs}=K, 2K, \ldots, N_{initial,BWP}\cdot K$, and they are configured as follows.

if $(L'_{RBs} - 1) \le \lfloor \frac{N_{initial,BWP}}{2} \rfloor$ then $RIV = N_{initial,BWP}(L'_{RBs} - 1) + RB'_{start}$ Else, $RIV = N_{initial,BWP}(N_{initial,BWP} - L'_{RBs} + 1) + (N_{initial,BWP} - 1 - RB'_{start})$ where, $L'_{RBs} = \frac{L_{RBs}}{K}$, $RB'_{start} = \frac{RB_{start}}{K}$, and where $L'_{RBs}$ shall not exceed $N_{initial,BWP} - RB'_{start}$ In this case, in case of $N_{active,BWP} > N_{initial,BWP}$ in a state where the bandwidth of another enabled bandwidth part is $N_{active,BWP}$, K is a natural number that satisfies $K \le \lfloor \frac{N_{active,BWP}}{N_{initial,BWP}} \rfloor$, and otherwise, K becomes K=1.

Uplink Resource Allocation Type 2

The uplink resource allocation type 2 scheme is an allocation scheme so that uplink signal or channel transmission frequency resources are distributed over the whole enabled uplink bandwidth part, and it is so featured that distances or intervals between the allocated frequency resources are equal or equivalent to each other. According to the uplink resource allocation type 2, the resource allocation is uniformly distributed on the whole frequency band, and thus the uplink resource allocation type 2 may be limitedly applied in case of transmitting uplink signals or channels that are transmitted in a carrier, cell, or bandwidth part operating in an unlicensed band in which frequency allocation requirements, such as power spectral density (PSD) requirements or occupancy channel bandwidth (OCB) conditions, should be satisfied.

Figure 9B:
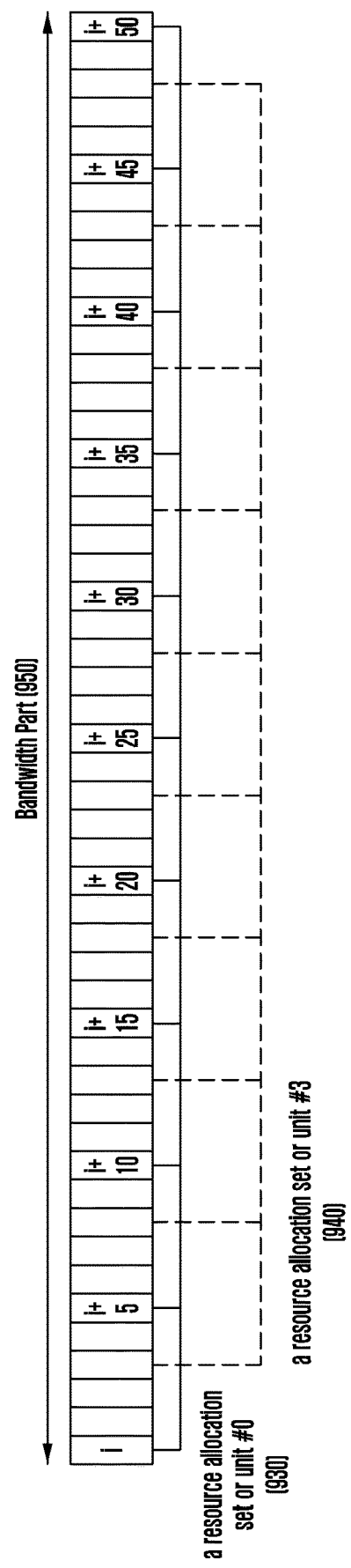
FIG. 9B is a diagram explaining a method for allocating a frequency resource in a wireless communication system according to an embodiment of the disclosure.

Referring to FIG. 9B, the uplink resource allocation type 2 scheme will be described as follows.

FIG. 9B illustrates a case where the terminal is configured to perform uplink signal transmission/reception with the base station through a bandwidth part 950, and the terminal is scheduled with uplink data channel transmission through the uplink resource allocation type 2, and it is assumed that the bandwidth part 950 is composed of 51 PRBs according to an embodiment of the disclosure. In accordance with the uplink resource allocation type 2, the 51 PRBs may constitute L (in case of FIG. 9B, L=5) resource region sets, and each resource region set may be composed of $N = \lfloor \frac{N_{BWP}}{L} \rfloor$ or $N = \lfloor \frac{N_{BWP}}{L} \rfloor + 1$ PRBs. In case of FIG. 9B, the first resource region set 930 is composed of 11 PRBs (#i, #i+5, #i+10, #i+15, ..., #i+45, #i+50), and the remaining resource region set, for example, the fourth resource region set 940 is composed of 10 PRBs (#i+3, #i+8, #i+13, #i+18, ..., #i+48). In other words, the numbers of PRBs included in the resource region sets may differ in accordance with the size of the bandwidth part or the number of PRBs of the bandwidth part. The terminal may be allocated with one or more resource region sets configured as above, or it may be allocated with successive resource region sets (e.g., resource region set #0, #1 or #2, #3, and #4 through a method similar to the uplink resource allocation type 1 (e.g., allocation based on the RIV value), or it may be allocated with successive or non-successive resource region sets similarly to the uplink resource allocation type 0 (e.g., allocation based on a bitmap).

For example, in case that the terminal is allocated with the successive resource allocation region sets, in a similar manner to the uplink resource allocation type 1, the terminal may determine, if N resource region sets exist, allocated frequency resource regions (or allocated resource region sets) through the resource indication value (RIV) expressing a start resource region set $RB_{start}$ of the frequency resource allocation and L successive resource region sets, and in this case, the RIV value is as follows.

if $(L - 1) \le \lfloor \frac{N}{2} \rfloor$ then $RIV = N(L-1) + RB_{start}$

Else, $RIV = N(N - L + 1) + (N - 1 - RB_{start})$

For example, in case of RIV=0, this means the first resource region set or resource region set #0, and in this case, one resource region set composed of PRB #i, #i+10, #i+20, ..., and #i+50 of FIG. 9B. In this case, the length (or size or the number of bits) of the frequency resource allocation information may be ceiling ($\log_2(N(N+1)/2)$).

As another example, in case of being allocated with successive or non-successive resource region sets using the bitmap, an L-bit bitmap indicating L resource region sets constituting the bandwidth part 950 in an ascending order of frequency resources or in an ascending order of resource region set indexes may be configured, and the resource region sets may be allocated through the bitmap. For example, in case of FIG. 9B, the location of the resource region set may be indicated through the bitmap composed of 5 bits, and bitmap 10000 means that the first resource region set, that is, one resource region set composed of PRB #i, #i+10, #i+20, ..., and #i+50 of FIG. 9B, is allocated. Bitmap 00010 means that the fourth resource region set, that is, PRB #i+3, #i+8, #i+13, #i+18, ..., and #i+48 of FIG. 9B is allocated. IN this case, the length (or size or the number of bits) of the frequency resource allocation information may be L.

Uplink Resource Allocation Type 3

Figure 9C:
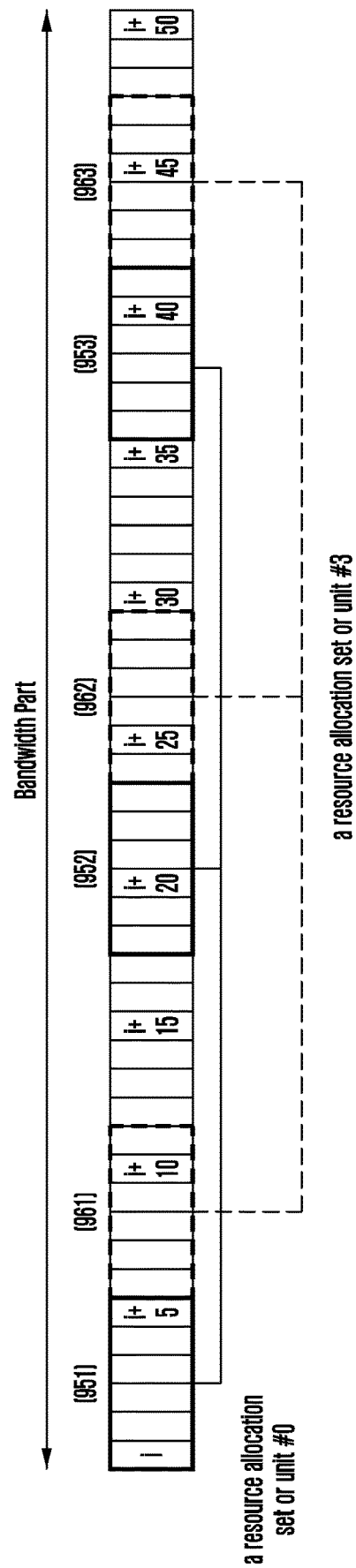
FIG. 9C is a diagram explaining another method for allocating a frequency domain resource in a wireless communication system according to an embodiment of the disclosure.

FIG. 9C is a diagram illustrating uplink resource allocation type 3 according to an embodiment of the disclosure.

Referring to FIG. 9C, the uplink resource allocation type 3 scheme is an allocation scheme so that uplink signal or channel transmission frequency resources are distributed over the whole enabled uplink bandwidth part, and it is so featured that allocated resource groups (or allocated resource blocks or allocated resource clusters) (e.g., 951 or 961) that are successive resources are entirely distributed within the bandwidth part through an iterative transmission scheme or the like (e.g., 951, 952, and 953, and 961, 962, and 963). That is, the allocated resource group 951 that is the successive resource may iteratively exist in the frequency resource, such as 951, 952, and 953, and accordingly, a plurality of allocated resource groups may exist in the bandwidth part. According to the uplink resource allocation type 3, the successive allocated resource groups (or blocks or clusters) are distributed in the frequency band, and thus the uplink resource allocation type 3 may be limitedly applied in case of transmitting uplink signals or channels that are transmitted in a carrier, cell, or bandwidth part operating in the unlicensed band in which frequency allocation requirements, such as power spectral density (PSD) requirements or occupancy channel bandwidth (OCB) conditions, should be satisfied.

In case of the base station and the terminal supporting the plurality of frequency resource allocation schemes (i.e., in case of the terminal predefined or configured to use the plurality of frequency resource allocation schemes), it is necessary to provide a method for correctly determining the frequency resource allocation scheme that should be applied during transmission of uplink signals or channels. Accordingly, in the disclosure, a method by the terminal for determining the frequency resource allocation scheme during transmission of the uplink signals or channels of the terminal is proposed.

Hereinafter, in various embodiments of the disclosure, for convenience in explanation, the uplink resource allocation scheme is divided into two schemes of a first scheme and a second scheme. Here, the first scheme means a scheme in which uplink signal transmission resources are successively allocated on a frequency axis like the uplink resource allocation type 1 scheme. The second scheme means a resource allocation scheme of the type in which the uplink signal transmission resources are uniformly distributed in the bandwidth part at equal intervals on the frequency axis like the uplink resource allocation type 2 scheme. In this case, expression of the uplink resource allocation type 1 as the first scheme and expression of the uplink resource allocation type 2 scheme as the second scheme are merely exemplary, and it is also possible to express the resource allocation schemes modified based on the types 1 and 2 as the first scheme and the second scheme. For example, the uplink resource allocation type 3 or 4 may be included in the first scheme and the second scheme (preferably, the type 3 or type 4 may be included in the second scheme). In this case, it may also be possible to classify the resource allocation type 2 or 4 into a third scheme.

Further, if the uplink resource allocation scheme is configured to a specific uplink resource allocation type, the base station may create uplink resource allocation information in accordance with the specific uplink resource allocation type, and the terminal may construe the uplink resource allocation information in accordance with the specific type. Hereinafter, the technology to configure the specific uplink resource allocation scheme may mean that the base station creates the uplink resource allocation information in accordance with the specific uplink resource allocation type (or in accordance with the resource allocation scheme modified based on the specific uplink resource allocation type) to transfer the created uplink resource allocation information as a higher signal or UL grant (DCI), and the terminal construes the uplink resource allocation information transferred to the higher signal or UL grant (DCI) in accordance with the specific uplink resource allocation type (or in accordance with the resource allocation scheme modified based on the specific uplink resource allocation type) to identify the allocated uplink resource.

First Embodiment

In this embodiment, a method is proposed, in which a base station and a terminal support a plurality of frequency resource allocation schemes, and the terminal determines a random access preamble (hereinafter, preamble or physical random access channel (PRACH)) transmission frequency resource allocation scheme or a frequency resource region (hereinafter, frequency resource allocation scheme).

In this embodiment, the base station may receive, from the terminal, information on functions or capability supportable by the terminal and including the frequency resource allocation scheme of the preamble that can be supported by at least the terminal, and through this, the base station may determine the frequency resource allocation scheme of the preamble that can be supported by the terminal. Thereafter, the base station may indicate or configure one or more preamble frequency resource allocation schemes to the terminal so that the terminal that supports a plurality of frequency resource allocation schemes can transmit the preamble in accordance with the frequency resource allocation scheme that the base station supports or the base station intends to receive from the terminal. Meanwhile, in an embodiment of the disclosure, the higher signal or system information configuration method for indicating or configuring the preamble resource allocation scheme (e.g., enable/disenable, enumerate, and choice) is merely exemplary, and the disclosure is not limited thereto.

Further, in the disclosure, a method for indicating or configuring the preamble frequency resource allocation scheme to the terminal will be described, but it may be also possible that the base station indicates or configures the preamble frequency resource region to the terminal, and the terminal determines the preamble frequency resource allocation scheme in accordance with the frequency resource region. In this case, the preamble frequency resource allocation scheme applied to the specific frequency resource region may be predetermined or it can be configured by the base station.

Method 1-1: Configuration of a Preamble Transmission Frequency Resource Allocation Scheme Through System Information or Higher Signal Hereinafter, the method 1-1 will be described in more detail. The method 1-1 is a method in which the base station indicates or configures the preamble transmission frequency resource allocation scheme to the terminal through the system information or higher signal. Because the preamble transmission frequency resource allocation scheme is indicated or configured through the system information, all the terminals can transmit the preamble through the same frequency resource allocation scheme in the bandwidth part in which the preamble is transmitted. In this case, the preamble transmission frequency resource allocation scheme may be included in random access related configuration information (e.g., rach-configcommon or prach-ConfigurationIndex) to be transmitted to the terminal. In this case, a default preamble transmission frequency resource allocation scheme between the base station and the terminal may be predefined. For example, the first scheme may be the default preamble transmission frequency allocation scheme (e.g., scheme for transmitting the preamble through K successive PRBs), and a scheme except the first scheme, for example, the frequency resource allocation scheme of the second scheme, may be enabled through the system information. If the frequency resource allocation scheme of the second scheme is enabled, the terminal determines the second scheme as the preamble transmission frequency resource allocation scheme. In this case, if the frequency resource allocation scheme of the second scheme is enabled, it may be possible that the terminal determines both the first scheme and the second scheme as the preamble transmission frequency resource allocation schemes, and in this case, the transmission frequency resource allocation scheme that the terminal should use during the preamble transmission may be determined through at least one of method 1-2 and method 1-3 proposed in embodiment 1.

Meanwhile, the preamble-transmittable frequency resource region may be determined through a higher signal (e.g., the smallest PRB index of the preamble-transmittable frequency resource region, the lowest frequency, or msg1-FrequencyStart), the number of preamble frequency multiplexing $n_{RA} \in \{0, 1, \ldots, M-1\}$ (here, M is a value configured as the higher signal (e.g., msg1-FDM)), and preamble-transmittable time domain resource information (e.g., prach-ConfigurationIndex).

As another example, the base station may designate and configures at least one of uplink resource allocation schemes to the terminal through the system information. For example, the base station may designate that the terminal uses one of the first scheme, or the second scheme, or one of the first and second schemes as the preamble resource allocation scheme. If both the first and second schemes are used for the preamble transmission frequency resource allocation, the terminal may determine the transmission frequency resource allocation scheme that should be used during the preamble transmission through at least one of method 1-2 and method 1-3 proposed in the embodiment 1.

Method 1-2: Determination of the Preamble Transmission Frequency Resource Allocation Scheme Depending on Whether the Preamble is Transmitted within a Channel Occupancy Time of the Base Station Hereinafter, the method 1-2 will be described in more detail. The method 1-2 is so featured that if the preamble transmission frequency resource allocation schemes are configured through the method 1-1, the preamble transmission frequency resource allocation schemes may differ depending on whether the preamble is transmitted within the channel occupancy time of the base station. Through this, the preamble transmission frequency resource allocation schemes may be identical to or different from each other depending on whether the preamble is transmitted within the channel occupancy time of the base station.

It is preferable that the base station controls the uplink signal transmission of terminals within the channel occupancy time in which the base station accesses and uses the channel after performing the channel access procedure. For example, the base station may transmit the DCI indicating the preamble transmission to at least one terminal on the downlink control channel, and the terminal having received this may transmit the preamble in accordance with the DCI. Further, the base station may indicate to transmit an uplink control channel (PUCCH) and a data channel (PUSCH) to the terminal, and the uplink signals and channels may be multiplexed. Accordingly, the base station is required to make the uplink signals and channels transmitted by the terminal in at least one slot or a transmission time interval be effectively multiplexed by making the uplink signals and channels have the same resource allocation scheme in at least the channel occupancy time. Accordingly, in the disclosure, a method is provided, in which the preamble transmission frequency resource allocation schemes are independently configured depending on whether at least the preamble is transmitted within the channel occupancy time of the base station.

For example, the terminal may be configured with the transmission resource allocation scheme (e.g., first scheme) in case of transmitting the preamble within the channel occupancy time of the base station and the transmission resource allocation scheme (e.g., second scheme) in case of transmitting the preamble in a time except the channel occupancy time of the base station from the base station through the system information or the higher signal. Further, the transmission resource allocation scheme in case of transmitting the preamble in the time except the channel occupancy time of the base station may be predefined between the base station and the terminal (e.g., default resource allocation scheme), and the transmission resource allocation scheme (e.g., first scheme) in case of transmitting the preamble within the channel occupancy time of the base station may be configured or enabled by the base station through the system information or the higher signal. Similarly, the transmission resource allocation scheme in case of transmitting the preamble within the channel occupancy time of the base station may be predefined between the base station and the terminal (e.g., default resource allocation scheme), and the transmission resource allocation scheme (e.g., first scheme) in case of transmitting the preamble in the time except the channel occupancy time of the base station may be configured or enabled by the base station through the system information or the higher signal. Further, if the terminal is not configured with the transmission resource allocation scheme in case of transmitting the preamble within the channel occupancy time of the base station, or if the transmission resource allocation scheme is not enabled, the terminal may apply the transmission resource allocation scheme in case of transmitting the preamble in the time except the channel occupancy time of the base station even to a case of transmitting the preamble within the channel occupancy time of the base station.

Similarly, the transmission resource allocation scheme in case of transmitting the preamble within the channel occupancy time of the base station may be predefined between the base station and the terminal (e.g., default resource allocation scheme), and the transmission resource allocation scheme (e.g., first scheme) in case of transmitting the preamble in the time except the channel occupancy time of the base station may be configured or enabled by the base station through the system information or the higher signal. In this case, if the terminal is not configured with the transmission resource allocation scheme in case of transmitting the preamble in the time except the channel occupancy time of the base station, or if the scheme is not enabled, the terminal may apply the transmission resource allocation scheme in case of transmitting the preamble within the channel occupancy time of the base station even to a case of transmitting the preamble within the channel occupancy time of the base station.

As described above, the terminal, having determined the transmission resource allocation scheme (e.g., first scheme) in case of transmitting the preamble within the channel occupancy time of the base station and the transmission resource allocation scheme (e.g., second scheme) in case of transmitting the preamble in the time except the channel occupancy time of the base station, may determine whether the preamble transmission time or the transmission slot is a time (or slot) within the channel occupancy time of the base station or a time (or slot) except the channel occupancy time, and the terminal may transmit the preamble through a correct transmission resource allocation scheme in accordance with the result of the determination. In this case, the terminal may determine whether the base station occupies the channel or whether the base station accesses the channel depending on whether to detect a reference signal (e.g., DMRS) transmitted by the base station, or the terminal may determine whether the base station occupies the channel through reception of information on whether the base station accesses the channel or information on the channel occupancy time of the base station that is transmitted by the base station through the downlink control channel.

In this case, the information on whether the base station accesses the channel or information on the channel occupancy time may be composed of not only information on the at least one bandwidth part and one transmission interval or slot but also at least one of a plurality of bandwidth parts or a plurality of slots. Further, the information on whether the base station accesses the channel or information on the channel occupancy time may be composed of information on one or more subband units having a smaller size than the size of the bandwidth part or information on one or more mini-slots or transmission time intervals or symbols composed of symbols that are smaller than symbols. For example, as shown in FIG. 9A, in case that the base station transmits a signal by accessing an unlicensed band channel after performing the channel access procedure, the base station may transmit the channel occupancy time, slot format indicator information 910, 911, 912, 913, and 914 within the channel occupancy time, or other information capable of determining this (e.g., channel occupancy start time and channel occupancy end time) to the terminal through the PDCCH. The terminal having received this may determine whether the preamble is transmitted within the determined channel occupancy time of the base station, and it may transmit the preamble according to the method 1-2 in accordance with the result of the determination.

Method 1-3: Determination of the Frequency Resource Allocation Scheme Through DCI Indicating the Preamble Transmission Hereinafter, the method 1-3 will be described in more detail. The method 1-3 is a method in which the preamble transmission frequency resource allocation scheme is independently configured depending on whether the preamble is transmitted through an indication of the base station or in accordance with the determination of the terminal without any separate base station indication in case that the transmission frequency resource allocation scheme of the preamble is configured through the method 1-1 or the like. Through this, the preamble transmission frequency resource allocation schemes may be identical to or different from each other in accordance with a case where the preamble is transmitted through the indication of the base station (or in case that the preamble is transmitted in a contention-free random access process) or a case where the preamble is transmitted in accordance with the determination of the terminal without any separate base station indication (or in case that the preamble is transmitted in a contention-based random access process).

Here, the case where the preamble is transmitted through the indication of the base station or the contention-free random access process means a case where the terminal, having received the DCI of which the CRC is scrambled with the RA-RNTI among the DCI being transmitted on the downlink control channel, transmits the preamble in accordance with the DCI configuration or indication information. Meanwhile, the case where the preamble is transmitted in accordance with the determination of the terminal without the indication of the base station or the contention-based random access process means a case where the terminal transmits the preamble for the purpose of an uplink data transmission resource request if the terminal transmits the preamble to initially access the cell or if the terminal is unable to be allocated with the resource for transmitting the uplink data from the base station.

Accordingly, in case that the preamble is transmitted in accordance with the indication of the base station, the terminal, having received, for example, the DCI of which the CRC is scrambled with the RA-RNTI among the DCI being transmitted on the downlink control channel, transmits the preamble in accordance with the information indicated or configured by the base station through the DCI. In the above case, the base station can indicate that one or more terminals transmit the uplink control channel (PUCCH) or the data channel (PUSCH) during the time or slot in which the preamble is transmitted, and thus the uplink signals and channels can be multiplexed. Accordingly, it is necessary for the base station to make the uplink signals and channels transmitted by the terminal in the transmission interval or slot in which the base station indicates the preamble transmission be effectively multiplexed by making the uplink signals and channels transmitted by the terminals have the same resource allocation scheme. Accordingly, in the disclosure, a method is provided, in which the preamble transmission frequency resource allocation schemes can be independently configured depending on whether the preamble is transmitted in accordance with the indication of the base station.

For example, the terminal may be configured with the transmission resource allocation scheme (e.g., first scheme) in case of transmitting the preamble in accordance with the indication of the base station and the transmission resource allocation scheme (e.g., second scheme) in case of transmitting the preamble in accordance with the determination of the terminal from the base station through the system information or the higher signal. In this case, the transmission resource allocation scheme in case of transmitting the preamble in accordance with the indication of the base station may be predefined between the base station and the terminal (e.g., default resource allocation scheme), and the transmission resource allocation scheme (e.g., first scheme) in case of transmitting the preamble in accordance with the determination of the terminal may be configured or enabled by the base station through the system information or the higher signal. In this case, if the terminal is not configured with the transmission resource allocation scheme in case of transmitting the preamble in accordance with the determination of the terminal or the scheme is not enabled, the terminal may apply the transmission resource allocation scheme in case of transmitting the preamble in accordance with the indication of the base station even to the case of transmitting the preamble in accordance with the determination of the terminal. Similarly, the transmission resource allocation scheme in case of transmitting the preamble in accordance with the determination of the terminal may be predefined between the base station and the terminal (e.g., default resource allocation scheme), and the transmission resource allocation scheme (e.g., first scheme) in case of transmitting the preamble in accordance with the indication of the base station may also be configured or enabled by the base station through the system information or the higher signal. Further, if the terminal is not configured with the transmission resource allocation scheme in case of transmitting the preamble in accordance with the indication of the base station or if the scheme is not enabled, the terminal may also apply the transmission resource allocation scheme in case of transmitting the preamble in accordance with the determination of the terminal even to the above-described case.

In this case, if the preamble is transmitted in accordance with the indication of the base station, it is also possible to determine the transmission resource allocation scheme of the preamble through information in the DCI indicating the preamble transmission. For example, the transmission resource allocation scheme of the preamble may be indicated or configured through at least one field in the DCI of which the CRC is scrambled with the RA-RNTI, for example, a transmission resource allocation scheme identifier. In this case, the transmission resource allocation scheme identifier may be added as a new field, or at least one bit among the preexisting fields may be used or configured as the transmission resource allocation scheme identifier. For example, the transmission resource allocation scheme of the preamble may be indicated or configured through one MSB bit among the frequency-axis resource allocation fields.

Meanwhile, because it is apparent not only to consider method 1-3 together in the process of determining the transmission resource allocation scheme of the preamble using method 1-2 but also to consider method 1-2 together in the process of determining the transmission resource allocation scheme of the preamble using method 1-3, the detailed description thereof will be omitted.

Second Embodiment

In this embodiment, a method is proposed, in which a base station and a terminal support a plurality of frequency resource allocation schemes. According to this method, the terminal transmits a random access preamble, and if a random access response (hereinafter, RAR or RAR UL grant) is received from the base station as one of corresponding response signals, the terminal determines the transmission frequency resource allocation scheme for an uplink data channel that is scheduled through the RAR.

The base station transmits the DCI of which the CRC is scrambled with the RA-RNTI on a downlink control channel to the terminal in response to the preamble transmitted by the terminal. The terminal having received the DCI receives a PDSCH in accordance with information indicated or scheduled through the DCI. A RAR MAC PDU is transmitted from the base station to the terminal through the PDSCH, and the terminal identifies a random access preamble identity (RAPID) transmitted by the base station to the terminal in the RAR MAC PDU. In this case, the RAPID is a value created by the terminal in accordance with the pre-transmitted preamble, and thus the terminal may identify that the received RAPID is the RAPID for the terminal through comparison of the RAPID for the preamble transmitted by the terminal itself with the received RAPID. If it is identified that the received RAPID is the RAPID for the terminal, the terminal transmits the uplink data channel to the base station in accordance with the information indicated or scheduled through the UL grant included in the RAR MAC PDU. Table 6 is a table representing a RAR UL grant field and the size thereof.

TABLE 6

| RAR UL grant field | Number of bits |
| --- | --- |
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

In this embodiment, a method is proposed, in which a base station and a terminal support a plurality of frequency resource allocation schemes. According to this method, the terminal transmits a random access preamble, and if a random access response (hereinafter, RAR or RAR UL grant) is received from the base station as one of corresponding response signals, the terminal determines the transmission frequency resource allocation scheme for an uplink data channel (or msg3) that is scheduled through the RAR.

Method 2-1: Usage of the Same Resource Allocation Scheme as the Preamble Resource Allocation Scheme The method 2-1 is a method in which the terminal determines the transmission frequency resource allocation scheme for the uplink data channel scheduled through the RAR as the same resource allocation scheme as the preamble resource allocation scheme indicated or determined through one or more of various methods according to embodiment 1 of the disclosure. The method 2-1 has the advantage that additional information for indicating or configuring the transmission frequency resource allocation scheme for the uplink data channel scheduled through the RAR is not necessary.

Method 2-2: Determination of a Resource Allocation Scheme in Accordance with Waveform Configuration for an Uplink Data Channel Scheduled Through RAR Hereinafter, the method 2-2 will be described in more detail. In a 5G system such as NR, the terminal may use a plurality of uplink transmission waveforms. For example, in case of an NR system, the terminal may support both a CP-OFDM based uplink signal waveform and a DFT-s-OFDM based uplink waveform, and one of the waveforms may be configured to be used from the base station, or both the two kinds of waveforms may be used. Further, different waveforms may be predefined to be used in accordance with transmission signals or channels or they may be configured through a higher signal. For example, the terminal may determine the waveform for the uplink data channel through an information element (IE) of the system information (e.g., msg3-transformPrecoder of RACH-ConfigCommon). For example, if the msg3-transformPrecoder is enabled, the terminal may determine that the waveform for the uplink data channel is DFT-s-OFDM based waveform, and the terminal may transmit the uplink data channel using the determined waveform. In this case, if the msg3-transformPrecoder is disabled or the field is absent, the terminal may determine that the waveform of the uplink data channel is the CP-OFDM based waveform, and it may transmit the uplink data channel using the determined waveform.

In general, the DFT-s-OFDM waveform has the characteristics that it has a low peak-to-average power ratio (PAPR) as compared with the CP-OFDM waveform, and it is more suitable in case of using successive resource allocation on the frequency axis, whereas in case of the CP-OFDM waveform, it can be used for non-successive resource allocation. Accordingly, it is possible to determine the resource allocation scheme for the uplink data channel in accordance with the waveform configuration for the uplink data channel scheduled through the RAR. For example, if the waveform for the uplink data channel scheduled through the RAR is configured as the DFT-s-OFDM waveform, the terminal may determine that the resource allocation for the uplink data channel scheduled through the RAR corresponds to the first scheme (successive resource allocation scheme). If the waveform for the uplink data channel scheduled through the RAR is configured as the CP-OFDM waveform, the terminal may determine that the resource allocation for the uplink data channel scheduled through the RAR corresponds to the second scheme (distributed resource allocation scheme).

Method 2-3: Indication of a Resource Allocation Scheme Through RAR UL Grant

The method 2-3 is a method for determining the resource allocation scheme for the uplink data channel scheduled through the RAR using at least one field value among fields included in the RAR UL grant.

For example, fields indicating the resource allocation scheme for the uplink data channel are introduced in the RAR UL grant, and the terminal may determine the resource allocation scheme for the uplink data channel scheduled through the RAR in accordance with the field value. For example, a resource allocation type indicator having a size of one bit is added, and if the field value is 0, it may be indicated that the resource allocation scheme for the uplink data channel scheduled through the RAR is the first scheme, whereas if the field value is 1, it may be indicated that the resource allocation scheme for the uplink data channel scheduled through the RAR is the second scheme. In this case, the resource allocation scheme indicated by the name and the size of the field and the bit value is merely exemplary. In this case, in case of the terminal performing at least contention-free based random access, a CSI request field of the RAR UL grant is not used, but is reserved, and thus it is possible to indicate the resource allocation scheme for the uplink data channel scheduled through the RAR using the field.

As another example, the resource allocation scheme for the uplink data channel scheduled through a frequency hopping flag field of the RAR UL grant may be determined. For example, if the uplink data channel scheduled through the RAR is transmitted in an unlicensed band cell, the flag field may be re-construed as information indicating the resource allocation scheme for the uplink data channel scheduled through the RAR, or the resource allocation scheme for the uplink data channel may be determined in accordance with the field value through replacement of the flag field by the resource allocation type indicator.

As still another example, in accordance with the configuration value of the frequency hopping flag field of the RAR UL grant, the resource allocation scheme for the uplink data channel may be determined. In case of the second scheme, the frequency resource is uniformly distributed over the whole bandwidth part, and thus the frequency hopping for the uplink data channel allocated by the second scheme is not necessary. Accordingly, if the frequency hopping is configured (e.g., if the flag field value is 1), the terminal may determine that the resource allocation for the uplink data channel scheduled through the RAR corresponds to the first scheme, and if the frequency hopping is not configured (e.g., if the flag field value is 0), the terminal may determine that the resource allocation for the uplink data channel scheduled through the RAR corresponds to the second scheme.

Method 2-4: Determination of the Transmission Frequency Resource Allocation Scheme Depending on Whether the Uplink Data Channel Scheduled Through the RAR is Transmitted within the Channel Occupancy Time of the Base Station Hereinafter, the method 2-4 will be described in more detail. The method 2-4 is a method for determining the transmission frequency resource allocation scheme of the uplink data channel depending on whether the uplink data channel is transmitted within the channel occupancy time of the base station if the transmission frequency resource allocation scheme of the uplink data channel (hereinafter, uplink data channel or msg3) scheduled through the RAR is indicated or configured through at least one of method 2-1, method 2-2, or method 2-3. Through this, the transmission frequency resource allocation schemes of the uplink data channel may be identical to or different from each other depending on whether the uplink data channel is transmitted within the channel occupancy time of the base station or in the time except the channel occupancy time of the base station, and as a result, the transmission frequency resource allocation scheme of the uplink data channel (hereinafter, uplink data channel or smg3) may be identical to or different from the transmission frequency resource allocation scheme of the uplink data channel indicated or configured through at least one of the method 2-1, method 2-2, or method 2-3.

It is preferable that the base station controls the uplink signal transmission of terminals within the channel occupancy time in which the base station accesses and uses the channel after performing the channel access procedure. For example, the base station may transmit the DCI indicating the preamble transmission to at least one terminal on the downlink control channel, and the terminal having received this may transmit the preamble in accordance with the DCI. Further, the base station may indicate to transmit the uplink control channel (PUCCH) or the data channel (PUSCH) to the terminal, and the uplink signals and channels may be multiplexed. Accordingly, the base station is required to make the uplink signals and channels transmitted by the terminals in at least one slot or a transmission time interval be effectively multiplexed by making the uplink signals and channels have the same resource allocation scheme in at least the channel occupancy time. Accordingly, a method is necessary, in which the transmission frequency resource allocation schemes are independently configured depending on whether at least the uplink data channel is transmitted within the channel occupancy time of the base station.

For example, the terminal may transmit the uplink data channel using the transmission resource allocation scheme (e.g., first scheme) in case of transmitting the uplink data channel configured as RAR UL grant within the channel occupancy time of the base station and the transmission resource allocation scheme (e.g., second scheme) in case of transmitting the uplink data channel in the time except the channel occupancy time of the base station. In this case, the transmission resource allocation scheme in case of transmitting the uplink data channel in the time except the channel occupancy time of the base station may be predefined between the base station and the terminal (e.g., default resource allocation scheme), and the transmission resource allocation scheme (e.g., first scheme) in case of transmitting the uplink data channel within the channel occupancy time of the base station may be configured or enabled by the base station through the system information or the higher signal or the RAR UL grant. Similarly, the transmission resource allocation scheme in case of transmitting the uplink data channel within the channel occupancy time of the base station may be predefined between the base station and the terminal (e.g., default resource allocation scheme), and the transmission resource allocation scheme (e.g., first scheme) in case of transmitting the uplink data channel in the time except the channel occupancy time of the base station may be configured or enabled by the base station through the system information or the higher signal or the RAR UL grant. Further, the transmission resource allocation scheme in case of transmitting the uplink data channel in the time except the channel occupancy time of the base station may be configured through the RAR UL grant (e.g., second scheme), and the transmission resource allocation scheme (e.g., first scheme) in case of transmitting the uplink data channel within the channel occupancy time of the base station may be configured or enabled by the base station through the system information or the higher signal. Similarly, the transmission resource allocation scheme in case of transmitting the uplink data channel within the channel occupancy time of the base station may be configured through the RAR UL grant (e.g., first scheme), and the transmission resource allocation scheme (e.g., second scheme) in case of transmitting the uplink data channel in the time except the channel occupancy time of the base station may be configured or enabled by the base station through the system information or the higher signal.

Further, if the terminal is not configured with the transmission resource allocation scheme in case of transmitting the uplink data channel within the channel occupancy time of the base station, or if the transmission resource allocation scheme is not enabled, the terminal may apply the transmission resource allocation scheme in case of transmitting the uplink data channel in the time except the channel occupancy time of the base station even to a case of transmitting the uplink data channel within the channel occupancy time of the base station. Similarly, the transmission resource allocation scheme in case of transmitting the uplink data channel within the channel occupancy time of the base station may be predefined between the base station and the terminal (e.g., default resource allocation scheme), and the transmission resource allocation scheme (e.g., first scheme) in case of transmitting the uplink data channel in the time except the channel occupancy time of the base station may be configured or enabled by the base station through the system information or the higher signal. In this case, if the terminal is not configured with the transmission resource allocation scheme in case of transmitting the uplink data channel in the time except the channel occupancy time of the base station, or if the scheme is not enabled, the terminal may apply the transmission resource allocation scheme in case of transmitting the uplink data channel in the channel occupancy time of the base station even to a case of transmitting the uplink data channel in the time except the channel occupancy time of the base station.

As described above, the terminal may determine the transmission resource allocation scheme (e.g., first scheme) in case of transmitting the uplink data channel within the channel occupancy time of the base station and the transmission resource allocation scheme (e.g., second scheme) in case of transmitting the uplink data channel in the time except the channel occupancy time of the base station, and the terminal may determine whether the uplink data channel transmission time or the transmission slot is a time within the channel occupancy time of the base station or a time except the channel occupancy time, and the terminal may transmit the uplink data channel through a correct transmission resource allocation scheme in accordance with the result of the determination. In this case, the terminal may determine whether the base station occupies the channel or whether the base station accesses the channel depending on whether to detect a reference signal (e.g., DMRS) transmitted by the base station, or the terminal may determine whether the base station occupies the channel through reception of information on whether the base station accesses the channel or information on the channel occupancy time of the base station that are transmitted by the base station through the downlink control channel.

In this case, the information on whether the base station accesses the channel or information on the channel occupancy time may be composed of not only information on at least one bandwidth part and one transmission interval or slot but also at least one of a plurality of bandwidth parts or a plurality of slots. Further, the information on whether the base station accesses the channel or information on the channel occupancy time may be composed of information on one or more subband units having a smaller size than the size of the bandwidth part or information on one or more mini-slots or transmission time intervals or symbols composed of symbols that are smaller than the symbols. Such information may refer to FIG. 9A.

Third Embodiment

In this embodiment, a method is proposed, in which a base station and a terminal support a plurality of frequency resource allocation schemes. According to this method, the terminal receives DCI (hereinafter UL grant) for scheduling uplink data channel transmission from the base station, and in case of transmitting the uplink data channel accordingly, the terminal determines a transmission frequency resource allocation scheme for an uplink data channel.

Method 3-1: Configuration of a Transmission Frequency Resource Allocation Scheme of an Uplink Data Channel Through System Information or a Higher Signal The method 3-1 is a method in which the transmission frequency resource allocation scheme of the uplink data channel is indicated or configured to the terminal. By indicating or configuring the transmission frequency resource allocation scheme of the uplink data channel through system information, all terminals may transmit the uplink data channel in the same frequency resource allocation scheme in a bandwidth part in which the uplink data channel is transmitted. In this case, the transmission frequency resource allocation scheme of the uplink data channel may be included in uplink data channel related configuration information (e.g., pusch-config) to be transmitted to the terminal. In this case, a default frequency allocation scheme between the base station and the terminal may be predefined. For example, the first scheme may be the transmission frequency resource allocation scheme of the default uplink data channel, and the base station may enable the frequency resource allocation scheme of a scheme except the first scheme, for example, the frequency resource allocation scheme of the second scheme, through the system information or the higher signal. If the frequency resource allocation scheme of the scheme except the first scheme, for example, the second scheme, is not enabled through the system information or the higher signal, in other words, if the frequency resource allocation scheme of the second scheme is disabled, the terminal may determine that the transmission frequency resource allocation scheme of the uplink data channel is the default frequency resource allocation scheme.

If the frequency resource allocation scheme of the second scheme is enabled, the terminal determines the second scheme as the transmission frequency resource allocation scheme of the uplink data channel. In this case, if the frequency resource allocation scheme of the second scheme is enabled, the terminal may also determine that the both the first scheme and the second scheme are the transmission frequency resource allocation scheme of the uplink data channel, and in this case, the transmission frequency resource allocation scheme that the terminal should use during transmission of the uplink data channel may be indicated through the DCI for scheduling the uplink data channel or the UL grant, or it may be determined through at least one of other methods proposed in embodiment 3.

The above-described method may be applicable to not only the uplink data channel scheduled through the UL grant but also the uplink data channel transmission frequency resource allocation scheme for the uplink data channel scheduled without the UL grant. In an NR system, the uplink data channel scheduled without the UL grant as described above may be called the uplink data channel configured through the configured UL transmission or configured grant (or configured scheduling), and the transmission frequency resource allocation scheme of the uplink data channel scheduled without the UL grant may be configured separately from the transmission frequency resource allocation scheme of the uplink data channel scheduled through the UL grant.

Method 3-2: Determination of a Resource Allocation Scheme in Accordance with Waveform Configuration for an Uplink Data Channel Hereinafter, the method 3-2 will be described in more detail. In a 5G system such as NR, the terminal may use a plurality of uplink transmission waveforms. For example, in case of an NR system, the terminal may support both a CP-OFDM based uplink signal waveform and a DFT-s-OFDM based uplink waveform, and one of the waveforms may be configured to be used from the base station, or both the two kinds of waveforms may be used. Further, different waveforms may be predefined to be used in accordance with transmission signals or channels.

For example, the terminal may determine the waveform for the uplink data channel through an information element (IE) of the system information (e.g., msg3-transformPrecoder of RACH-ConfigCommon). For example, if the msg3-transformPrecoder is enabled, the terminal may determine that the waveform for the uplink data channel is the DFT-s-OFDM based waveform, and the terminal may transmit the uplink data channel scheduled through the RAR UL grant. In this case, if the msg3-transformPrecoder is disabled or the field is absent, the terminal may determine that the waveform for the uplink data channel is the CP-OFDM based waveform, and it may transmit the uplink data channel using the determined waveform. Similarly, the terminal may be additionally configured with the waveform for the uplink data channel except the uplink data channel scheduled through the RAR UL grant, in other words, the waveform for the uplink data channel transmitted through the DCI or UL grant scrambled with C-RNTI or CS-RNTI, through the higher signal (e.g., transformPrecoder in pusch-Config and/ or transformPrecoder in configuredGrantConfig).

In general, the DFT-s-OFDM waveform has the characteristics that it has a low peak-to-average power ratio (PAPR) as compared with the CP-OFDM waveform, and it is more suitable in case of using successive resource allocation on the frequency axis, whereas in case of the CP-OFDM waveform, it can be used for non-successive resource allocation. Accordingly, it is possible to determine the resource allocation scheme for the uplink data channel in accordance with the waveform configuration for the uplink data channel scheduled through the UL grant. For example, if the waveform for the uplink data channel scheduled through the UL grant is configured as the DFT-s-OFDM waveform, the terminal may determine that the resource allocation for the uplink data channel scheduled through the UL grant corresponds to the first scheme. If the waveform for the uplink data channel scheduled through the UL grant is configured as the CP-OFDM waveform, the terminal may determine that the resource allocation for the uplink data channel scheduled through the UL grant corresponds to the second scheme.

Further, it is also possible to determine the resource allocation scheme for the uplink data channel in accordance with the UL grant format (i.e., DCI format) scheduling the uplink data channel. For example, the resource allocation scheme for the uplink data channel scheduled through one of UL grant formats for scheduling the uplink data channel (e.g., UL grant for scheduling a fallback or default uplink data channel, as an example, DCI format 0_0) and the resource allocation scheme for the uplink data channel scheduled through another one of the UL grant formats for scheduling the uplink data channel (e.g., UL grant for scheduling a general uplink data channel, as an example, DCI format 0_1) may be identical to or different from each other.

That is, the NR system will be described as an example. The terminal may determine that the uplink data channel scheduled to format 0_0 that is one of UL grant formats for scheduling the uplink data channel follows the first scheme, and the uplink data channel scheduled to format 0-1 that is one of UL grant formats for scheduling the uplink data channel follows the second scheme. In this case, the DCI formats 0-0 and 0_1 are merely exemplary, and the method may be able to be applied even to another DCI format.

Method 3-3: Indication of a Resource Allocation Scheme Through RAR UL Grant

The method 3-3 is a method for determining the resource allocation scheme for the uplink data channel scheduled through the UL grant using at least one field value among fields included in the UL grant (i.e., DCI).

For example, fields indicating the resource allocation scheme for the uplink data channel are introduced in the UL grant, and the terminal may determine the resource allocation scheme for the uplink data channel scheduled in accordance with the field value. For example, a resource allocation type indicator having a size of one bit may be separately added to the UL grant, or the indicator having the size of one bit may be added to the field indicating the frequency-axis resource allocation information, and if the field value is 0, it may be indicated that the resource allocation scheme for the uplink data channel scheduled through the UL grant is the first scheme, whereas if the field value is 1, it may be indicated that the resource allocation scheme for the uplink data channel scheduled through the UL grant is the second scheme. In this case, the resource allocation scheme indicated by the name and the size of the field and the bit value is merely exemplary. Further, it may also be possible to add the indicator having the size of one bit or a row to the field indicating the time-axis resource allocation information or a table corresponding to this, and accordingly to indicate the resource allocation scheme for the uplink data channel.

As another example, the terminal may determine the resource allocation scheme for the uplink data channel scheduled through a frequency hopping flag field of the UL grant. For example, if the uplink data channel scheduled through the UL grant is transmitted in an unlicensed band cell, the flag field may be re-construed as the resource allocation scheme for the uplink data channel scheduled through the UL grant, or the resource allocation scheme for the uplink data channel may be determined in accordance with the field value through replacement of the flag field by the resource allocation type indicator.

Further, in accordance with the configuration value of the frequency hopping flag field of the UL grant, the terminal may determine the resource allocation scheme for the uplink data channel. In case of the second scheme, the frequency resource is uniformly distributed over the whole bandwidth part. Accordingly, the frequency hopping for the uplink data channel allocated through the second scheme is not necessary. Accordingly, if the frequency hopping is configured (e.g., if the flag field value is 1), the terminal may determine that the resource allocation for the uplink data channel scheduled through the UL grant corresponds to the first scheme, and if the frequency hopping is not configured (e.g., if the flag field value is 0), the terminal may determine that the resource allocation for the uplink data channel scheduled through the UL grant corresponds to the second scheme.

Method 3-4: Determination of the Transmission Frequency Resource Allocation Scheme Depending on Whether the Uplink Data Channel Scheduled Through the UL Grant is Transmitted within the Channel Occupancy Time of the Base Station Hereinafter, the method 3-4 will be described in more detail. The method 3-4 is a method for determining the transmission frequency resource allocation scheme of the uplink data channel depending on whether the uplink data channel is transmitted within the channel occupancy time of the base station if the transmission frequency resource allocation scheme of the uplink data channel (hereinafter, uplink data channel) scheduled through the UL grant is indicated or configured through at least one of method 3-1, method 3-2, or method 3-3. Through the method, the transmission frequency resource allocation schemes of the uplink data channel may be identical to or different from each other depending on whether the uplink data channel is transmitted within the channel occupancy time of the base station or in the time except the channel occupancy time of the base station, and as a result, the transmission frequency resource allocation scheme of the uplink data channel may be identical to or different from the transmission frequency resource allocation scheme of the uplink data channel indicated or configured through at least one of the method 3-1, method 3-2, or method 3-3.

It is preferable that the base station controls the uplink signal transmission of terminals within the channel occupancy time in which the base station accesses and uses the channel after performing the channel access procedure. For example, the base station may transmit the UL grant to one or more terminals on the downlink control channel, and the terminal having received this may transmit the uplink data channel in accordance with the UL grant. Further, the base station may indicate to transmit the uplink control channel (PUCCH) or the data channel (PUSCH) to one or more terminals, and the uplink signals and channels may be multiplexed. Accordingly, the base station is required to make the uplink signals and channels transmitted by the terminals in at least one slot or a transmission time interval be effectively multiplexed by making the uplink signals and channels have the same resource allocation scheme in at least the channel occupancy time. Accordingly, a method is necessary, in which the transmission frequency resource allocation schemes are independently configured depending on whether at least the uplink data channel is transmitted within the channel occupancy time of the base station.

For example, the terminal may transmit the uplink data channel using the transmission resource allocation scheme (e.g., first scheme) in case of transmitting the uplink data channel configured through the UL grant within the channel occupancy time of the base station and the transmission resource allocation scheme (e.g., second scheme) in case of transmitting the uplink data channel in the time except the channel occupancy time of the base station. In this case, the transmission resource allocation scheme in case of transmitting the uplink data channel in the time except the channel occupancy time of the base station may be predefined between the base station and the terminal (e.g., default resource allocation scheme), and the transmission resource allocation scheme (e.g., first scheme) in case of transmitting the uplink data channel within the channel occupancy time of the base station may be configured or enabled by the base station through the system information or the higher signal or the UL grant. Similarly, the transmission resource allocation scheme in case of transmitting the uplink data channel within the channel occupancy time of the base station may be predefined between the base station and the terminal (e.g., default resource allocation scheme), and the transmission resource allocation scheme (e.g., first scheme) in case of transmitting the uplink data channel in the time except the channel occupancy time of the base station may be configured or enabled by the base station through the system information or the higher signal or the UL grant. In this case, the transmission resource allocation scheme in case of transmitting the uplink data channel in the time except the channel occupancy time of the base station may be configured through the UL grant (e.g., second scheme), and the transmission resource allocation scheme (e.g., first scheme) in case of transmitting the uplink data channel within the channel occupancy time of the base station may be configured or enabled by the base station through the system information or the higher signal. Similarly, the transmission resource allocation scheme in case of transmitting the uplink data channel within the channel occupancy time of the base station may be configured through the UL grant (e.g., first scheme), and the transmission resource allocation scheme (e.g., second scheme) in case of transmitting the uplink data channel in the time except the channel occupancy time of the base station may be configured or enabled by the base station through the system information or the higher signal.

Further, if the terminal is not configured with the transmission resource allocation scheme in case of transmitting the uplink data channel within the channel occupancy time of the base station, or if the transmission resource allocation scheme is not enabled, the terminal may apply the transmission resource allocation scheme in case of transmitting the uplink data channel in the time except the channel occupancy time of the base station even to a case of transmitting the uplink data channel within the channel occupancy time of the base station. Similarly, the transmission resource allocation scheme in case of transmitting the uplink data channel within the channel occupancy time of the base station may be predefined between the base station and the terminal (e.g., default resource allocation scheme), and the transmission resource allocation scheme (e.g., first scheme) in case of transmitting the uplink data channel in the time except the channel occupancy time of the base station may be configured or enabled by the base station through the system information or the higher signal. In this case, if the terminal is not configured with the transmission resource allocation scheme in case of transmitting the uplink data channel in the time except the channel occupancy time of the base station, or if the scheme is not enabled, the terminal may apply the transmission resource allocation scheme in case of transmitting the uplink data channel within the channel occupancy time of the base station even to a case of transmitting the uplink data channel in the time except the channel occupancy time of the base station.

As described above, the terminal may determine the transmission resource allocation scheme (e.g., first scheme) in case of transmitting the uplink data channel within the channel occupancy time of the base station and the transmission resource allocation scheme (e.g., second scheme) in case of transmitting the uplink data channel in the time except the channel occupancy time of the base station, and the terminal may determine whether the uplink data channel transmission time or the transmission slot is a time within the channel occupancy time of the base station or a time except the channel occupancy time, and the terminal may transmit the uplink data channel through a correct transmission resource allocation scheme in accordance with the result of the determination. In this case, the terminal may determine whether the base station occupies the channel or whether the base station accesses the channel depending on whether to detect a reference signal (e.g., DMRS) transmitted by the base station, or the terminal may determine whether the base station occupies the channel through reception of information on whether the base station accesses the channel or information on the channel occupancy time of the base station that are transmitted by the base station through the downlink control channel.

In this case, the information on whether the base station accesses the channel or information on the channel occupancy time may be composed of not only information on at least one bandwidth part and one transmission interval or slot but also at least one of a plurality of bandwidth parts or a plurality of slots. Further, the information on whether the base station accesses the channel or information on the channel occupancy time may be composed of information on one or more subband units having a smaller size than the size of the bandwidth part or information on one or more mini-slots or transmission time intervals or symbols composed of symbols that are smaller than the slots. Such information on whether the base station accesses the channel or information on the channel occupancy time may refer to FIG. 9A.

Method 3-5: Usage of the Same Resource Allocation Scheme as that of an Uplink Data Channel Transmitted Through RAR UL Grant The method 3-5 is a method in which the terminal applies the same scheme as the transmission frequency resource allocation scheme for the uplink data channel scheduled through the RAR UL grant indicated or determined through one or more of various methods according to embodiment 2 of the disclosure. The method 3-5 has the advantage that additional information for indicating or configuring the transmission frequency resource allocation scheme for the uplink data channel scheduled through the UL grant is not necessary, and the terminal may transmit all the uplink data channel using the same transmission frequency resource allocation scheme without discriminating the transmission frequency resource allocation scheme for the uplink data channel according to the DCI for scheduling the uplink data channel.

Fourth Embodiment

In this embodiment, a method is proposed, in which a base station and a terminal support a plurality of frequency resource allocation schemes. According to this method, the terminal receives DCI for scheduling downlink data channel (PDSCH) from the base station, and in case of transmitting the reception result of the received PDSCH or response signal (HARQ-ACK) information on an uplink control channel (PUCCH), the terminal determines a transmission frequency resource allocation scheme for an uplink control channel. In embodiment 4, a case where the terminal transmit the reception result of the received PDSCH or response signal (HARQ-ACK) information on the uplink control channel (PUCCH) will be described as an example, but this embodiment will be able to be applied even to a case where channel state information is transmitted through the uplink control channel (PUCCH).

Method 4-1: Configuration of a Transmission Frequency Resource Allocation Scheme of an Uplink Control Channel Through System Information or a Higher Signal Hereinafter, the method 4-1 will be described in more detail. The method 4-1 is a method in which the base station indicates or configures the transmission frequency resource allocation scheme of the uplink control channel through system information or a higher signal. By indicating or configuring the transmission frequency resource allocation scheme of the uplink control channel through the system information, all terminals may transmit the uplink control channel in the same frequency resource allocation scheme in a bandwidth part in which the uplink control channel is transmitted. In this case, the transmission frequency resource allocation scheme of the uplink control channel may be included in uplink control channel related configuration information (e.g., pucch-config) to be transmitted to the terminal. In this case, a default frequency allocation scheme between the base station and the terminal may be predefined. For example, the first scheme may be the transmission frequency resource allocation scheme of the default uplink control channel, and the frequency resource allocation scheme of a scheme except the first scheme, for example, the frequency resource allocation scheme of the second scheme, may be enabled through the system information or the higher signal. If the frequency resource allocation scheme of the scheme except the first scheme, for example, the second scheme, is not enabled through the system information or the higher signal, in other words, if the frequency resource allocation scheme of the second scheme is disabled, the terminal may determine that the transmission frequency resource allocation scheme of the uplink control channel is the default frequency resource allocation scheme.

If the frequency resource allocation scheme of the second scheme is enabled, the terminal determines the second scheme as the transmission frequency resource allocation scheme of the uplink control channel. In this case, if the frequency resource allocation scheme of the second scheme is enabled, the terminal may also determine that the both the first scheme and the second scheme are the transmission frequency resource allocation scheme of the uplink control channel, and in this case, the transmission frequency resource allocation scheme that should be used by the terminal during transmission of the uplink control channel may be indicated through the DCI (in other words, DCI for scheduling the PDSCH) for indicating or scheduling the uplink control channel, or it may be determined through at least one of other methods proposed in embodiment 4. Here, the DCI for indicating or scheduling the uplink control channel may be DCI for scheduling the PDSCH, and if the terminal receives the DCI for scheduling reception of a downlink data channel (PDSCH) from the base station and it transmits the reception result of the received PDSCH or response signal (HARQ-ACK) information on the uplink control channel (PUCCH), the terminal indicates configuration information, such as uplink control channel resource and time, on which the terminal is to transmit the response signal through the DCI.

Further, the transmission frequency resource allocation scheme of the uplink control channel may be configured to resources of the uplink control channel configured through the system information or the higher signal. That is, the base station can configure the frequency resource allocation schemes of the uplink control channel so that the frequency resource allocation schemes of the uplink control channel are identical to or different from each other on uplink control channel resource #0 and uplink control channel resource #1.

Method 4-2: Determination of a Resource Allocation Scheme in Accordance with Waveform Configuration for an Uplink Data Channel Hereinafter, the method 4-2 will be described in more detail. In a 5G system such as NR, the terminal may use a plurality of uplink transmission waveforms. For example, in case of an NR system, the terminal may support both a CP-OFDM based uplink signal waveform and a DFT-s-OFDM based uplink waveform, and one of the waveforms may be configured to be used from the base station, or both the two kinds of waveforms may be used. Further, different waveforms may be predefined to be used in accordance with transmission signals or channels or they may be configured through the higher signal.

For example, the terminal may determine the waveform for the uplink data channel through an information element (IE) of the system information (e.g., msg3-transformPrecoder of RACH-ConfigCommon). For example, if the msg3-transformPrecoder is enabled, the terminal may determine that the waveform for the uplink data channel is the DFT-s-OFDM based waveform, and the terminal may transmit the uplink data channel, for example, the uplink data channel scheduled through RAR UL grant, using the determined waveform. In this case, if the msg3-transformPrecoder is disabled or the field is absent, the terminal may determine that the waveform for the uplink data channel is the CP-OFDM based waveform, and it may transmit the uplink data channel using the determined waveform. Similarly, the terminal may be additionally configured with the waveform for the uplink data channel except the uplink data channel scheduled through the RAR UL grant, in other words, the waveform for the uplink data channel transmitted through the DCI or UL grant scrambled with the C-RNTI or CS-RNTI, through the higher signal (e.g., transformPrecoder in pusch-Config and/or transformPrecoder in configuredGrant-Config).

In general, the DFT-s-OFDM waveform has the characteristics that it has a low peak-to-average power ratio (PAPR) as compared with the CP-OFDM waveform, and it is more suitable in case of using successive resource allocation on the frequency axis, whereas in case of the CP-OFDM waveform, it can be used for non-successive resource allocation. Accordingly, it is possible to determine the resource allocation scheme for the uplink control channel in accordance with the waveform configuration for the uplink data channel scheduled through the UL grant. For example, if the waveform for the uplink data channel scheduled through the UL grant is configured as the DFT-s-OFDM waveform, the terminal may determine that the resource allocation for the uplink control channel scheduled through the UL grant corresponds to the first scheme. If the waveform for the uplink data channel scheduled through the UL grant is configured as the CP-OFDM waveform, the terminal may determine that the resource allocation for the uplink control channel corresponds to the second scheme.

In this case, it is also possible to determine the resource allocation scheme for the uplink control channel in accordance with the DCI format for scheduling the downlink data channel. For example, the resource allocation scheme for the downlink data channel scheduled through one of DCI formats for scheduling the downlink data channel (e.g., DCI for scheduling a fallback or default downlink data channel, as an example, DCI format 1_0) and the resource allocation scheme for the uplink data channel scheduled through another one of the DCI formats for scheduling the downlink data channel (e.g., DCI for scheduling a general downlink data channel, as an example, DCI format 1_1) may be identical to or different from each other.

That is, the NR system will be described as an example. It may be determined that the uplink control channel that transmits the reception result of the downlink data channel scheduled through format 1_0 that is one of the DCI formats for scheduling the downlink data channel or a response signal is transmitted in accordance with the first scheme, and the uplink control channel that transmits the reception result of the downlink data channel scheduled through format 1_1 that is another one of the DCI formats for scheduling the downlink data channel or a response signal is transmitted in accordance with the second scheme. In this case, the DCI formats 1-0 and 1_1 are merely exemplary, and the method may be able to be applied even to another DCI format.

Further, the waveforms applied during PUCCH transmission in accordance with the uplink control channel (PUCCH) format may differ, and as an example, if the terminal transmits the PUCCH using the DFT-s-OFDM waveform, the terminal may determine that the resource allocation for the uplink control channel corresponds to the first scheme. Further, in the case of transmitting the PUCCH using the CP-OFDM waveform, the terminal may determine that the resource allocation for the uplink control channel corresponds to the second scheme.

Method 4-3: Indication of a Resource Allocation Scheme Through DCI

The method 4-3 is a method for determining the resource allocation scheme for the uplink control channel for transmitting the PDSCH reception result using at least one field value among fields included in the DCI for scheduling the PDSCH reception.

For example, fields indicating the resource allocation scheme for the uplink control channel are introduced in the DCI, and the terminal may determine the resource allocation scheme for the uplink control channel indicated or scheduled in accordance with the field value. For example, a resource allocation type indicator having a size of one bit may be separately added to the DCI, or the indicator having the size of one bit may be added to the field indicating the uplink control channel information, and if the field value is 0, it may be indicated that the resource allocation scheme for the uplink control is the first scheme, whereas if the field value is 1, it may be indicated that the resource allocation scheme for the uplink control channel is the second scheme. In this case, the resource allocation scheme indicated by the name and the size of the field and the bit value is merely exemplary.

Method 4-4: Determination of the Transmission Frequency Resource Allocation Scheme Depending on Whether the Uplink Data Channel Scheduled Through the UL Grant is Transmitted within the Channel Occupancy Time of the Base Station Hereinafter, the method 4-4 will be described in more detail. The method 4-4 is a method for determining the transmission frequency resource allocation scheme of the uplink control channel depending on whether the uplink control channel is transmitted within the channel occupancy time of the base station. Through the method, the transmission frequency resource allocation schemes of the uplink control channel may be identical to or different from each other depending on whether the uplink control channel is transmitted within the channel occupancy time of the base station or in the time except the channel occupancy time of the base station, and as a result, the transmission frequency resource allocation scheme of the uplink control channel may be identical to or different from the transmission frequency resource allocation scheme of the uplink control channel indicated or configured through at least one of the method 4-1, method 4-2, or method 4-3.

It is preferable that the base station controls the uplink signal transmission of terminals within the channel occupancy time in which the base station accesses and uses the channel after performing the channel access procedure. For example, the base station may transmit the UL grant to one or more terminals on the downlink control channel, and the terminal having received this may transmit the uplink data channel in accordance with the UL grant. Further, the base station may indicate to transmit the uplink control channel (PUCCH) or the data channel (PUSCH) to one or more terminals, and the uplink signals and channels may be multiplexed. Accordingly, the base station is required to make the uplink signals and channels transmitted by the terminals in at least one slot or a transmission time interval be effectively multiplexed by making the uplink signals and channels have the same resource allocation scheme in at least the channel occupancy time. Accordingly, a method is necessary, in which the transmission frequency resource allocation schemes are independently configured depending on whether at least the uplink control channel is transmitted within the channel occupancy time of the base station.

For example, the terminal may transmit the uplink control channel using the transmission resource allocation scheme (e.g., first scheme) in case of transmitting the uplink control channel within the channel occupancy time of the base station and the transmission resource allocation scheme (e.g., second scheme) in case of transmitting the uplink control channel in the time except the channel occupancy time of the base station. In this case, the transmission resource allocation scheme in case of transmitting the uplink control channel in the time except the channel occupancy time of the base station may be predefined between the base station and the terminal (e.g., default resource allocation scheme), and the transmission resource allocation scheme (e.g., first scheme) in case of transmitting the uplink control channel within the channel occupancy time of the base station may be configured or enabled by the base station through the system information or the higher signal or the DCI for scheduling the PDSCH Similarly, the transmission resource allocation scheme in case of transmitting the uplink control channel within the channel occupancy time of the base station may be predefined between the base station and the terminal (e.g., default resource allocation scheme), and the transmission resource allocation scheme (e.g., first scheme) in case of transmitting the uplink control channel in the time except the channel occupancy time of the base station may be configured or enabled by the base station through the system information or the higher signal or the DCI for scheduling the PDSCH. In this case, the transmission resource allocation scheme in case of transmitting the uplink control channel in the time except the channel occupancy time of the base station may be configured through the DCI for scheduling the PDSCH (e.g., second scheme), and the transmission resource allocation scheme (e.g., first scheme) in case of transmitting the uplink control channel within the channel occupancy time of the base station may be configured or enabled through the system information or the higher signal. Similarly, the transmission resource allocation scheme in case of transmitting the uplink control channel within the channel occupancy time of the base station may be configured through the DCI for scheduling the PDSCH (e.g., first scheme), and the transmission resource allocation scheme (e.g., second scheme) in case of transmitting the uplink control channel in the time except the channel occupancy time of the base station may be configured or enabled through the system information or the higher signal.

Further, if the terminal is not configured with the transmission resource allocation scheme in case of transmitting the uplink control channel within the channel occupancy time of the base station, or if the transmission resource allocation scheme is not enabled, the terminal may apply the transmission resource allocation scheme in case of transmitting the uplink control channel in the time except the channel occupancy time of the base station even to a case of transmitting the uplink control channel within the channel occupancy time of the base station. Similarly, the transmission resource allocation scheme in case of transmitting the uplink control channel within the channel occupancy time of the base station may be predefined between the base station and the terminal (e.g., default resource allocation scheme), and the transmission resource allocation scheme (e.g., first scheme) in case of transmitting the uplink control channel in the time except the channel occupancy time of the base station may be configured or enabled by the base station through the system information or the higher signal. In this case, if the terminal is not configured with the transmission resource allocation scheme in case of transmitting the uplink control channel in the time except the channel occupancy time of the base station, or if the scheme is not enabled, the terminal may apply the transmission resource allocation scheme in case of transmitting the uplink control channel within the channel occupancy time of the base station even to a case of transmitting the uplink control channel in the time except the channel occupancy time of the base station.

As described above, the terminal may determine the transmission resource allocation scheme (e.g., first scheme) in case of transmitting the uplink control channel within the channel occupancy time of the base station and the transmission resource allocation scheme (e.g., second scheme) in case of transmitting the uplink control channel in the time except the channel occupancy time of the base station, and the terminal may determine whether the uplink data channel transmission time or the transmission slot is a time within the channel occupancy time of the base station or a time except the channel occupancy time, and the terminal may transmit the uplink data channel through a correct transmission resource allocation scheme in accordance with the result of the determination. In this case, the terminal may determine whether the base station occupies the channel or whether the base station accesses the channel depending on whether to detect a reference signal (e.g., DMRS) transmitted by the base station, or the terminal may determine whether the base station occupies the channel through reception of information on whether the base station accesses the channel or information on the channel occupancy time of the base station that are transmitted by the base station through the downlink control channel.

In this case, the information on whether the base station accesses the channel or information on the channel occupancy time may be composed of not only information on at least one bandwidth part and one transmission interval or slot but also at least one of a plurality of bandwidth parts or a plurality of slots. Further, the information on whether the base station accesses the channel or information on the channel occupancy time may be composed of information on one or more subband units having a smaller size than the size of the bandwidth part or information on one or more mini-slots or transmission time intervals or symbols composed of symbols that are smaller than the slots. Such information on whether the base station accesses the channel or information on the channel occupancy time may refer to FIG. 9A.

Method 4-5: Usage of the Same Resource Allocation Scheme as that of an Uplink Data Channel The method 4-5 is a method in which the terminal transmits the uplink control channel by applying the same scheme as the transmission frequency resource allocation scheme for the uplink data channel scheduled through the UL grant indicated or determined through one or more of various methods according to embodiment 3 of the disclosure. The method 4-5 has the advantage that additional information for indicating or configuring the transmission frequency resource allocation scheme for the uplink control channel is not necessary, and according to this method, all the uplink data channels and the uplink control channels can use the same transmission frequency resource allocation scheme.

In this case, it is also possible that the terminal includes the method for transmitting the uplink control channel by applying the same scheme as the transmission frequency resource allocation scheme for the uplink data channel scheduled through the RAR UL grant indicated or determined through one or more of the various methods according to embodiment 3 of the disclosure.

(4-2)-th Embodiment

In this embodiment, a method is proposed, in which a base station and a terminal support a plurality of frequency resource allocation schemes. According to this method, the terminal receives DCI for scheduling downlink data channel (PDSCH) from the base station, and in case of transmitting the reception result of the received PDSCH or response signal (HARQ-ACK) information on an uplink control channel (PUCCH), the terminal determines PUCCH transmission resources in case that the transmission frequency resource allocation scheme for the uplink control channel determined or configured according to the fourth embodiment is the frequency resource allocation scheme of the second scheme. In embodiment 4-2, a case where the terminal transmit the reception result of the received PDSCH or response signal (HARQ-ACK) information on the uplink control channel (PUCCH) will be described as an example, but this embodiment will be able to be applied even to a case where channel state information is transmitted through the uplink control channel (PUCCH).

If the frequency resource allocation scheme of the second scheme is configured as the PUCCH frequency resource allocation scheme with respect to the PUCCH transmission, or if the frequency resource allocation scheme of the second scheme is enabled, the terminal may be allocated with the PUCCH resource in the unit of uplink control channel resource #k. In other words, one uplink control channel resource becomes a base transmission frequency resource of the PUCCH transmission. For example, the terminal may be allocated with the uplink control channel resource index #3 940 in FIG. 9B as a frequency resource of PUCCH #m, and the terminal may transmit PUCCH #m using a PRB included in the uplink control channel resource #3 940. At this time, the uplink control channel resource may be independently configured for each PUCCH resource, and it can also be configured independently for each PUCCH format or PUCCH resource set.

In this case, in case of transmitting a large quantity of information (payload) through the PUCCH, the terminal may require a larger quantity of PUCCH resources. Accordingly, it is necessary for the terminal to be allocated with a plurality of uplink control channel resources in PUCCH resource index #m. Hereinafter, in the disclosure, explanation will be made on the assumption that two uplink control channel resources are allocated, but the disclosure is not limited thereto.

The terminal may be allocated with one uplink control channel resource or two uplink control channel resources with respect to PUCCH resource #m. If the terminal is configured to use two uplink control channel resources with respect to PUCCH resource #m, the terminal may implicitly or explicitly determine the second uplink control channel resource using the first uplink control channel resource.

For example, as described above, the terminal that is allocated with uplink control channel resource #k as the resource for the PUCCH #m may determine the second uplink control channel resource through the following methods.

Method 1: This method determines, with respect to PUCCH resource #m, a resource or a resource index just next to the first uplink control channel resource (e.g., interlace 0) configured through a higher signal as the second uplink control channel resource (e.g., interlace 1) of PUCCH resource #m.

For example, if the terminal is allocated with uplink control channel resource #k as the first uplink control channel resource (interlace 0) with respect to PUCCH #m through the higher signal, the terminal may determine that the next index #k+1 of the uplink control channel resource is the second uplink control channel resource (interlace 1). In this case, if total M effective uplink control channel resources exist, it may be possible that the terminal determines the second uplink control channel resource through modulo operations of an index next to the index configured as the first uplink control channel resource and the M control channel resources with respect to PUCCH #m through the higher signal. That is, the terminal, which have been configured with the first uplink control channel resource (e.g., interlace 0) #k through the higher signal as the resource for PUCCH #m, may determine that the index of the second uplink control channel resource is modulo (k+1, M).

Method 2: This method determines the second uplink control channel resource (e.g., interlace 1) of PUCCH resource #m using the first uplink control channel resource (e.g., interlace 0) configured through the higher signal with respect to PUCCH resource #m and offset information.

For example, the terminal may be configured with the first uplink control channel resource (interlace 0) for PUCCH #m and an additional offset value i for the second uplink control channel resource determination through the higher signal. In this case, the terminal may determine #k+i, to which the offset value is applied, based on the configured first uplink control channel resource #k as the index of the second uplink control channel resource (interlace 0). In this case, the offset i may be an integer including a negative number, 0, and a positive number, or it may be a positive integer that is equal to or larger than 0.

In this case, in the same manner as method 1, if total M effective uplink control channel resources exist, it is possible that the terminal determines the second uplink control channel resource through the modulo operation of the first uplink control channel resource (interlace 0) index for PUCCH #m configured through the higher signal, the uplink control channel resource (interlace 1) index determined through the offset information, and the number M of control channel resources. That is, the terminal, which is configured with the first uplink control channel resource (e.g., interlace 0) #k through the higher signal as the resource for PUCCH #m, may determine that the index of the second uplink control channel resource is modulo (k+i, M).

Method 3: This method is configured with all the first uplink control channel resource (e.g., interlace 0) and the second uplink control channel resource (interlace 1) for PUCCH resource #m through the higher signal.

Even in case that two or a plurality uplink control channel resources are configured, the terminal may transmit the PUCCH using only one uplink control channel resource if the quantity of information (payload) to be actually transmitted is small. For example, the terminal may perform the PUCCH transmission using the minimum number of PRBs capable of satisfying the code rate that is equal to or higher than the code rate configured to uplink control information (UCI) transmission transmitted through the PUCCH or the code rate determined for the UCI transmission. In this case, in case of the uplink control channel using the frequency resource allocation scheme of the second scheme, the minimum frequency allocation resource is the uplink control channel resource (in case of FIG. 9B, uplink control channel resource #0 930 or uplink control channel resource #3 940), and thus the terminal may transmit the uplink control channel using the minimum uplink control channel resource (or interlace) capable of satisfying the code rate that is equal to or higher than the code rate configured for the UCI transmission transmitted on the PUCCH or determined for the UCI transmission. That is, if the terminal is configured with two uplink control channels in PUCCH resource #m, and the above-described minimum uplink control channel resource is one uplink control channel, the terminal transmits the UCI using one of the two configured uplink control channels. In this case, the terminal may select the uplink control channel resource to be used for actual transmission among the two uplink control channel resources configured in PUCCH resource #m through selection of one or a combination of the two uplink control channel resources.

Method A: The terminal may select the uplink control channel resource having the lowest uplink control channel resource index or the uplink control channel resource having the highest uplink control channel resource index, and it may transmit the UCI using the selected uplink control channel resource.

Method B: The terminal may transmit the uplink control channel using the uplink control channel resource configured through the higher signal.

The terminal may transmit the UCI using the uplink control channel resource configured with the uplink control channel resource index or the first uplink control channel resource (interlace 0) among a plurality of uplink control channel resources of PUCCH resource #m. For example, in case of the method 2, the first uplink control channel among the uplink control channel resources of PUCCH resource #m is the resource of which the corresponding resource index (interlace 0) is configured through the higher signal. The second uplink control channel among the uplink control channel resources of PUCCH resource #m is the uplink control channel resource determined or configured using the first uplink control channel and the offset information. In this case, the method B transmits the uplink control channel using the uplink control channel resource configured with the uplink control channel resource index or the first uplink control channel resource (interlace 0) among the uplink control channel resources of PUCCH resource #m, and thus the terminal transmits the UCI using the first uplink control channel (interlace 0) among the uplink control channel resources of PUCCH resource #m.

If a plurality of uplink control channel resources configured with the uplink control channel resource indexes exist, as in the method A, the terminal may select the uplink control channel resource having the lowest uplink control channel resource index and the uplink control channel resource having the highest uplink control channel resource index, and it may transmit the uplink control channel using the selected uplink control channel resources.

In this case, like the method 2, the method B is more effective in configuring the second uplink control channel resource through the offset. For example, it is assumed that the base station configures two uplink control channel resource #0 and #1 to two terminals, and the two terminals share and use the resources. In this case, the base station may configure uplink control channel resource #0 and offset 1 to terminal #0, and it may configure uplink control channel resource #1 and offset −1 to terminal #1. If the uplink control channel resource required for the actual UCI transmission is smaller than the uplink control channel resource configured on the PUCCH resource in terminal #0 and terminal #1, the terminal transmits the UCI using the uplink control channel resource configured with the uplink control channel resource index or the first uplink control channel resource according to the method B. In this case, terminal #0 transmits the UCI through the uplink control channel resource #0 and terminal #1 transmits the UCI through the uplink control channel resource #1, and thus the two terminals can transmit the UCI on different resources without overlapping.

Method C: The terminal is configured with the uplink control channel resource to be used for actual transmission through the higher signal, and it transmits the uplink control channel through the configured uplink control channel resource.

Even if a plurality of uplink control channel resources for PUCCH resource #m are configured to the terminal, the uplink control channel resource required for the actual UCI transmission may be smaller than the uplink control channel resource configured for PUCCH resource #m. In this case, the terminal transmits the UCI through selection of some of the plurality of resources configured. The method C is a method in which the terminal is configured with information on the uplink control channel resource used for the actual UCI transmission among a plurality of uplink control channel resources or the corresponding index through the higher signal if the uplink control channel resource required for the actual UCI transmission is smaller than the configured uplink control channel resource. For example, the terminal may be configured with two uplink control channel resources (interlace 0 and interlace 1) included in PUCCH resource #m through the higher signal. In addition, if the uplink control channel resource required for the actual UCI transmission is smaller than the plurality of configured uplink control channel resources, the terminal may be configured with the uplink control channel resource used for the UCI transmission or corresponding index information (e.g., interlace 1). In other words, if one uplink control channel resource is required for the actual UCI transmission through PUCCH #m, the terminal may transmit the actual UCI using the uplink control channel resource (interlace 1) configured through the higher signal of the two uplink control channel resources (interlace 0 and interlace 1) configured on the PUCCH #m. The uplink control channel resource to be used for the actual UCI transmission or index information (or preferential uplink control channel resource or index) may be indicated from the base station to the terminal through the DCI.

Fifth Embodiment

In this embodiment, a method is proposed, in which a base station and a terminal support a plurality of frequency resource allocation schemes. According to this method, the terminal determines a transmission frequency resource allocation scheme for a sounding reference signal (SRS) in case that the terminal transmits the sounding reference signal to the base station.

Method 5-1: Configuration of a Transmission Frequency Resource Allocation Scheme of an Uplink Control Channel Through System Information or a Higher Signal Hereinafter, the method 5-1 will be described in more detail. The method 5-1 is a method in which the base station indicates or configures the transmission frequency resource allocation scheme of the sounding reference signal to the terminal through system information or a higher signal. As the base station indicates or configures the transmission frequency resource allocation scheme of the sounding reference signal through the system information, all terminals may transmit the sounding reference signal in the same frequency resource allocation scheme in a bandwidth part in which the sounding reference signal is transmitted. In this case, the transmission frequency resource allocation scheme of the sounding reference signal may be included in sounding reference signal related configuration information (e.g., srs-config) to be transmitted to the terminal. In this case, a default frequency allocation scheme between the base station and the terminal may be predefined. For example, the first scheme may be the transmission frequency resource allocation scheme of the default sounding reference signal, and the frequency resource allocation scheme of a scheme except the first scheme, for example, the frequency resource allocation scheme of the second scheme, may be enabled through the system information or the higher signal. If the frequency resource allocation scheme of the scheme except the first scheme, for example, the second scheme, is not enabled through the system information or the higher signal, in other words, if the frequency resource allocation scheme of the second scheme is disabled, the terminal may determine that the transmission frequency resource allocation scheme of the sounding reference signal is the default frequency resource allocation scheme.

If the frequency resource allocation scheme of the second scheme is enabled, the terminal determines the second scheme as the transmission frequency resource allocation scheme of the sounding reference signal. In this case, if the frequency resource allocation scheme of the second scheme is enabled, the terminal may also determine that the both the first scheme and the second scheme are the transmission frequency resource allocation scheme of the sounding reference signal, and in this case, the transmission frequency resource allocation scheme that should be used by the terminal during transmission of the sounding reference signal may be indicated through the DCI (in other words, DCI for indicating transmission of the sounding reference signal) for indicating or scheduling the uplink control channel, or it may be determined through at least one of other methods proposed in embodiment 5. Here, the DCI for indicating or scheduling the transmission of the sounding reference signal may mean a case where one field indicates, requests, or triggers the transmission of the sounding reference signal among DCI for scheduling reception of the downlink data channel (PDSCH) transmitted by the base station, DCI for scheduling transmission of an uplink data channel (PUSCH), UL grant information, or group common DCI for indicating the transmission of the sounding reference signal to one or more terminals.

Further, the transmission frequency resource allocation scheme of the sounding reference signal may be configured to resources of the sounding reference signal configured through the system information or the higher signal or a set of sounding reference signal resources. That is, the base station can configure the frequency resource allocation schemes of the sounding reference signal resource #0 and sounding reference signal #1 so that the frequency resource allocation schemes of the sounding reference signal resource #0 and the sounding reference signal resource #1 are identical to or different from each other.

Method 5-2: Determination of a Resource Allocation Scheme in Accordance with Waveform Configuration for an Uplink Data Channel Terminal may determine the resource allocation scheme of the sounding reference signal in accordance with the waveform configuration for the uplink data channel scheduled through RAR UL grant or UL grant. For example, if the waveform for the uplink data channel is configured as a DFT-s-OFDM waveform, the terminal may determine that the resource allocation for the sounding reference signal corresponds to the first scheme. If the waveform for the uplink data channel is configured as a CP-OFDM waveform, the terminal may determine that the resource allocation for the sounding reference signal corresponds to the second scheme.

Similarly, the terminal may determine the resource allocation scheme of the sounding reference signal in accordance with the waveform configuration for the uplink control channel. For example, if the waveform for the uplink data channel is configured as a DFT-s-OFDM waveform, the terminal may determine that the resource allocation for the sounding reference signal corresponds to the first scheme. If the waveform for the uplink data channel is configured as a CP-OFDM waveform, the terminal may determine that the resource allocation for the sounding reference signal corresponds to the second scheme. If one or more waveforms are used to transmit the uplink control channel in accordance with the format of the uplink control channel, the terminal may determine the resource allocation scheme of the sounding reference signal in accordance with the waveform configuration for the uplink data channel.

Method 5-3: Indication of a Resource Allocation Scheme Through DCI

The method 5-3 is a method for determining the resource allocation scheme for the sounding reference signal through a sounding reference signal transmission request field (SRS request field) included in the DCI indicating the transmission of the sounding reference signal. For example, fields of values indicating the resource allocation scheme are introduced in the values of sounding reference signal transmission request fields, and the terminal may determine the resource allocation scheme for the indicated or scheduled sounding reference signal in accordance with the field value. For example, a resource allocation type indicator having a size of one bit may be separately added to the DCI for indicating or requesting the transmission of the sounding reference signal, or the indicator having the size of one bit may be added to the field indicating the transmission of the sounding reference signal (SRS request field), and if the field value is 0, it may be indicated that the resource allocation scheme for the sounding reference signal is the first scheme, whereas if the field value is 1, it may be indicated that the resource allocation scheme for the sounding reference signal is the second scheme. In this case, the resource allocation scheme indicated by the name and the size of the field and the bit value is merely exemplary.

Method 5-4: Determination of the Transmission Frequency Resource Allocation Scheme Depending on Whether the Uplink Control Channel is Transmitted within the Channel Occupancy Time of the Base Station Hereinafter, the method 5-4 will be described in more detail. The method 5-4 is a method for determining the transmission frequency resource allocation scheme of the sounding reference signal depending on whether the sounding reference signal is transmitted within the channel occupancy time of the base station. Through the method, the transmission frequency resource allocation schemes of the sounding reference signal may be identical to or different from each other depending on whether the sounding reference signal is transmitted within the channel occupancy time of the base station or in the time except the channel occupancy time of the base station, and as a result, the transmission frequency resource allocation scheme of the sounding reference signal may be identical to or different from the transmission frequency resource allocation scheme of the sounding reference signal indicated or configured through at least one of the method 5-1, method 5-2, or method 5-3.

It is preferable that the base station controls the uplink signal transmission of terminals within the channel occupancy time in which the base station accesses and uses the channel after performing the channel access procedure. For example, the base station may transmit the UL grant to one or more terminals on the downlink control channel, and the terminal having received this may transmit the uplink data channel in accordance with the UL grant. Further, the base station may indicate to transmit the uplink control channel (PUCCH) or the data channel (PUSCH) to one or more terminals, and the uplink signals and channels may be multiplexed. Accordingly, the base station is required to make the uplink signals and channels transmitted by the terminals in at least one slot or a transmission time interval be effectively multiplexed by making the uplink signals and channels have the same resource allocation scheme in at least the channel occupancy time. Accordingly, a method is necessary, in which the transmission frequency resource allocation schemes are independently configured depending on whether at least the uplink control channel is transmitted within the channel occupancy time of the base station.

For example, the terminal may transmit the sounding reference signal using the transmission resource allocation scheme (e.g., first scheme) in case of transmitting the sounding reference signal within the channel occupancy time of the base station and the transmission resource allocation scheme (e.g., second scheme) in case of transmitting the sounding reference signal in the time except the channel occupancy time of the base station. In this case, the transmission resource allocation scheme in case of transmitting the sounding reference signal in the time except the channel occupancy time of the base station may be predefined between the base station and the terminal (e.g., default resource allocation scheme), and the transmission resource allocation scheme (e.g., first scheme) in case of transmitting the sounding reference signal within the channel occupancy time of the base station may be configured or enabled by the base station through the system information or the higher signal or the DCI for indicating or requesting the transmission of the sounding reference signal. Similarly, the transmission resource allocation scheme in case of transmitting the sounding reference signal within the channel occupancy time of the base station may be predefined between the base station and the terminal (e.g., default resource allocation scheme), and the transmission resource allocation scheme (e.g., first scheme) in case of transmitting the sounding reference signal in the time except the channel occupancy time of the base station may be configured or enabled by the base station through the system information or the higher signal or the DCI for indicating or requesting the transmission of the sounding reference signal. In this case, the transmission resource allocation scheme in case of transmitting the sounding reference signal in the time except the channel occupancy time of the base station may be configured through the DCI for indicating or requesting the transmission of the sounding reference signal (e.g., second scheme), and the transmission resource allocation scheme (e.g., first scheme) in case of transmitting the sounding reference signal within the channel occupancy time of the base station may be configured or enabled through the system information or the higher signal. Similarly, the transmission resource allocation scheme in case of transmitting the sounding reference signal within the channel occupancy time of the base station may be configured through the DCI for indicating or requesting the transmission of the sounding reference signal (e.g., first scheme), and the transmission resource allocation scheme (e.g., second scheme) in case of transmitting the sounding reference signal in the time except the channel occupancy time of the base station may be configured or enabled through the system information or the higher signal.

Further, if the terminal is not configured with the transmission resource allocation scheme in case of transmitting the sounding reference signal within the channel occupancy time of the base station, or if the transmission resource allocation scheme is not enabled, the terminal may apply the transmission resource allocation scheme in case of transmitting the sounding reference signal in the time except the channel occupancy time of the base station even to a case of transmitting the sounding reference signal within the channel occupancy time of the base station. Similarly, the transmission resource allocation scheme in case of transmitting the sounding reference signal within the channel occupancy time of the base station may be predefined between the base station and the terminal (e.g., default resource allocation scheme), and the transmission resource allocation scheme (e.g., first scheme) in case of transmitting the sounding reference signal in the time except the channel occupancy time of the base station may be configured or enabled by the base station through the system information or the higher signal. In this case, if the terminal is not configured with the transmission resource allocation scheme in case of transmitting the sounding reference signal in the time except the channel occupancy time of the base station, or if the scheme is not enabled, the terminal may apply the transmission resource allocation scheme in case of transmitting the sounding reference signal within the channel occupancy time of the base station even to a case of transmitting the sounding reference signal in the time except the channel occupancy time of the base station.

As described above, the terminal may determine the transmission resource allocation scheme (e.g., first scheme) in case of transmitting the sounding reference signal within the channel occupancy time of the base station and the transmission resource allocation scheme (e.g., second scheme) in case of transmitting the sounding reference signal in the time except the channel occupancy time of the base station, and the terminal may determine whether the uplink data channel transmission time or the transmission slot is a time within the channel occupancy time of the base station or a time except the channel occupancy time, and the terminal may transmit the sounding reference signal through a correct transmission resource allocation scheme in accordance with the result of the determination. In this case, the terminal may determine whether the base station occupies the channel or whether the base station accesses the channel depending on whether to detect a reference signal (e.g., DMRS) transmitted by the base station, or the terminal may determine whether the base station occupies the channel through reception of information on whether the base station accesses the channel or information on the channel occupancy time of the base station that are transmitted by the base station through the downlink control channel.

In this case, the information on whether the base station accesses the channel or information on the channel occupancy time may be composed of not only information on at least one bandwidth part and one transmission interval or slot but also at least one of a plurality of bandwidth parts or a plurality of slots. Further, the information on whether the base station accesses the channel or information on the channel occupancy time may be composed of information on one or more subband units having a smaller size than the size of the bandwidth part or information on one or more mini-slots or transmission time intervals or symbols composed of symbols that are smaller than the slots. Such information on whether the base station accesses the channel or information on the channel occupancy time may refer to FIG. 9A.

Method 5-5: Usage of the Same Resource Allocation Scheme as that of an Uplink Data Channel The method 5-5 is a method in which the terminal transmits the sounding reference signal by applying the same scheme as the transmission frequency resource allocation scheme for the uplink data channel scheduled through the UL grant indicated or determined through one or more of various methods according to embodiment 3 of the disclosure. The method 5-5 has the advantage that additional information for indicating or configuring the transmission frequency resource allocation scheme for the sounding reference signal is not necessary, and according to this method, all the uplink data channels and the sounding reference signals can use the same transmission frequency resource allocation scheme. In particular, in case that the uplink data channel and the sounding reference signal are successively transmitted, the uplink data channel and the sounding reference signal are made to use the same transmission frequency resource allocation scheme, and thus an unnecessary change of the resource allocation scheme can be avoided. In this case, it is also possible that the method 5-5 includes a method by the terminal for transmitting the sounding reference signal by applying the same scheme as the transmission frequency allocation scheme for the uplink control channel scheduled through the RAR UL grant indicated or determined through one or more of various methods of embodiment 2 and embodiment 3 of the disclosure.

According to the various embodiments of the disclosure, although the method for determining the resource allocation scheme for the uplink signals or channels has been provided, it is also possible to determine the resource allocation scheme for one or more uplink signals or channels through combination and modification of one or more embodiments. Further, in the disclosure, although the method for determining the resource allocation scheme for respective uplink signals or channels has been described on the assumption that the resource allocation schemes for the respective uplink signals or channels are independently indicated or configured, the resource allocation scheme for the uplink signals or channels may be commonly applied to all the uplink signals or channels transmitted in the uplink carrier, uplink cell, or uplink bandwidth part, and in this case, it may be determined that the resource allocation schemes for the uplink signals or channels indicated or configured in the uplink carrier, uplink cell, or uplink bandwidth part are applied rather than indication or configuration for the respective uplink signals or channels.

In the disclosure, although the method for determining the resource allocation scheme for the respective uplink signals or channels in accordance with the waveform configuration configured or defined in the respective uplink signals or channels is provided, the waveform configuration for the uplink signals or channels can be commonly applied to all the uplink signals or channels being transmitted in an uplink carrier, uplink cell, or uplink bandwidth part. In this case the waveform configuration for the uplink signals or channels may be the waveform configuration for the uplink signals or channels indicated or configured in the uplink carrier, the uplink cell, or the uplink bandwidth part rather than the configurations for the uplink signals or channels, and the resource allocation scheme for the respective uplink signals or channels may be determined based on the configured waveform.

Further, in the disclosure, the default transmission frequency resource allocation scheme between the base station and the terminal means that the frequency resource allocation scheme for a part or the whole of the uplink signal or channel has been predefined between the base station and the terminal. In this case, the default transmission frequency resource allocation scheme may be one of uplink resource allocation type 0, uplink resource allocation type 1, and uplink resource allocation type 2, or a combination or a modification of the resource allocation schemes, and it may be determined in accordance with the uplink transmission signals or channels, or the waveforms of the uplink transmission signals or channels.

FIG. 10 is a flowchart of a base station for determining a method for allocating a frequency domain resource in a wireless communication system according to an embodiment of the disclosure. The base station is exemplified by the base station 110 of FIG. 1.

Referring to FIG. 10, at operation 1000, the base station may determine the frequency resource allocation scheme for an uplink signal and a channel. For example, the frequency resource allocation schemes for the uplink signal and the channel may be identical to or different from each other depending on whether the uplink signal and the channel are the signal and the channel transmitted in an unlicensed band or in a licensed band. As an example, if the uplink signal and the channel are the signal and the channel transmitted in the unlicensed band, the method according to the disclosure including uplink frequency resource allocation type 1, type 2, or type 3 may be used as the frequency resource allocation scheme for the uplink signal and the channel. If the uplink signal and the channel are the signal and the channel transmitted in the licensed band, the method according to the disclosure including uplink frequency resource allocation type 0 and type 1 may be used as the frequency resource allocation scheme for the uplink signal and the channel. Further, at operation 1000, the base station may configure configuration information required to transmit/receive the uplink signal and the channel including the bandwidth part related configuration. In this case, the base station may indicate or configure the frequency resource allocation scheme for the uplink signal and the channel of the terminal in accordance with various embodiments and methods of the disclosure.

Thereafter, the base station, at operation 1010, may transmit, to one or more terminals, configuration information required for transmission/reception of the configured uplink signal and channel through system information, system information block (SIB), or a higher signal. Thereafter, at operation 1020, the base station may transmit the downlink signal and the channel to the terminal in accordance with configuration information required for transmission/reception of the configured uplink signal and channel, or it may receive the uplink signal and the channel from the terminal.

Figure 11:
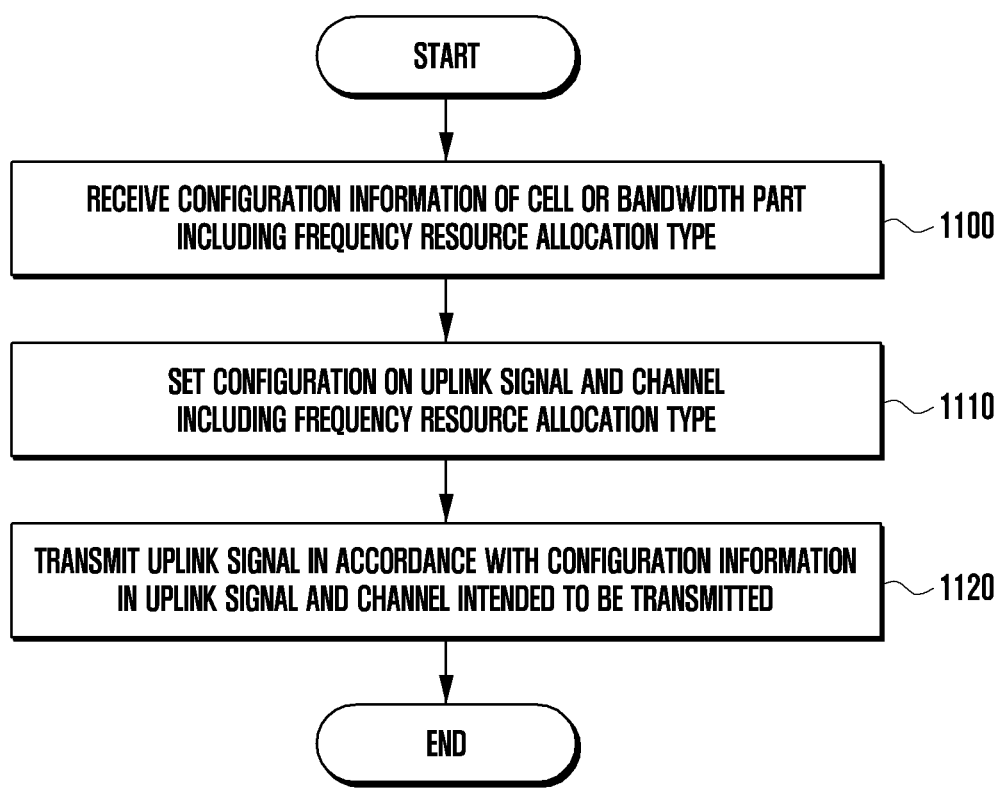
FIG. 11 is a flowchart of a terminal for determining a method for allocating a frequency domain resource in a wireless communication system according to an embodiment of the disclosure.

FIG. 11 is a flowchart of a terminal for determining a method for allocating a frequency domain resource in a wireless communication system according to an embodiment of the disclosure. The terminal is exemplified by the terminal 120 or 130 of FIG. 1.

Referring to FIG. 11, at operation 1100, the terminal may receive, from the base station, configuration information about the frequency resource allocation scheme for the uplink signal and the channel configured by the base station through at least one of a system information block or a higher signal. In this case, the frequency resource allocation schemes for the uplink signal and the channel may be identical to or different from each other depending on whether the uplink signal and the channel are the signal and the channel transmitted in an unlicensed band or in a licensed band. More specifically, if the uplink signal and the channel are the signal and the channel transmitted in the unlicensed band, the base station may configure the method according to the disclosure including uplink frequency resource allocation type 1, type 2, or type 3 as the frequency resource allocation scheme for the uplink signal and the channel. If the uplink signal and the channel are the signal and the channel transmitted in the licensed band, the method according to the disclosure including uplink frequency resource allocation type 0 and type 1 may be configured as the frequency resource allocation scheme for the uplink signal and the channel. Further, at operation 1100, the terminal may receive configuration information required for transmission/reception of the uplink signal and the channel configured by the base station including the bandwidth part related configuration. Thereafter, at operation 1110, the terminal may configure variables required for transmission of the uplink signal and the channel including the frequency resource allocation scheme in accordance with the configuration information received at operation 1100. At operation 1120, the terminal may transmit the uplink signal and the channel in accordance with the frequency resource allocation type configured at operation 1110.

Figure 12:
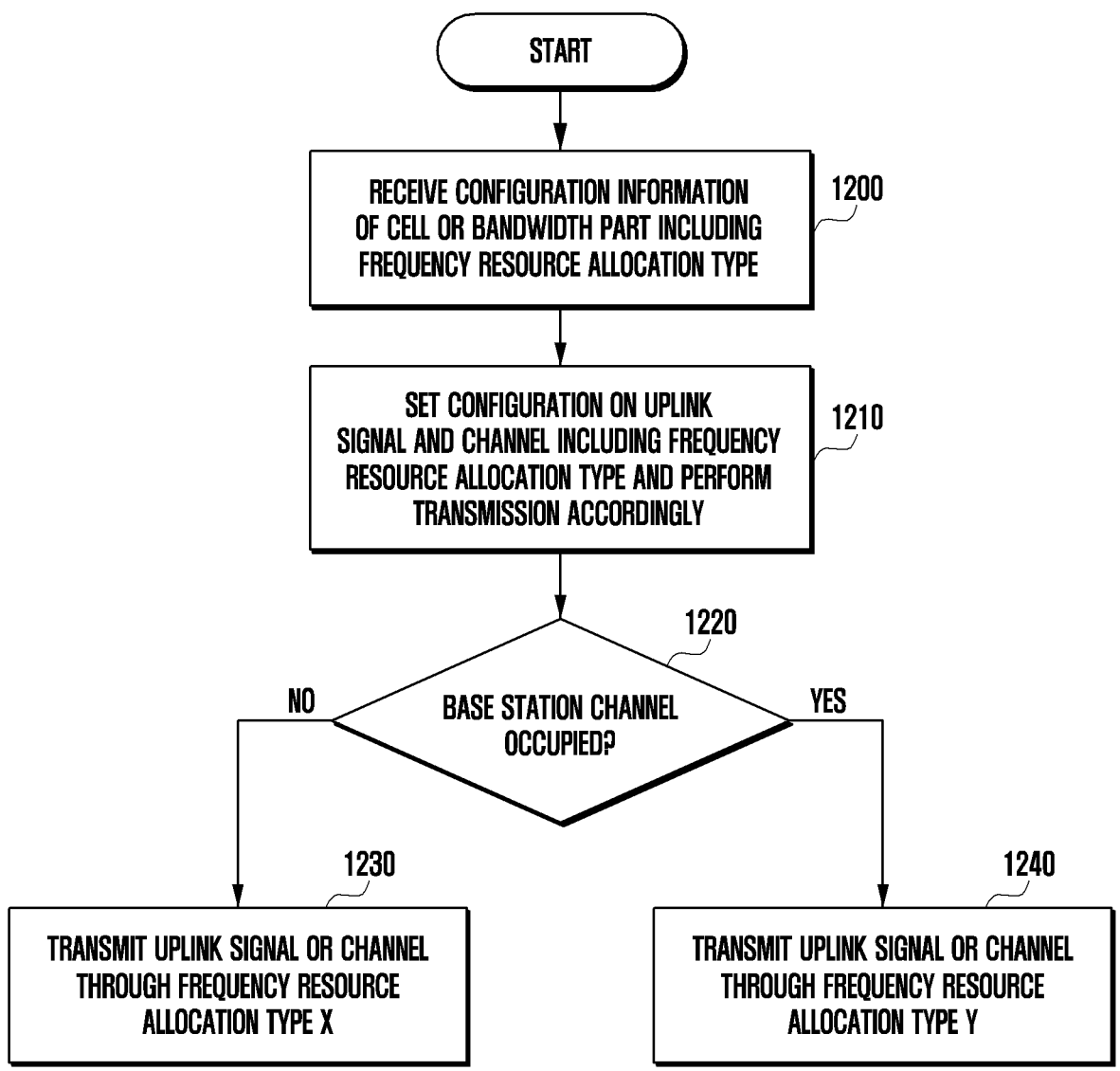
FIG. 12 is another flowchart of a terminal for determining a method for allocating a frequency domain resource in a wireless communication system according to an embodiment of the disclosure.

FIG. 12 is another flowchart of a terminal for determining a method for allocating a frequency domain resource in a wireless communication system according to an embodiment of the disclosure. The terminal is exemplified by the terminal 120 or 130 of FIG. 1.

Referring to FIG. 12, at operation 1200, the terminal may receive, from the base station, configuration information about the frequency resource allocation scheme for the uplink signal and the channel configured by the base station through at least one of a system information block or a higher signal. In this case, the frequency resource allocation schemes for the uplink signal and the channel may be identical to or different from each other depending on whether the uplink signal and the channel are the signal and the channel transmitted in an unlicensed band or in a licensed band. More specifically, if the uplink signal and the channel are the signal and the channel transmitted in the unlicensed band, the base station may configure the method according to the disclosure including uplink frequency resource allocation type 1, type 2, or type 3 as the frequency resource allocation scheme for the uplink signal and the channel. If the uplink signal and the channel are the signal and the channel transmitted in the licensed band, the method according to the disclosure including uplink frequency resource allocation type 0 and type 1 may be configured as the frequency resource allocation scheme for the uplink signal and the channel.

If the uplink signal and the channel are transmitted in the unlicensed band, the terminal may be configured with the frequency resource allocation scheme of the uplink signal or the channel in case that the uplink signal and the channel are transmitted within the channel occupancy time of the base station, and the frequency resource allocation scheme of the uplink signal or the channel in case that the uplink signal and the channel are transmitted at the time except the channel occupancy time of the base station. In this case, the frequency resource allocation scheme of the uplink signal and the channel with respect to at least one of the frequency resource allocation scheme of the uplink signal and the channel in case that the uplink signal and the channel are transmitted within the channel occupancy time of the base station and the frequency resource allocation scheme of the uplink signal and the channel in case that the uplink signal and the channel are transmitted at the time except the channel occupancy time of the base station (e.g., the uplink signal and the channel are transmitted at the time except the channel occupancy time of the base station) may follow the frequency resource allocation scheme for the uplink data channel scheduled through the default frequency resource allocation type or preamble or RAR UL grant, and it is also possible to be allocated with the frequency resource allocation scheme of the uplink signal or channel with respect to another case (e.g., the signal and the channel are transmitted within the channel occupancy time of the base station.

Further, at operation 1200, the terminal may receive configuration information required for transmission/reception of the uplink signal and the channel configured by the base station including the bandwidth part related configuration. Thereafter, at operation 1210, the terminal may identify and configure variables required for transmission of the uplink signal and the channel including the frequency resource allocation scheme in accordance with the configuration information received at operation 1100. Thereafter, the terminal may transmit the uplink signal and the channel in accordance with the frequency resource allocation scheme configured at operation 1210.

Further, at operation 1220, the terminal determines whether transmission of the uplink signal or the channel is the transmission at a time within the channel occupancy time of the base station. If the uplink signal or the channel is transmitted at a time or slot within the channel occupancy time of the base station, the terminal, at operation 1240, transmits the signal in accordance with the frequency resource allocation scheme of the uplink signal or the channel being transmitted at the time or slot within the channel occupancy time of the base station determined at operation 1200. If the uplink signal or the channel is transmitted at the time or slot except the channel occupancy time of the base station, the terminal, at operation 1230, transmits the signal in accordance with the frequency resource allocation scheme of the uplink signal or the channel that is transmitted at the time or slot except the channel occupancy time of the base station determined at operation 1200.

In the disclosure, although the expressions "equal to or larger than" and "equal to or smaller than" have been used to determine whether to fulfill a specific condition (or reference), this is merely a description to express an embodiment, and does not exclude the description of "exceeding" or "smaller than" The condition described as "equal to or larger than" may be replaced by "exceeding", the condition described as "equal to or smaller than" may be replaced by "smaller than", and the condition described as "equal to or larger than and smaller than" may be replaced by "exceeding and equal to or smaller than".

The methods according to claims of the disclosure and embodiments described in the description may be implemented in the form of hardware, software, or a combination of hardware and software.

In case of implementing by software, a computer readable storage medium storing one or more programs (software modules) may be provided. One or more programs stored in the computer readable storage medium are configured for execution by one or more processors in an electronic device. The one or more programs include instructions that cause the electronic device to execute the methods according to the claims of the disclosure or embodiments described in the description.

Such a program (software module or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs) or other types of optical storage devices, or a magnetic cassette. Further, the program may be stored in a memory composed of a combination of parts or the whole of them. Further, a plurality of memories may be included.

Further, the program may be stored in an attachable storage device that can be accessed through a communication network such as Internet, Intranet, local area network (LAN), wide LAN (WLAN), or storage area network (SAN) or a communication network composed of a combination thereof. The storage device may be accessed by a device that performs embodiments of the disclosure through an external port. Further, a separate storage device on the communication network may access a device that performs embodiments of the disclosure.

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services.

The embodiments described in this specification have been individually described, but two or more of the embodiments may be combined and practiced. For example, parts of the methods proposed in the disclosure may be combined with each other to operate the base station and the terminal. Further, the above-described embodiments are proposed based on a 5G or NR system, but other modifications based on the technical concept of the embodiments will be applicable to other systems such as LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, configuration information for a physical uplink control channel, the configuration information including an index of a first interlace resource;
   identifying the first interlace resource and a second interlace resource based on the configuration information; and
   transmitting, to the base station, uplink control information on the physical uplink control channel using at least one of the first or second interlace resource,
   wherein an interlace resource is composed of a plurality of equally spaced resource blocks, and
   wherein an index of the second interlace resource is associated with a modulo operation using the index of the first interlace resource and an offset which is one of predetermined integers.

2. The method of claim 1, further comprising:
   determining the at least one of the first or second interlace resource based on whether a code rate for the uplink control information is equal to or larger than a code rate determined for transmission of the uplink control information or not.

3. The method of claim 2,
   wherein in case that the code rate for the uplink control information is equal to or larger than the code rate determined for transmission of the uplink control information, the first interlace resource is determined to be used for the transmission of the uplink control information, and
   wherein in case that the code rate for the uplink control information is smaller than the code rate determined for transmission of the uplink control information, the first and second interlace resources are determined to be used for the transmission of the uplink control information.

4. The method of claim 1, further comprising:
   receiving, from the base station, configuration information enabling interlace resource allocation via a system information block.

5. A method performed by a base station in a communication system, the method comprising:
   identifying a first interlace resource and a second interlace resource for receiving uplink control information;
   transmitting, to a terminal, configuration information for a physical uplink control channel, the configuration information including an index of the first interlace resource according to the first and second interlace resources; and
   receiving, from the terminal, the uplink control information on the physical uplink control channel using at least one of the first or second interlace resource,
   wherein an interlace resource is composed of a plurality of equally spaced resource blocks, and
   wherein an index of the second interlace resource corresponds to a value based on a modulo operation using the index of the first interlace resource and an offset which is one of predetermined integers.

6. The method of claim 5, further comprising:
determining the at least one of the first or second interlace resource based on whether a code rate for the uplink control information is equal to or larger than a code rate determined for transmission of the uplink control information or not.

7. The method of claim 6,
wherein in case that the code rate for the uplink control information is equal to or larger than the code rate determined for transmission of the uplink control information, the first interlace resource is determined to be used for the transmission of the uplink control information, and
wherein in case that the code rate for the uplink control information is smaller than the code rate determined for transmission of the uplink control information, the first and second interlace resources are determined to be used for the transmission of the uplink control information.

8. The method of claim 5, further comprising:
transmitting, to the terminal, configuration information enabling interlace resource allocation via a system information block.

9. A terminal in a communication system, the terminal comprising:
a transceiver; and
a controller coupled with the transceiver and configured to:
receive, from a base station, configuration information for a physical uplink control channel, the configuration information including an index of a first interlace resource,
identify the first interlace resource and a second interlace resource based on the configuration information, and
transmit, to the base station, uplink control information on the physical uplink control channel using at least one of the first or second interlace resource,
wherein an interlace resource is composed of a plurality of equally spaced resource blocks, and
wherein an index of the second interlace resource is associated with a modulo operation using the index of the first interlace resource and an offset which is one of predetermined integers.

10. The terminal of claim 9, wherein the controller is further configured to:
determine the at least one of the first or second interlace resource based on whether a code rate for the uplink control information is equal to or larger than a code rate determined for transmission of the uplink control information or not.

11. The terminal of claim 10,
wherein in case that the code rate for the uplink control information is equal to or larger than the code rate determined for transmission of the uplink control information, the first interlace resource is determined to be used for the transmission of the uplink control information, and
wherein in case that the code rate for the uplink control information is smaller than the code rate determined for transmission of the uplink control information, the first and second interlace resources are determined to be used for the transmission of the uplink control information.

12. The terminal of claim 9, wherein the controller is further configured to:
receive, from the base station, configuration information enabling interlace resource allocation via a system information block.

13. A base station in a communication system, the base station comprising:
a transceiver; and
a controller coupled with the transceiver and configured to:
identify a first interlace resource and a second interlace resource for receiving uplink control information,
transmit, to a terminal, configuration information for a physical uplink control channel, the configuration information including an index of the first interlace resource according to the first and second interlace resources, and
receive, from the terminal, the uplink control information on the physical uplink control channel using at least one of the first or second interlace resource,
wherein an interlace resource is composed of a plurality of equally spaced resource blocks, and
wherein an index of the second interlace resource corresponds to a value based on a modulo operation using the index of the first interlace resource and an offset which is one of predetermined integers.

14. The base station of claim 13, wherein the controller is further configured to:
determine the at least one of the first or second interlace resource based on whether a code rate for the uplink control information is equal to or larger than a code rate determined for transmission of the uplink control information or not.

15. The base station of claim 14,
wherein in case that the code rate for the uplink control information is equal to or larger than the code rate determined for transmission of the uplink control information, the first interlace resource is determined to be used for the transmission of the uplink control information, and
wherein in case that the code rate for the uplink control information is smaller than the code rate determined for transmission of the uplink control information, the first and second interlace resources are determined to be used for the transmission of the uplink control information.

16. The base station of claim 13, wherein the controller is further configured to:
transmit, to the terminal, configuration information enabling interlace resource allocation via a system information block.

17. The method of claim 1,
wherein information associated with the index of the second interlace resource is included in the configuration information, and
wherein the configuration information is received via higher layer signaling.

18. The method of claim 5,
wherein information associated with the index of the second interlace resource is included in the configuration information, and
wherein the configuration information is transmitted via higher layer signaling.

19. The terminal of claim 9,
wherein information associated with the index of the second interlace resource is included in the configuration information, and wherein the configuration information is received via higher layer signaling.

20. The base station of claim 13,
wherein information associated with the index of the second interlace resource is included in the configuration information, and
wherein the configuration information is transmitted via higher layer signaling.

\* \* \* \* \*